United States Patent
Hui et al.

(10) Patent No.: US 8,913,409 B2
(45) Date of Patent: Dec. 16, 2014

(54) SELF-DRIVEN AC-DC SYNCHRONOUS RECTIFIER FOR POWER APPLICATIONS

(75) Inventors: Shu Yuen Ron Hui, Hong Kong (CN); Wenxing Zhong, Hong Kong (CN); Ho Wing Choi, Hong Kong (CN)

(73) Assignee: City University of Hong Kong, Kowloon (HK)

(*) Notice: Subject to any disclaimer, the term of this patent is extended or adjusted under 35 U.S.C. 154(b) by 609 days.

(21) Appl. No.: 12/898,898

(22) Filed: Oct. 6, 2010

(65) Prior Publication Data

US 2011/0199799 A1    Aug. 18, 2011

Related U.S. Application Data

(60) Provisional application No. 61/304,097, filed on Feb. 12, 2010.

(51) Int. Cl.
    *H02M 7/219*    (2006.01)

(52) U.S. Cl.
    CPC ............ *H02M 7/219* (2013.01); *Y02B 70/1408* (2013.01); *H02M 2007/2195* (2013.01)
    USPC ............................................. 363/127; 363/89

(58) Field of Classification Search
    USPC ........... 363/21.06, 21.14, 53, 81, 84, 89, 127, 363/49, 126
    See application file for complete search history.

(56) References Cited

U.S. PATENT DOCUMENTS

| | | | |
|---|---|---|---|
| 6,765,425 B2 | 7/2004 | Vaysse | |
| 8,045,350 B2 * | 10/2011 | Sells | ............................. 363/81 |
| 8,531,856 B2 * | 9/2013 | Masson et al. | ................. 363/127 |
| 2003/0095423 A1 * | 5/2003 | Hirst | .............................. 363/127 |
| 2004/0264219 A1 * | 12/2004 | Zhang | ......................... 363/21.06 |
| 2005/0007082 A1 * | 1/2005 | Bretz et al. | ..................... 323/274 |
| 2008/0298106 A1 * | 12/2008 | Tateishi | ........................ 363/127 |
| 2009/0016083 A1 * | 1/2009 | Soldano et al. | ................. 363/20 |
| 2009/0243582 A1 * | 10/2009 | Irissou et al. | ................. 323/320 |
| 2010/0046259 A1 | 2/2010 | Ho et al. | |

(Continued)

OTHER PUBLICATIONS

Laughton, M.A. & Warne, D.F. (2003). Electrical Engineers Reference Book (16th Edition). Elsevier. pp. 14/7-14/8. Obtained on Feb. 12, 2014 at: http://app.knovel.com/hotlink/toc/id:kpEERBE001/electrical-engineers.*

(Continued)

*Primary Examiner* — Fred E Finch, III
(74) *Attorney, Agent, or Firm* — Amin, Turocy & Watson, LLP

(57) ABSTRACT

Systems, methods, and devices that employ self-driven gate-drive circuitry to facilitate controlling power switches to emulate a diode bridge to synchronously rectify a power signal are presented. A single-phase or multi-phase synchronous rectifier can comprise at least a first pair of switches of a first conducting path and a second pair of switches of a second conducting path that can form or emulate a diode bridge. To facilitate emulating turn-on and turn-off conditions of a diode, a switch can be turned on when voltage across the switch is forward-biased and turned off when switch current is reversed; also, there can be at least one current-controlled switch in each conducting path. Self-driven gate-drive circuitry employs low power components that can facilitate controlling respective switching of the at least first pair and second pair of switches, wherein switching of the switches is also controlled at start-up to emulate a diode bridge.

20 Claims, 45 Drawing Sheets

(56) References Cited

U.S. PATENT DOCUMENTS

| | | |
|---|---|---|
| 2010/0046264 A1 | 2/2010 | Ho et al. |
| 2010/0067275 A1* | 3/2010 | Wang et al. ............... 363/127 |
| 2010/0124086 A1* | 5/2010 | Chen ........................ 363/127 |
| 2011/0134673 A1* | 6/2011 | Ho et al. .................... 363/127 |

OTHER PUBLICATIONS

Zhong, W.X. Ho, W.C. Liu, X. Hui, S.Y.R.; "Self-Driven AC-DC Synchronous Rectifier for Power Applications—A Direct Energy-Efficient Replacement for Traditional Diode Rectifier."

Fukushima, K.; Hashimoto, T.; Ninomiya, T.; Segawa, T.; "Analysis of Abnormal Phenomenon in Common-Source-type Forward Converter with Self-driven Synchronous Rectifier", CES/IEEE 5th International Power Electronics and Motion Control Conference, 2006. IPEMC 2006. vol. 2, Aug. 14-16, 2006 pp. 1-5.

Murata, K.; Harada, K.; Harimoto, T.; "Self turn-on loss of MOSFET as synchronous rectifier in DC/DC buck converter—in case of a low driving impedance" IEEE Power Electronics Specialists Conference, Jun. 15-19, 2008 pp. 3348-3353.

Jeong, G.-Y.; "High efficiency asymmetrical half-bridge converter using a self-driven synchronous rectifier" IET Proceedings of Power Electronics, vol. 1, Issue 1, Mar. 2008 pp. 62-71.

Dianbo Fu; Ya Liu; Lee, F.C.; Ming Xu; "A Novel Driving Scheme for Synchronous Rectifiers in LLC Resonant Converters" IEEE Transactions on Power Electronics, vol. 24, Issue 5, May 2009 pp. 1321-1329.

Cobos, J.A.; Alou, P.; Garcia, O.; Uceda, J.; Rascon, M.; "New driving scheme for self driven synchronous rectifiers" IEEE APEC '99. Fourteenth Annual Applied Power Electronics Conference and Exposition, 1999. vol. 2, Mar. 14-18, 1999 pp. 840-846.

Mihaiu, M.I.; "Toward the 'ideal diode' using power MOSFET in full wave synchronous rectifiers for low voltage power supplies" International Symposium on Power Electronics, Electrical Drives, Automation and Motion, 2008. SPEEDAM 2008. Jun. 11-13, 2008 pp. 1384-1387.

* cited by examiner

TIME: $t_2$-$t_3$

TIME: $t_3$-$t_4$

TIME: $t_0$-$t_5$

TIME: AFTER t₇

TIME: $t_1$-$t_2$

TIME: t₃-t₄

TIME: $t_4$-$t_5$

TIME: $t_6$-$t_7$

SELF-DRIVEN AC-DC SYNCHRONOUS RECTIFIER FOR POWER APPLICATIONS

CROSS-REFERENCE TO RELATED APPLICATION AND CLAIM FOR PRIORITY

This application is a non-provisional of, and claims the benefit of, U.S. Provisional Patent Application No. 61/304,097, filed Feb. 12, 2010, and titled "CONTROL CIRCUITS FOR SELF-DRIVEN SYNCHRONOUS RECTIFIER AS ENERGY-EFFICIENT REPLACEMENT FOR DIODE RECTIFIER", all of which are hereby incorporated herein by reference in their entirety.

TECHNICAL FIELD

The subject disclosure relates generally to electronic circuitry, and in particular, to systems, methodologies, and devices that can provide a self-driven AC-DC synchronous rectifier that can be used, for example, in power applications.

BACKGROUND

Synchronous rectifiers, based on the use of power metal-oxide-semiconductor field-effect transistors (MOSFETs) to replace diodes for reducing conduction losses, have been used in low-voltage and high-current applications. Synchronous rectifier techniques are primarily applied to various versions of DC-DC converters such as buck converters, flyback converters, boost-buck converters, half-bridge converters, and LCC resonant converters. To reduce the cost of the gate drive circuits, self-driven techniques have been an active research topic in synchronous rectifiers, although a gate control integrated circuit for driving synchronous rectifiers is also commercially available. Other research aspects include the use of soft-switching techniques. Besides DC-DC converters, synchronous rectification techniques have been applied to three-phase full-bridge AC-DC converter based on a three-phase fully-controlled bridge and even to a five-level converter. While the self-driven technique uses the changing voltage polarity of the coupled windings to control the switching of the power MOSFETs, other techniques tend to use control integrated circuits to provide the gating signals. Another conventional approach replaces a general-purpose diode bridge with synchronous rectifier for low power and low voltage (e.g., 3V to 5V) applications in which the synchronous rectification technique is applied to a centre-tap rectifier topology. However, in such approach, a customized charge pump circuit is needed in order to provide a suitable DC power supply for the gate drive. Also, as this approach aims at low-voltage applications, it is not suitable for mains voltage operations.

A three-phase synchronous rectifier that can operate at mains frequency also has been developed and reported in U.S. Pat. No. 6,765,425. It is based on the detection of the phase-phase voltage, output voltage and timing circuits. Sophisticated logic and timing circuits are needed to provide the gating signals if the AC source has significant source inductance. However, the gating signals for synchronous rectifiers based on phase-phase and output voltages detection is not adequate because the diodes of a traditional bridge rectifier only turn off naturally after their current reverse-recovery processes. In U.S. Pat. No. 6,765,425, the three-phase synchronous rectifier circuit replaces the six diodes with power MOSFETs and uses "voltage-controlled gate drive circuits" and the appropriate logic circuits to control the switching of the six MOSFETs. Voltage control here refers to the detection of the output voltage and the AC input voltage or voltages which could be phase voltages or line voltages. To cope with different types of load, that synchronous rectifier circuit can be initially inactivated in order to allow the body-diodes of the 6 MOSFETs to conduct like a normal 3-phase diode rectifier. Using timing circuits, the conduction periods of the MOSFETs' bode diodes are then registered. Such conduction time information is then used to control the conduction time of the MOSFETS. However, this approach has at least three major limitations. First, with the use of voltage detection only, the logic circuits have to be tailor-made to cater for a particular application. Second, since a diode will turn off only when its current is reversed and has gone through the reverse-recovery process using voltage detection cannot guarantee equivalent diode bridge rectification functions under all types of loads and circumstances. Third, a DC power supply derived from the AC voltage supply is desired to power the control electronics. While a DC power supply for the control circuitry can be derived from the input AC voltage source with the aid of isolation transformers, transformers cannot be easily integrated into the same package with the MOSFETs in a compact way, and as a result, the control circuitry with the transformers will take up significant space and cannot be built in the same package with the MOSFETs, and as further result, will not be able to form a replacement block for a diode rectifier.

It is desirable to be able to provide a self-driven AC-DC synchronous rectification technique that can be used to develop an AC-DC synchronous rectifier that can behave like a diode bridge and be used in high-voltage power applications, but with significantly reduced conduction losses and without requiring control integrated circuits. It is also desirable to be able to use such an AC-DC synchronous rectifier in single-phase and multi-phase systems.

SUMMARY

The following presents a simplified summary of the innovations in order to provide a basic understanding of some aspects described herein. This summary is not an extensive overview of the disclosed subject matter. It is intended to neither identify key or critical elements of the disclosed subject matter nor delineate the scope of the subject innovations. Its sole purpose is to present some concepts of the disclosed subject matter in a simplified form as a prelude to the more detailed description that is presented later.

The disclosed subject matter relates to systems, methods, and devices that can produce or comprise a single-phase and multi-phase (e.g., three-phase) AC-DC synchronous rectifier, which includes self-driven control circuitry, for use in high-voltage power applications are presented. In an aspect, the synchronous rectifier circuitry can behave like, function as, or emulate a diode bridge (e.g., a bridge rectifier), and also can provide benefits over conventional rectifiers, wherein, for example, one benefit can be a significantly smaller conduction loss as compared to a conventional diode bridge.

In an embodiment, a single-phase system can include a single-phase synchronous rectifier that can comprise a first pair of switches of a first conducting path and a second pair of switches of a second conducting path. In an aspect, to facilitate emulating the turn-on and turn-off conditions of a diode, a first type of switch (e.g., a power switch, which can be a voltage-controlled self-driven (VCSD) switch) can be associated with a high-side portion of a self-driven gate-drive (SDGD) subsystem, and can be turned on (e.g., placed in or transitioned to an on state) when the voltage across such switch is forward-biased; and there can be another type of switch (e.g., a power switch, which can be a current-controlled self-driven (CCSD) switch) that can be associated with a low-side portion of the SDGD subsystem and can be turned off (e.g., placed out or transitioned to an off state) when the switch current is reversed (e.g., similar to diode current reverse recovery). Thus, to facilitate emulating the turn-on and turn-off conditions of diodes in a bridge rectifier, there can be at least one current-controlled switch in each current path of the circuitry associated with the synchronous rectifier (e.g., the equivalent diode-bridge circuit). In an embodiment, one or more of the switches can be metal-oxide-semiconductor field-effect transistors (MOSFETs) (e.g., power MOSFETs), which each can have inherent body diodes.

In another aspect, the single-phase system can comprise an SDGD subsystem, comprising self-driven gate-drive circuitry, that can be associated with (e.g., electrically connected to) the first pair and second pair of switches to facilitate controlling respective switching of the switches. In an aspect, the SDGD subsystem can be low power (e.g., can employ components using low power), wherein the power supplied to the SDGD subsystem can be provided by the AC voltage source or preferably at least a portion of the rectified output signal from the synchronous rectifier. In an embodiment, the SDGD subsystem, or a desired portion thereof, can be formed as an integrated circuit. In an aspect, the SDGD subsystem can comprise a high-side portion and a low-side portion that can be symmetrical. With the arrangement of SDGD subsystem and the switches (e.g., power MOSFETs), the synchronous rectifier can thereby be a self-driven synchronous rectifier. In another aspect, the switches can form and/or emulate a diode bridge. In an aspect, even if the SDGD subsystem is not ready for full or steady-state operation, for example, immediately at the start-up of the synchronous rectifier (or at another period of time when the SDGD subsystem is not operating at steady-state operation), the synchronous rectifier can still function the same as or substantially similar to a diode bridge (e.g., bridge-rectifier type functionality is inherent in the synchronous rectifier) because the body diodes of the MOSFETs are arranged in the circuit to form a traditional diode rectifier circuit. Before the output DC voltage of the rectifier is ready to power the control circuitry for switching the MOSFETs, these body diodes can facilitate enabling the MOSFETs to act as a normal diode rectifier during the start-up process. In still another aspect, the system can include a zero-cross controller component(s) that can facilitate providing a desired positive voltage signal to a comparator(s) associated with a switch(es) (e.g., low-side switch) to facilitate ensuring that the associated switch(es) is in an off state at or near zero-crossing points during half-cycles of the signal. In yet another aspect, the synchronous rectifier can be employed in high-voltage power applications (e.g., 110 V or 220 V mains) and/or high frequency applications.

In an embodiment, a multi-phase system can comprise a multi-phase (e.g., three-phase) synchronous rectifier that can be employed to receive and synchronously rectify a multi-phase signal (e.g., multi-phase AC power signal) and produce a desired signal (e.g., rectified DC power signal) as an output. The multi-phase synchronous rectifier can comprise, for example, six (or more) switches (e.g., MOSFET switches), which can be power switches that can facilitate synchronously rectifying the multi-phase power signal. In an embodiment, the six (or more) switches can be situated in relation to each other to form and/or emulate a diode bridge.

In an aspect, the multi-phase system can comprise an SDGD subsystem that can be associated with the power switches, and can be designed such that the SDGD subsystem consumes a relatively low amount of power, and can receive a portion of the AC voltage source or preferably at least a portion of the rectified signal generated by the multi-phase synchronous rectifier to facilitate powering the SDGD subsystem. In an embodiment, the SDGD subsystem, or at least a desired portion, can be formed as an integrated circuit. In an aspect, the SDGD subsystem can be employed to facilitate controlling respective switching of the power switches. In another aspect, the SDGD subsystem and associated power switches can be divided into two parts, which can include a high-side portion that includes three (or more) of the switches (e.g., VCSD power switches) and a high-side portion of the SDGD subsystem, and a low-side portion that includes the other three (or more) switches (e.g., CCSD power switches) and a low-side portion of the SDGD subsystem, wherein the high-side portion and low-side portion of the system can be symmetrical.

In an aspect, as disclosed herein, the six (or more) switches can be situated in relation to each other to form and/or emulate a diode bridge, which can facilitate functioning to rectify an input signal to produce a rectified signal, even when the SDGD subsystem is not operating at steady state (e.g., during start up of the SDGD subsystem), as more fully disclosed herein. As a result, if the SDGD subsystem is not ready for operation immediately at the start-up of the synchronous rectifier (or at another time) (e.g., is not powered up to operate at steady state), the synchronous rectifier can still function to rectify an input power signal and produce a desired rectified signal as an output (e.g., diode-bridge type functionality is inherent in the synchronous rectifier). For example, the SDGD subsystem can operate to control the switches on the top-side portion and the switches on the low-side portion so that these switches will not change state (e.g., switch to an on state) until the SDGD subsystem has been set up, for example, during initial gate-drive start up, to operate at steady state. In still another aspect, the system can include a zero-cross controller component(s) that can facilitate providing a desired positive voltage signal to a comparator(s) associated with a switch(es) (e.g., low-side switch) to facilitate ensuring that the associated switch(es) is in an off state at or near zero-crossing points during half-cycles of the signal. In yet another aspect, the multi-phase synchronous rectifier can be employed in high-voltage power applications (e.g., 110 V or 220 V mains) and/or high frequency applications.

The following description and the annexed drawings set forth in detail certain illustrative aspects of the disclosed subject matter. These aspects are indicative, however, of but a few of the various ways in which the principles of the innovation may be employed and the disclosed subject matter is intended to include all such aspects and their equivalents. Other advantages and distinctive features of the disclosed subject matter will become apparent from the following detailed description of the innovation when considered in conjunction with the drawings.

DETAILED DESCRIPTION

Figure 1:
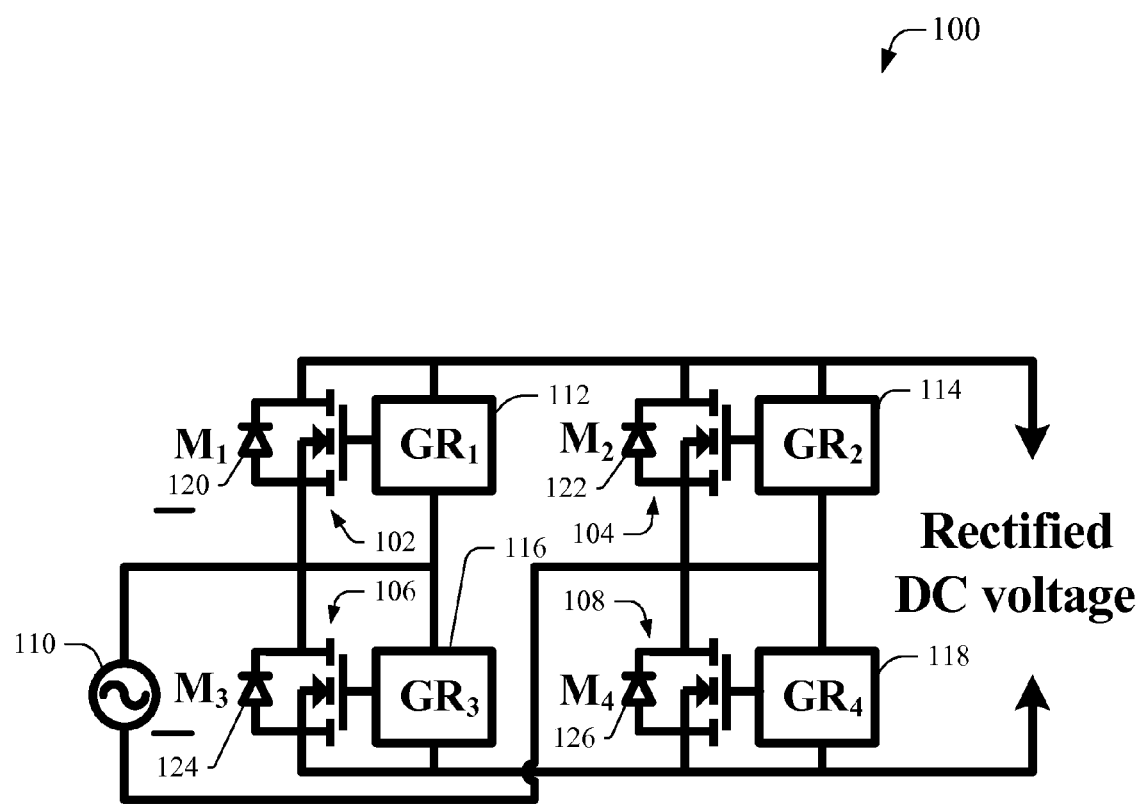
FIG. 1 illustrates a block diagram of an example system that can synchronously rectify a received signal (e.g., power signal) in accordance with various embodiments and aspects.

The disclosed subject matter is described with reference to the drawings, wherein like reference numerals are used to refer to like elements throughout. In the following description, for purposes of explanation, numerous specific details are set forth in order to provide a thorough understanding of the various embodiments of the subject disclosure. It may be evident, however, that the disclosed subject matter may be practiced without these specific details. In other instances, well-known structures and devices are shown in block diagram form in order to facilitate describing the various embodiments herein.

Diode bridges, sometimes also referred to as bridge rectifiers, can be used to rectify a received AC signal and produce a DC signal as output. One significant drawback with diode bridges is a relatively high amount of conductive loss realized in processing the received signal. For example, the typical voltage drop $V_d$ of a power diode is 1.0 volt (V). For a diode current $I_d$ of 10 amps (A), the conduction loss is 10 watts (W), in accordance with the equation $P_d = V_d \times I_d$.

Conventionally, to facilitate reducing conduction losses associated with bridge rectifiers, synchronous rectifiers, based on the use of power metal-oxide-semiconductor field-effect transistors (MOSFETs) to replace the diodes (e.g., the diode bridge), have been predominately used in low-voltage and high-current applications. Some power MOSFETs can have an on-state resistance, $R_{on}$, as low as 40 m$\Omega$. For a current of 10 A, the conduction loss is $I^2 R_{on} = 4$ W. This is a 6 W reduction from the power loss (e.g., 6 W power savings) when compared to a power diode. However, the conventional synchronous rectifiers suffer from a number of significant drawbacks, including, for example, requiring a customized charge pump circuit in order to provide a suitable DC power supply for a gate drive, only being suitable for low-voltage and high-frequency (>100 kHz) applications, but not mains voltage and mains frequency operations, requiring logic circuits that have to be tailor-made to cater for a particular application. For the synchronous rectifier proposed in U.S. Pat. No. 6,765,425 for mains voltage and main frequency operation, complicated timing circuits are needed to check the switching times for the MOSFETs in order to differentiate different types of loads. It is desirable to be able to provide a self-driven AC-DC synchronous rectification technique that can be used to develop an AC-DC synchronous rectifier that can behave like a diode bridge and be used in high-voltage power applications, but with significantly reduced conduction losses and without requiring control integrated circuits. It is also desirable to be able to use such an AC-DC synchronous rectifier in single-phase and multi-phase systems.

To that end, systems, methods, and devices that can produce, employ, or comprise a single-phase and multi-phase (e.g., three-phase) AC-DC synchronous rectifier, which includes self-driven control component (e.g., comprising self-driven control circuitry), for use in high-voltage power applications are presented. In an aspect, the synchronous rectifier circuitry can behave like or emulate a diode bridge (e.g., a bridge rectifier), while also being able to provide the benefit of a significantly smaller conduction loss as compared to a diode bridge. In accordance with the disclosed subject matter, the diodes in any single-phase or multiple rectifier circuit can be replaced with switches that each can include an anti-parallel diode and can have low on-state resistance. One example switch that can be employed is a MOSFET which has an inherent body diode in its structure. If each current loop of the rectifier circuit has at least one current-controlled gate drive, the combined actions of the MOSFET and its body diode can offer the diode functions (e.g., diode rectification functions) at low conduction loss. This can allow the low on-state resistance of the MOSFET to carry the current most of the time in a conducting period except for two small time regions at the beginning and the end of the conducting period in which the body diode of the MOSFET will conduct instead. Using the 10 A application as an example, when the current is high (e.g., 0.5 A to 10 A in a 10 A application), the $I^2 R_{on}$, conduction loss for the MOSFET is reduced. If the MOSFET is controlled to conduct the current in the range of 0.5 A to 10 A, the conduction is reduced when compared with that of a power diode. When the current in the MOSFET drops to less than a certain predefined value (e.g., 0.5 A), the MOSFET is turned off and its body diode will take over (e.g., carry) the current at the expense of a relatively low conduction loss because the current is small, wherein conduction loss is determined as $V_d \times I_d$. If the body diode current is reversed, this body diode will be turned off similar to a normal power diode after the current reverse-recovery process is completed. In this way, the combined actions of the MOSFET and its body diode can emulate the diode behavior with a low-loss conduction mechanism and a diode natural turn-off mechanism, respectively. Since this current-controlled MOSFET can behave like a power diode, there is no need to include additional timing or control circuit to determine the type or nature of the loads, as required in conventional rectifiers.

Since the MOSFET with its inherent body diode can behave just like a diode under the disclosed switching control, there is no need to use sophisticated control and monitoring circuits which is either (i) used to determine the nature of the load or (ii) dependent on the nature of the load (as in conventional rectifiers). In other words, the disclosed subject matter can enable the disclosed synchronous rectifier to replace the diode rectifier without the need to know the nature of the load. In addition, the control electronics can be powered by a portion of the AC voltage source or preferably a portion of the rectified DC voltage of the power rectifier circuit without the need for another specially designed auxiliary switched mode power supply or transformers.

FIG. 1 illustrates a diagram of an example system 100 that can synchronously rectify a received signal (e.g., power signal) in accordance with various embodiments and aspects. In an aspect, the system 100 can comprise components and associated circuitry that form a synchronous rectifier (e.g., self-drive synchronous rectifier (also referred to herein as SDSR)), which includes self-driven control circuitry that can be employed in high-voltage power applications while providing the benefit of a significantly smaller conduction loss as compared to, for example, a conventional diode bridge. The system 100 can receive a signal, such as, for example, an AC power signal, and can rectify the received signal to produce a desired output signal, such as a desired DC signal, which can be supplied to a desired load (e.g., resistive load, capacitive-resistive load, inductive-resistive load) (not shown). As desired, the system 100 can be employed in high-voltage power applications (e.g., 110 V or 220 V mains), and also can be used in low-voltage applications.

In an embodiment, the system 100 can include a first pair of switches, switch 102 (M1 in FIG. 1) and switch 108 (M4 in FIG. 1), associated with a first conducting path and a second pair of switches, switch 106 (M3 in FIG. 1) and switch 104 (M2 in FIG. 1), associated with a second conducting path, which can be connected to a power source 110 (e.g., AC power source) that can produce a desired input voltage signal. In an aspect, to facilitate emulating the turn-on and turn-off conditions of a diode, a switch of the first pair of switches, switch 102 and/or switch 108, can be turned on (e.g., placed in or transitioned to an on state) when the voltage across the particular switch is forward-biased, and a switch of the second pair of switches, switch 106 and/or switch 104, can be turned off (e.g., placed in or transitioned to an off state) when the switch current is reversed (e.g., similar to diode current reverse recovery). Thus, to facilitate emulating the turn-on and turn-off conditions of a diode, there can be at least one current-controlled self-driven (CCSD) switch (e.g., switch 106, switch 108) in each of current path of the circuit of the synchronous rectifier (e.g., the equivalent diode-bridge circuit). For instance, in system 100, switch 106 and switch 108 can be CCSD switches that each can be respectively controlled by sensing the current through such switch and can be turned or switched to the off state whenever the current sensed across such switch is reversed. The combined actions of the switch (e.g., MOSFET) and its body diode can provide such diode functions as more fully disclosed herein. In an aspect, it can be desirable for each current path to contain at least one CCSD switch to ensure automatic turn off of the switch at desired switching times, wherein, for example, the CCSD switch can emulate a diode turning off after current reverse recovery. In another aspect, switch 102 and switch 104 can be voltage-controlled self-driven (VCSD) switches that each can be turned to the on state when such switch is forward-biased in the same way as when the bridge is connected to a pure resistive load. With a current sensing circuitry, a VCSD switch does not have the emulated diode turn-off mechanism. However, it can be lower in cost when compared with a CCSD switch. As long as each current loop has one CCSD switch, such CCSD switch can turn off and cut off the current in the current loop like a power diode. Thus, the current in the VCSD switch in the same current loop will be cut off when the CCSD switch turns off. However, it is to be appreciated and understood that, in accordance with other embodiments, the switches 102 and/or 104 also can be CCSD switches, instead of VCSD switches. In accordance with an embodiment, one or more of the switches 102, 104, 106, and/or 108 can be MOSFETs (e.g., power MOSFETs). For example, switch 102 and/or 104, which can be VCSD switches, can be n-type enhancement power MOSFETs.

In another aspect, the system 100 can comprise a self-driven gate-drive (SDGD) subsystem, which can comprise SDGD components 112 (also referred to as $GR_1$ in FIG. 1), 114 (also referred to as $GR_2$ in FIG. 1), 116 (also referred to as $GR_3$ in FIG. 1), and 118 (also referred to as $GR_4$ in FIG. 1), which can be respectively associated with (e.g., electrically connected to) switch 102, switch 104, switch 106, and switch 108 to facilitate controlling switching of the switch components 102, 104, 106, and 108 at respective desired times to facilitate rectifying the input signal (e.g., AC power signal) and producing the rectified output signal (e.g., DC signal). The SDGD subsystem can include desired components, including transistors, capacitors, diodes, resistors, and associated circuitry, etc., in accordance with a desired circuit design, such as more fully described herein to facilitate controlling switching of the switches 102, 104, 106, and 108. In still another aspect, to facilitate desired switching in order to emulate the rectification of a diode bridge, including at initial start-up of the SDGD subsystem, the system 100 can be structured such that bridge-rectifier type functionality is inherent in the SDSR to facilitate controlling switching of switch 102 and switch 104 so that switch 102 and switch 104 will not switch to an undesired state (e.g., on state) before the SDGD subsystem has been set up (e.g., set to and operating in a desired operating state). For instance, the switches 102, 104, 106, and 108 can respectively comprise body diodes 120, 122, 124, and 126, wherein the arrangement of the switches 102, 104, 106, and 108, and thus, the body diodes 120, 122, 124, and 126 in the circuit can be such that the body diodes 120, 122, 124, and 126 can be structured and can function as a bridge-rectifier, including during initial start-up of the SDSR (e.g., prior to the rectified DC voltage providing at least a portion of the desired power to the switches of the SDSR).

In an aspect, the SDGD subsystem can operate under low power (e.g., can employ components using low power), in contrast to the switches 102 through 108, which can be power devices. In an embodiment, the SDGD subsystem, or at least a desired portion thereof, can be formed as an integrated circuit. In another aspect, the SDGD subsystem can comprise a high-side portion, which can include SDGD component 112 and SDGD component 114, and a low-side portion, which can include SDGD component 116 and SDGD component 118, wherein the high-side portion and the low-side portion can be symmetrical. Thus, the synchronous rectifier of system 100 can be a self-driven synchronous rectifier (SDSR), wherein the switches 102, 104, 106, and 108, with the associated SDGD subsystem, can form, emulate, and/or function as a diode bridge, but with significant reduction in conduction loss as compared to conventional diode bridges or synchronous rectifiers.

Figure 2:
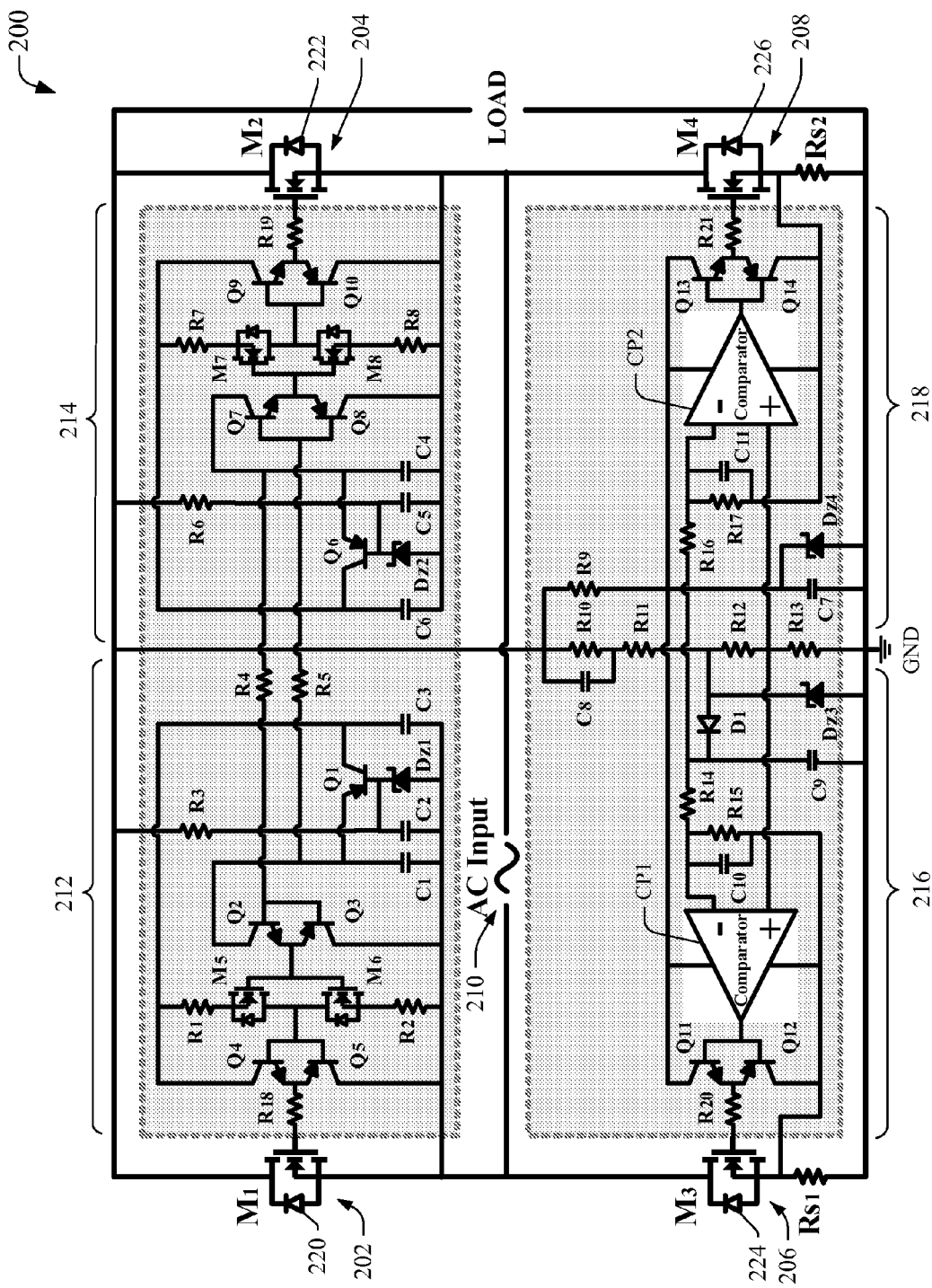
FIG. 2 depicts a diagram of an example system that can synchronously rectify a received signal (e.g., power signal) in accordance with various embodiments and aspects.

Referring to FIG. 2, illustrated is a circuit diagram of an example system 200 that can synchronously rectify a received signal (e.g., power signal) in accordance with various embodiments and aspects. The system 200 can be or can comprise a SDSR that can form, emulate, and/or function as a diode bridge, but with significant reduction in conduction loss as compared to conventional diode bridges or synchronous rectifiers. In accordance with an aspect, the system 200 can comprise switch 202 (M1 in FIG. 2) and switch 208 (M4 in FIG. 2), which can be associated with a first conducting path, and switch 206 (M3 in FIG. 2) and switch 204 (M2 in FIG. 2), which can be associated with a second conducting path, wherein the first conducting path and second conducting path can be connected to a power source 210 (e.g., AC power source) that can produce a desired input power signal. The system 200 also can include an SDGD subsystem that can comprise SDGD components 212, 214, 216, and 218, which can be respectively associated with (e.g., electrically connected to) switch 202, switch 204, switch 206, and switch 208, to facilitate controlling switching of the respective switches in response to the input voltage signal. In another aspect, switch 202 can include body diode 220, switch 204 can include body diode 222, switch 206 can include body diode 224, and switch 208 can include body diode 226, wherein the arrangement of the switches 202, 204, 206, and 208, and thus, the body diodes 220, 222, 224, and 226 in the circuit can be such that the body diodes 220, 222, 224, and 226 can be structured and can inherently function as a bridge-rectifier, including during initial start-up of the SDSR (e.g., prior to the rectified DC voltage providing at least a portion of the desired power to the switches of the SDSR). Switch 202, switch 204, switch 206, switch 208, power source 210, the SDGD subsystem, SDGD component 212, SDGD component 214, SDGD component 216, SDGD component 218, body diode 220, body diode 222, body diode 224, and body diode 226, each can be the same or substantially the same as, and can include the same or similar functionality as, respective components (e.g., respectively named components), such as more fully described herein, for example, with regard to system 100.

In accordance with an aspect, the switches 202, 204, 206, and/or 208 can be power switches (e.g., power MOSFETs). In another aspect, the switch 202 and switch 204 can be VCSD switches (e.g., n-type enhancement power MOSFETs) that each can be turned to the on state when such switch is forward-biased, and the switch 206 and switch 208 can be CCSD switches that each can be respectively controlled by sensing the current through such switch and can be turned or switched to the off state whenever the current sensed across such switch is reversed. While switch 202 and switch 204 are VCSD switches in the above embodiment, it is to be appreciated and understood that, in accordance with other embodiments, the switches 202 and/or 204 also can be CCSD switches, instead of VCSD switches.

In another aspect, the SDGD components 212, 214, 216, and 218 each can respectively be and/or can comprise low power components, as compared to the switches 202 through 208, which can be power devices. In an embodiment, the SDGD components 212, 214, 216, and 218, or a desired portion thereof, can be formed as an integrated circuit. In still another aspect, the SDGD component 212 and SDGD component 214 can be included in a high-side portion of the SDGD subsystem, and SDGD component 216 and SDGD component 218 can be included in a low-side portion of the SDGD subsystem, wherein the high-side portion and low-side portion can be symmetrical. In yet another aspect, the circuitry of the SDGD component 216 and SDGD component 218 can be grounded with the power circuits (e.g., circuitry associated with the power switches) and the power supplies for the SDGD component 216 and SDGD component 218 can be derived (e.g., obtained) from the output DC voltage from the synchronous rectifier of system 200.

In accordance with an embodiment, with regard to the high-side portion of the SDGD subsystem, each of SDGD component 212 and SDGD component 214 can respectively comprise three capacitors have respective desired capacitance values, wherein SDGD component 212 can comprise capacitors (C), $C_1$ (e.g., 470.0 nano-Farads (nF)), $C_2$ (e.g., 11.0 µF), and $C_3$ (e.g., 2.2 µF), and SDGD component 214 can comprise capacitors, $C_4$ (e.g., 470.0 nF), $C_5$ (e.g., 11.0 µF), and $C_6$ (e.g., 2.2 µF). Each of SDGD component 212 and SDGD component 214 (e.g., each upper gate drive) can include three driving stages. For example, the SDGD component 212, which is associated with switch 202, can comprise, for example, transistor $Q_2$ and transistor $Q_3$, switch $M_5$ and switch $M_6$, and transistor $Q_4$ and transistor $Q_5$, which can form the three driving stages. Transistors $Q_2$ and $Q_3$ can be employed for signal amplifying and providing a charging path for the power supplies of the driving circuit of switch 204 ($M_2$), switches $M_5$ and $M_6$ can form an inverter, and transistors $Q_4$ and $Q_5$, which can be associated with resistor $R_{18}$ (e.g., 10.0Ω), can be employed for desirably fast driving of the switch 202 (e.g., power MOSFET M1). Similarly, the SDGD component 214, which is associated with switch 204, can comprise, for example, transistor $Q_7$ and transistor $Q_8$, switch $M_7$ and switch $M_8$, and transistor $Q_9$ and transistor $Q_{10}$, which can form the three driving stages. Transistors $Q_7$ and $Q_8$ can be employed for signal amplifying and providing a charging path for the power supplies of the driving circuit of switch 202 ($M_1$), switches $M_7$ and $M_8$, which can be respectively connected to $R_7$ (e.g., 5.1 kΩ) and $R_8$ (e.g., 5.1 kΩ), can form an inverter, and transistors $Q_9$ and $Q_{10}$, which can be associated with resistor $R_{19}$ (e.g., 10.0Ω), can be employed for desirably fast driving of the switch 202.

In an aspect, capacitors $C_1$ and $C_4$ can be charged up as the power supplies of the first-stage driving pair. Before capacitors $C_1$ and $C_4$ have been charged up to a certain predefined threshold voltage (e.g., 10V), the respective driving logic in the respective circuits of the respective SDGD 212 and SDGD 214 will not be ready to operate in the desired steady state. Capacitors $C_3$ and $C_6$ can be charged as the power supplies for driving switch 202 and switch 206, respectively. During the start-up stage, the capacitors $C_2$ and $C_5$, which respectively can be associated with (e.g., connected to) $R_3$ (e.g., 50.0 MΩ) and $R_6$ (e.g., 50.0 MΩ), can be designed (e.g., can have desired capacitance values) to be charged up quicker than capacitors $C_1$ and $C_4$, until the capacitors $C_2$ and $C_5$ reach a certain defined voltage, which can be determined by the zener diodes $D_{Z1}$ and $D_{Z2}$, respectively, contained in the SDGD component 212 and SDGD component 214. In an aspect, the bipolar transistors $Q_1$ and $Q_6$ can be used to facilitate ensuring the capacitors $C_3$ and $C_6$ will not be charged before capacitors $C_1$ and $C_4$ have been charged up to a voltage higher than the voltage of capacitors $C_2$ and $C_5$. Therefore, as a result, the switch 202 and switch 204 will not switch before the respective driving logic of the SDGD component 212 and SDGD component 214 has been set up to operate in normal operating state (e.g., steady state operation).

In an aspect, the capacitors $C_1$ and $C_4$ can be charged and discharged at line frequency. For instance, the capacitors $C_1$ and $C_4$ can be charged up to a defined voltage $V_1$ (e.g., approximately 13.0 volts (V)) in every charging period and can be discharged to a different defined voltage $V_2$ (e.g., approximately 12.0 V), which can be a relatively lower voltage than voltage $V_1$, after each discharging period.

Figure 3A:
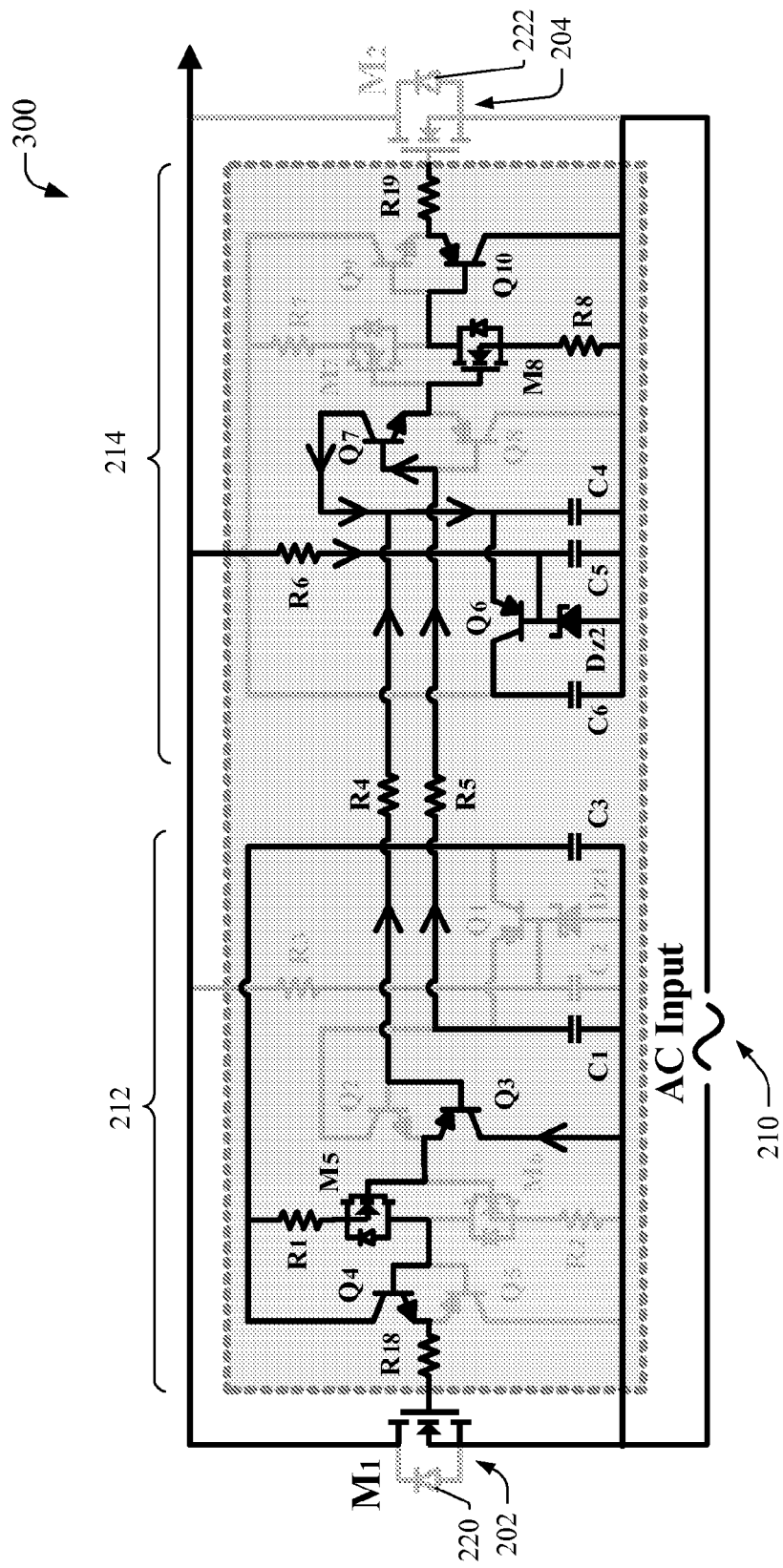
FIGS. 3A through 3I illustrate diagrams of operation, in relation to time, of an example system comprising the high-side gate-drives associated with a single-phase synchronous rectifier, in accordance with various aspects of the disclosed subject matter.

Referring briefly to FIGS. 3A through 3I (along with FIG. 2), FIGS. 3A through 3I depict diagrams of operation, in relation to time, of an example system 300, which is a portion of the system 200 comprising the high-side gate-drives (e.g., SDGD component 212 and SDGD component 214) to facilitate demonstrating operation of the high-side gate drives over time in an aspect of the disclosed subject matter. Referring to FIG. 3A, illustrated is operation of the system 300 (and the system 200 and FIG. 2) during a time prior to time $t_1$. With regard to system 300, the respective voltages, $v_{BC3}$ and $v_{BC8}$, can represent the base-collector voltages of the transistors $Q_3$ and $Q_8$ (e.g., bipolar junction transistors (BJT)), respectively. At a time before time $t_1$, the input voltage signal, $v_{in}$, can be at a higher voltage level than voltage $V_1$. At this point in time, both the current directions in resistors $R_4$ (e.g., 1.3 MΩ) and $R_5$ (e.g., 1.3 MΩ) can be from left to right as illustrated in FIG. 3A. The voltage $v_{BC3}$ can be clamped to zero voltage, or at least substantially close to a zero voltage, by a p-n junction between the collector and base of the transistor $Q_3$. As a result, the switch $M_5$ (e.g., p-channel MOSFET) can be turned or switched to an on state and the switch $M_6$ (e.g., the n-channel MOSFET) can be turned or switched to an off state, and such condition can maintain the gate-source voltage of the switch 202 at high level, which can thereby turn or switch the switch 202 to an on state. Meanwhile, with regard to the SDGD component 214, the current flowing through the resistor $R_5$ can flow through the p-n junction between the base and collector of the transistor $Q_7$, which can clamp the voltage $v_{BC8}$ to voltage $V_1$. As a result, the switch $M_7$ can be turned or switched to an off state and the switch $M_8$ can be turned or switched to an on state to maintain the gate-source voltage of the switch 204 at a low level, which can thereby turn or switch the switch 204 to an off state.

Figure 3B:
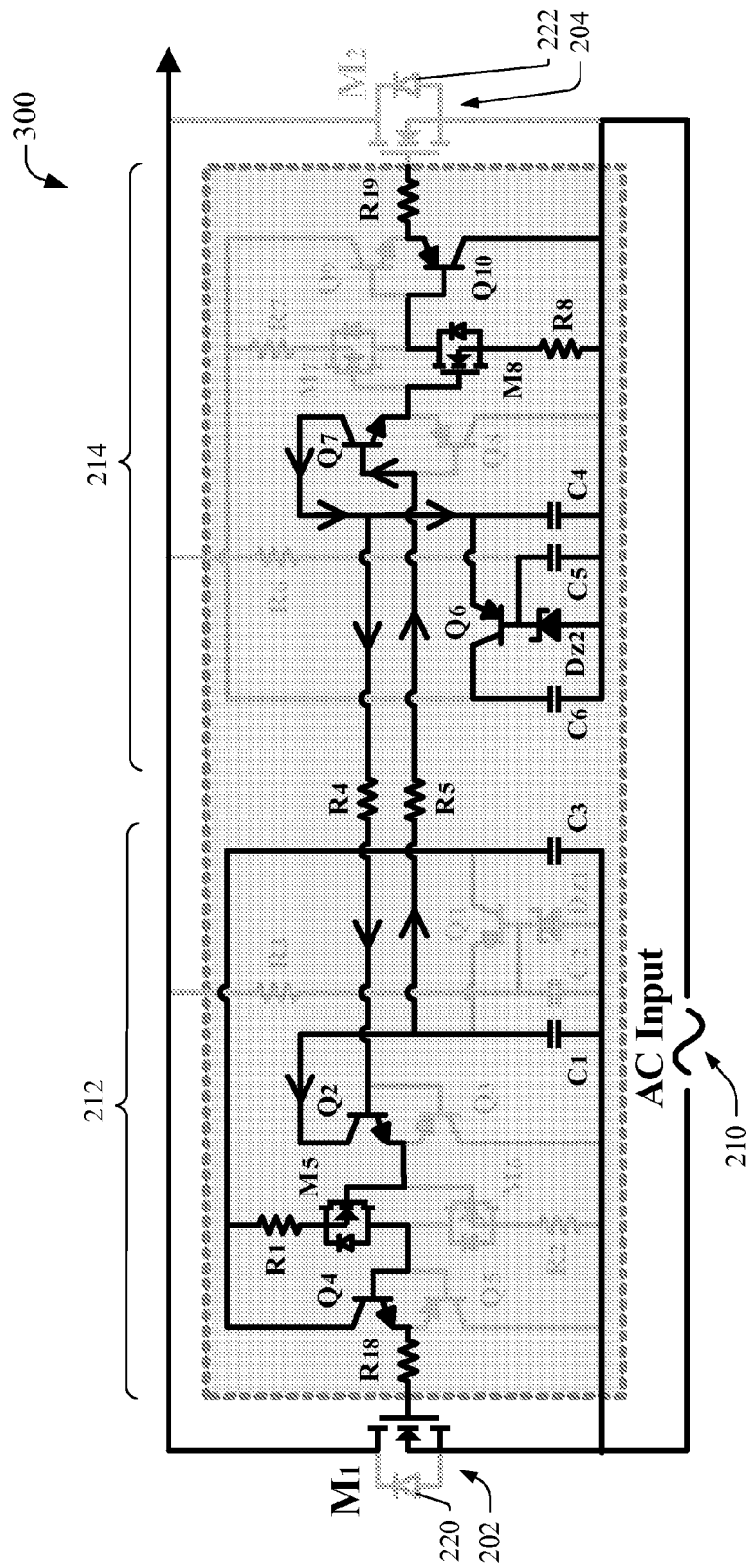

Turning to FIG. 3B, depicted is operation of the system 300 during the time period of time $t_1$ to time $t_2$, when the input voltage signal, $v_{in}$, becomes a lower voltage level than the voltage $V_1$ after time $t_1$, the current in the resistor $R_4$ can change its direction. Consequently, the transistor $Q_2$ can be turned to an on state, and the transistor $Q_3$ can be turned to an off state. The voltage $v_{BC3}$ can begin to increase from a zero voltage level. At or near the end of this time interval (e.g., time period of $t_1$ to time $t_2$), the voltage $v_{BC3}$ can reach (e.g., increase to) the predefined gate threshold switching voltage of the switch $M_6$.

Figure 3C:
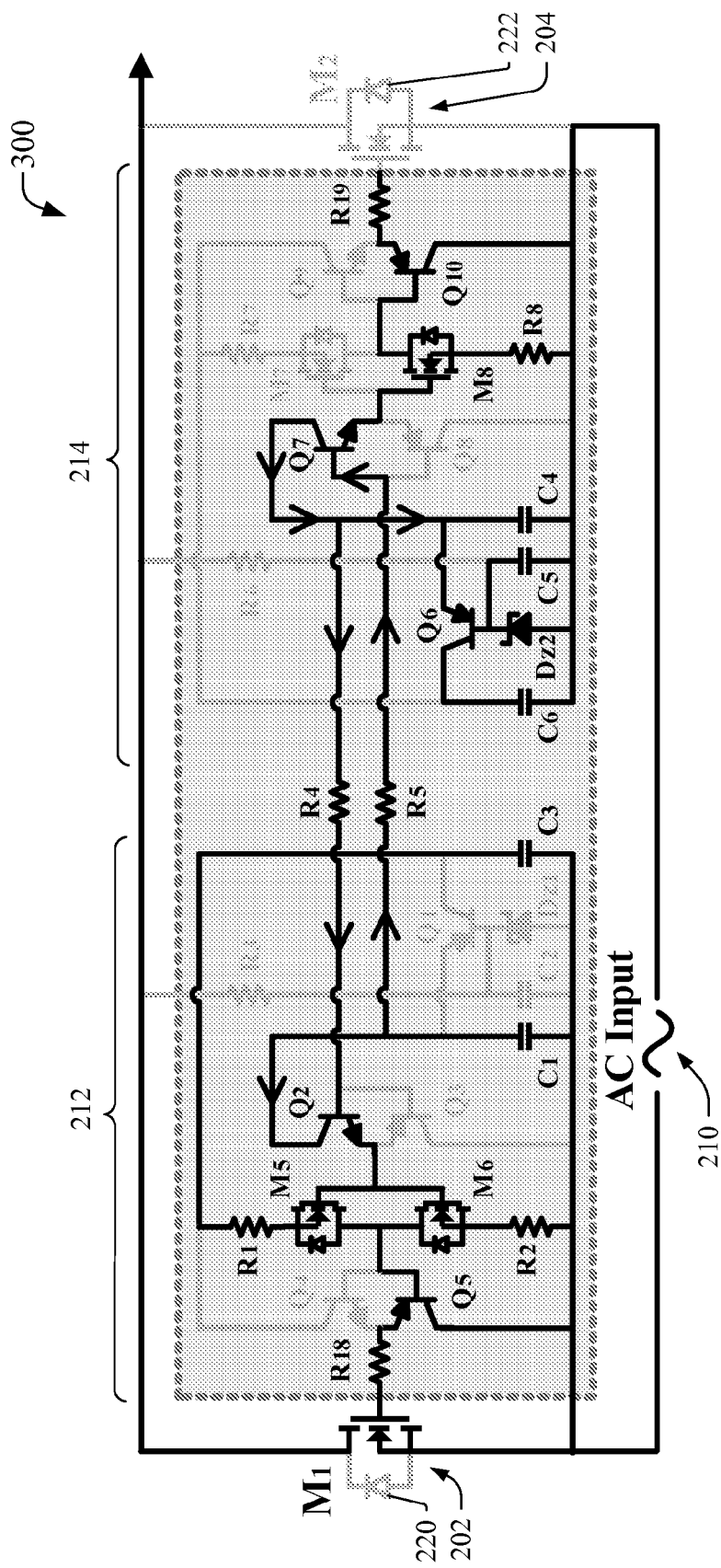

Referring to FIG. 3C, illustrated is operation of the system 300 during the time period of time $t_2$ to time $t_3$, when the voltage $v_{BC3}$ can reach the applicable predefined gate threshold switching voltage for switch $M_6$, the switch $M_6$ can begin to conduct at or near time $t_2$. The voltage $v_{GS1}$ can begin to decrease from a high voltage level. The voltage $V_{BC3}$ can continue increasing in voltage. Before the voltage $V_{BC3}$ reaches the defined threshold switching voltage for the switch $M_5$ to switch to an off state at time $t_3$, switch $M_5$ and switch $M_6$ can conduct simultaneously, such as is illustrated in FIG. 3C. Within the time interval of time $t_2$ to time $t_3$, the voltage $v_{GS1}$ can drop down in voltage level to the predefined gate threshold switching voltage of the switch 202 ($M_1$), the timing of which can be at least in part controlled by the ratio of the resistance values of resistors $R_1$ (e.g., 5.1 kΩ) and $R_2$ (e.g., 5.1 kΩ). The time interval can end at time $t_3$, when the voltage $v_{GS1}$ drops in voltage level to at or substantially near a zero voltage level and the switch 202 is switched to an off state.

Figure 3D:
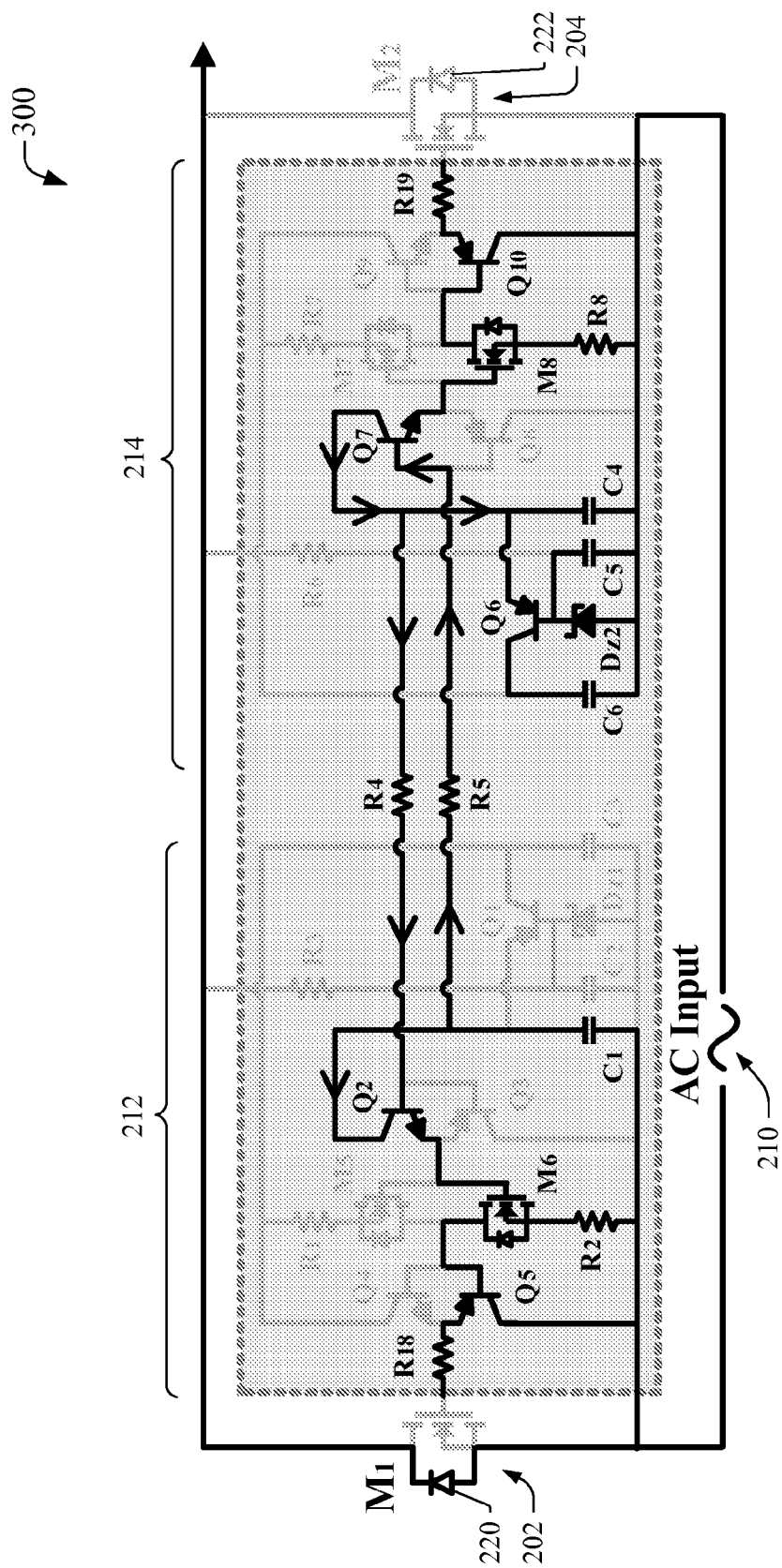

Turning to FIG. 3D, illustrated is operation of the system 300 during the time period of time $t_3$ to time $t_4$, the switch $M_5$ can be switched to an off state at or near time $t_3$ and the switch $M_6$ can remain in an on state to maintain the switch 202 in an off state. Current can flow through the source drain diode of the switch 202.

Figure 3E:
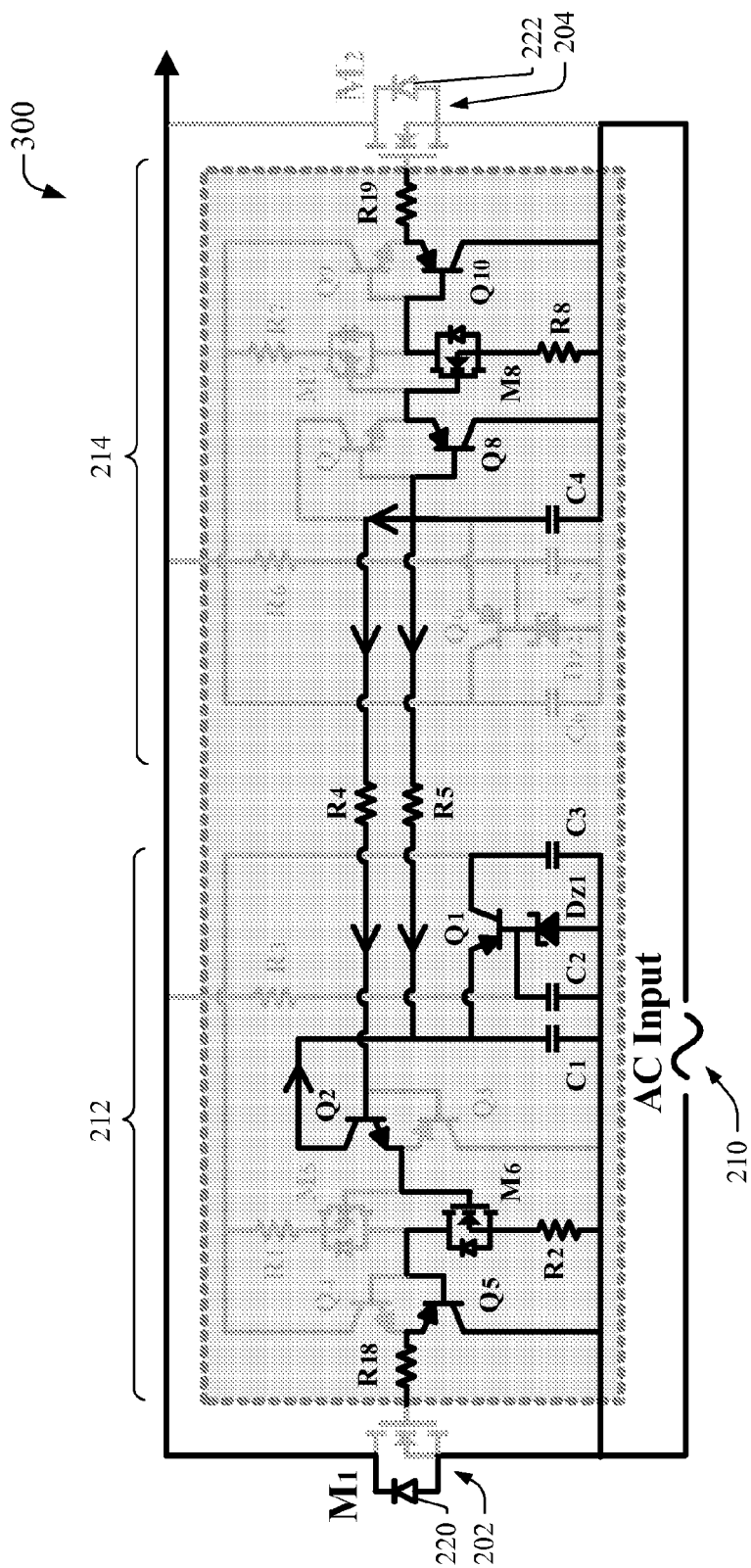

With regard to FIG. 3E, exemplified is operation of the system 300 during the time period of time $t_4$ to time $t_0$, when the input voltage $v_{in}$ is at a lower voltage level than the voltage of $V_1$-$V_2$ after time $t_4$, the current in the resistor $R_5$ can change direction. The voltage $v_{BC8}$ can begin to decrease from voltage $V_1$, which can indicate that the transistor $Q_7$ is turned to an off state and the transistor $Q_8$ can be switched to an on state. While at or near time $t_4$, the voltage $v_{BC3}$ can reach the voltage $V_2$ and can be clamped to the voltage of the capacitor $C_3$ by the p-n junction between the base and collector of the transistor $Q_2$.

Figure 3F:
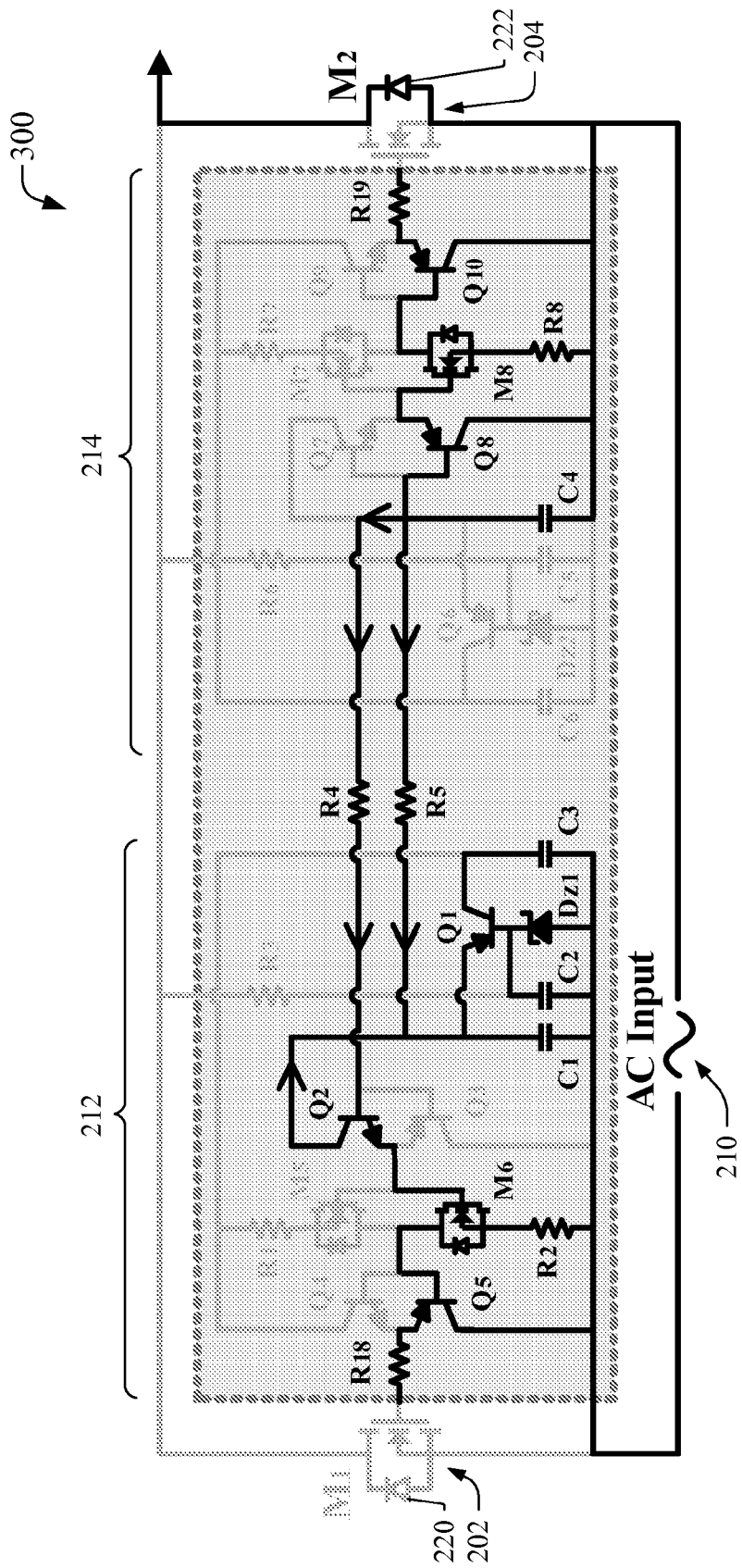

FIG. 3F presents operation of the system 300 during the time period of time $t_0$ to time $t_5$, because the voltage level $V_1$-$V_2$ is a positive value, the input voltage $v_{in}$ can commutate at or near time $t_0$, which can occur after time $t_4$. At or near time $t_0$, the source drain diode of the switch 202 can begin in an off state and the source drain diode of the switch 204 can begin to conduct naturally, for example, as illustrated in FIG. 3F. The time interval $t_0$ to time $t_5$ can end, for instance, when the voltage $v_{BC8}$ drops down in voltage level to the defined threshold switching voltage for the switch $M_7$ to switch to an on state.

Figure 3G:
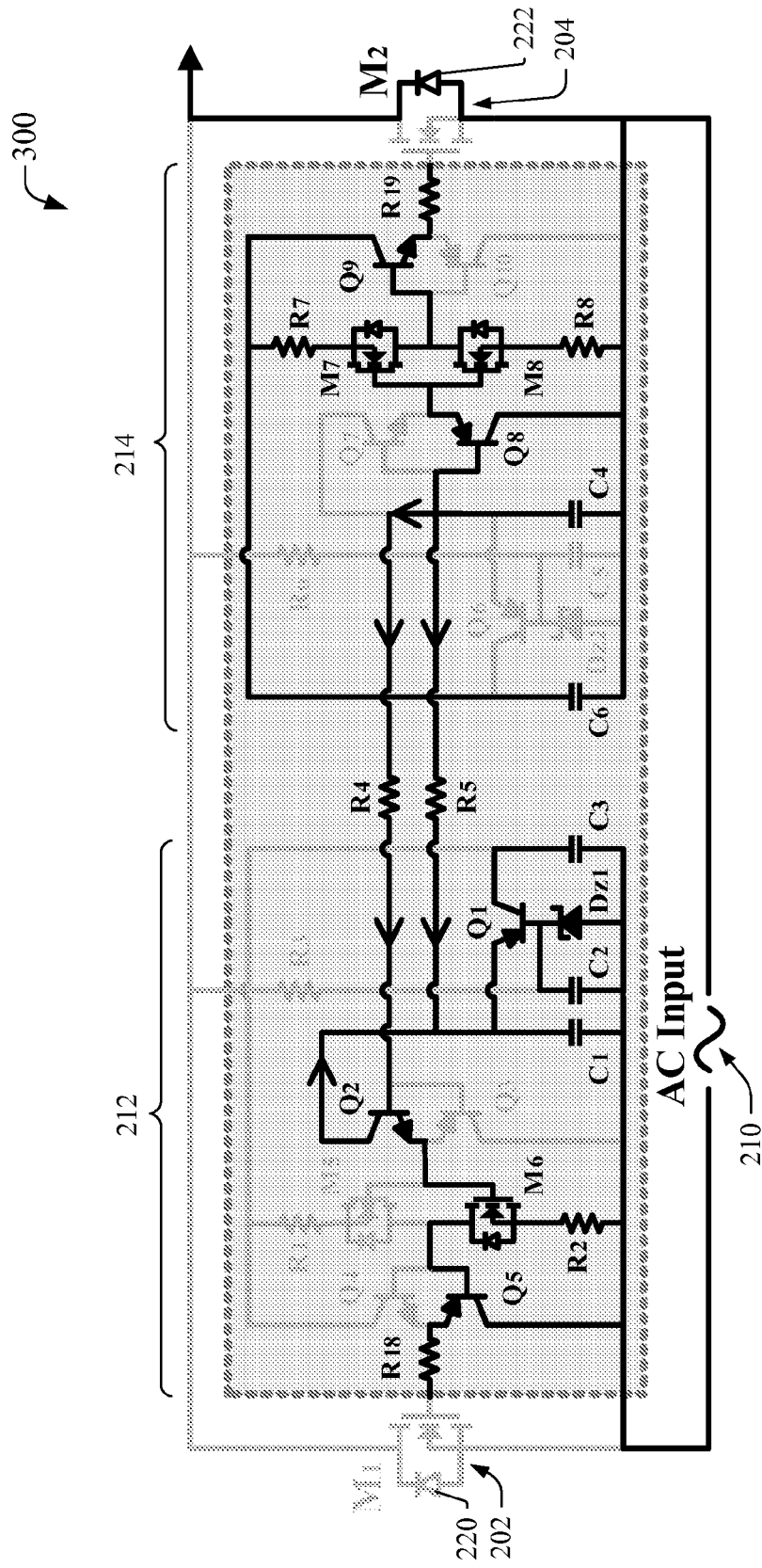

Turning to FIG. 3G, depicted is operation of the system 300 during the time period of time $t_5$ to time $t_6$, at or near time $t_5$, the voltage $v_{BC8}$ can drop below the defined threshold switching voltage for the switch $M_7$ to switch to an on state, the switch $M_7$ can switch from an off state to an on state and can begin to conduct, and the voltage $v_{BC8}$ can continue decreasing in voltage. Before the voltage $v_{BC8}$ drops down in voltage level to the defined gate threshold switching voltage of the switch $M_8$, which can occur at or near time $t_6$, switch $M_7$ and switch $M_8$ can conduct simultaneously. At or near the end of the time interval, time $t_5$ to time $t_6$, the voltage $V_{GS2}$ can reach a defined high level and the switch 204 can be turned from an off state to an on state.

Figure 3H:
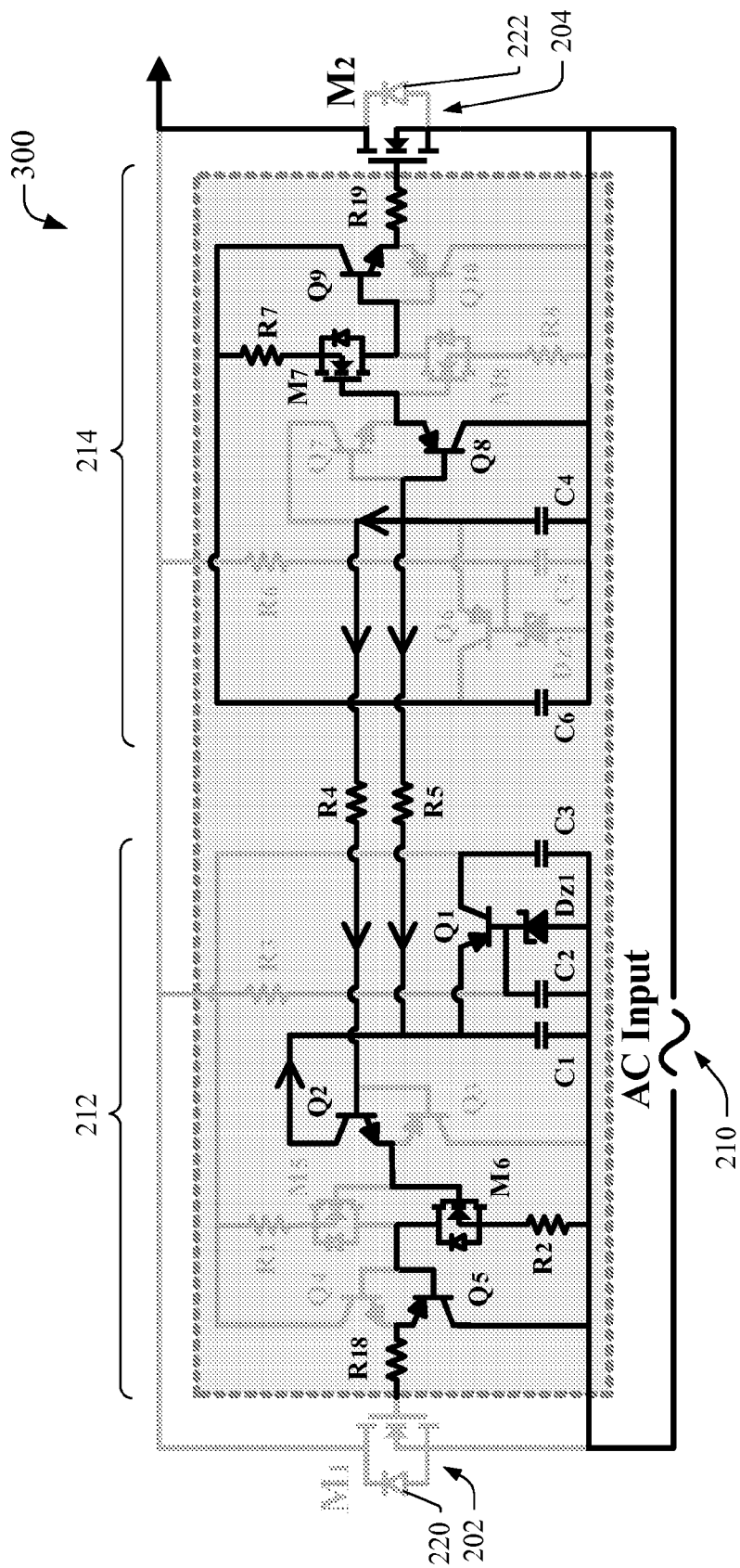

With regard to FIG. 3H, illustrated is operation of the system 300 during the time period of time $t_6$ to time $t_7$, at or near time $t_6$, the voltage $v_{BC8}$ can drop down below the defined gate threshold switching voltage of the switch $M_8$, and the switch $M_8$ can be switched to from an on state to an off state, and the voltage $v_{BC8}$ can continue to decrease in voltage level. The time interval of time $t_6$ to time $t_7$ can end, for example, when the voltage $v_{BC8}$ reaches, or is substantially close to, a zero voltage level.

Figure 3I:
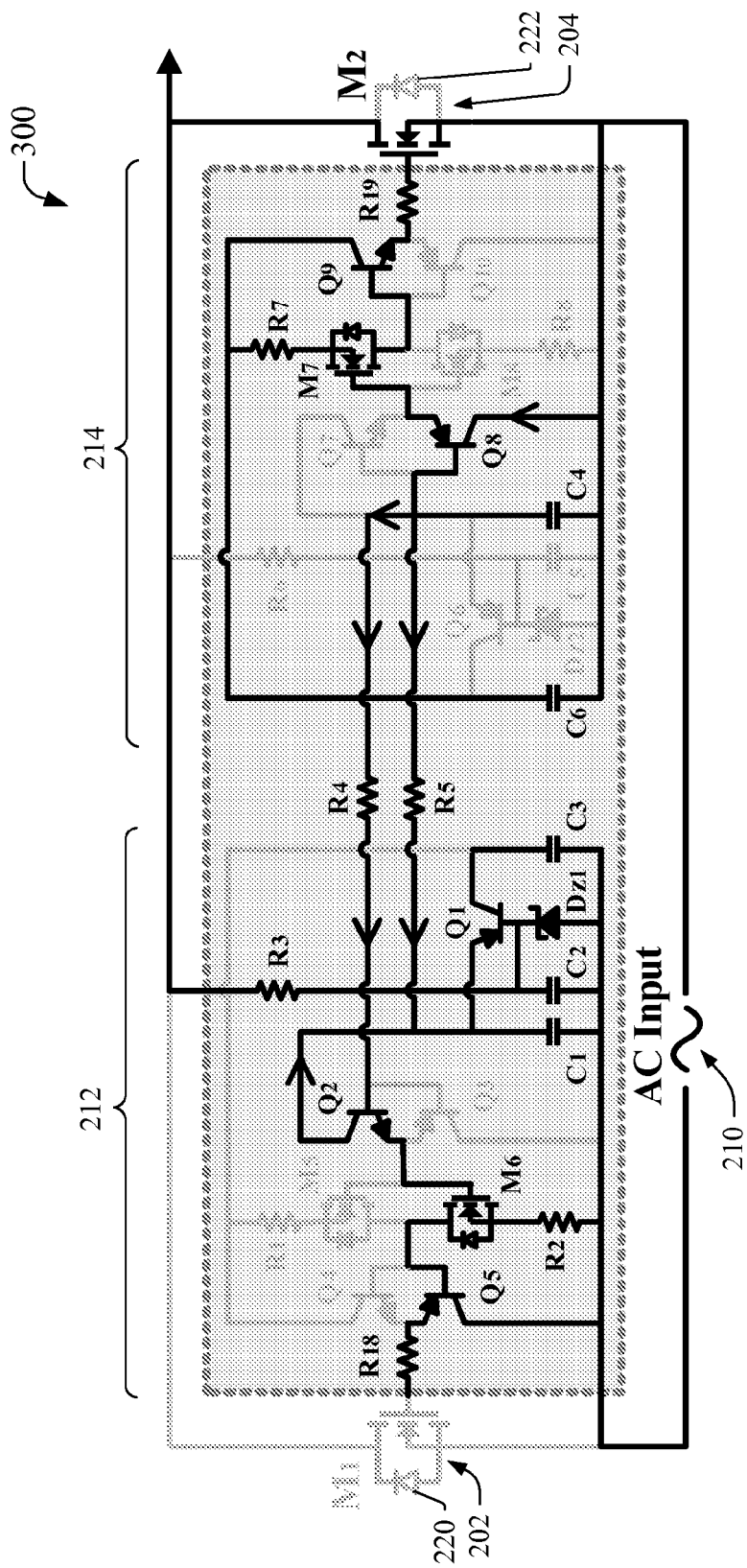

FIG. 3I presents operation of the system 300 during the time period after time $t_7$, the voltage $v_{in}$ can be at a lower voltage level than $-V_2$. The voltage $v_{BC8}$ can be clamped to at or near a zero voltage by the p-n junction between the collector and base of the transistor $Q_8$.

Figure 4:
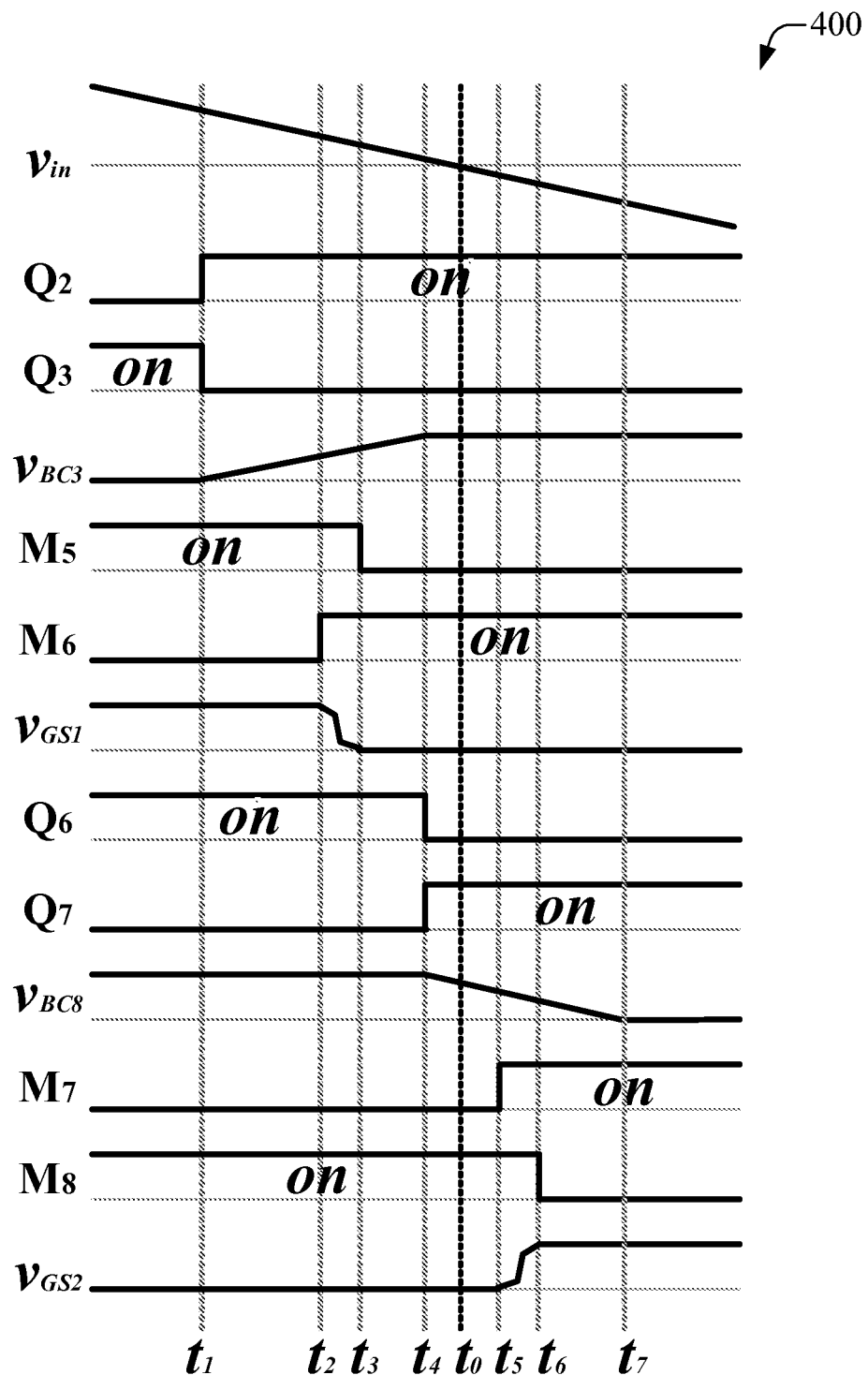
FIG. 4 depicts an example timing diagram relating to respective states of certain components of a synchronous rectifier over time in accordance with an aspect.

Referring to FIG. 4 (along with FIGS. 2 and 3A through 3I), depicted is an example timing diagram 400 relating to respective states of certain components of a synchronous rectifier over time in accordance with an aspect. The timing diagram 400 shows, with regard to the system 200 and system 300, for given times ranging from before time $t_1$ through after time $t_7$, the respective states of various components, including, for example, transistor $Q_2$, transistor $Q_3$, switch $M_5$, switch $M_6$, transistor $Q_6$, transistor $Q_7$, switch $M_7$, and switch $M_8$, and the levels of respective voltages, including $v_{in}$, $v_{BC3}$, $v_{GS1}$, $v_{BC8}$, and $V_{GS2}$.

Figure 5:
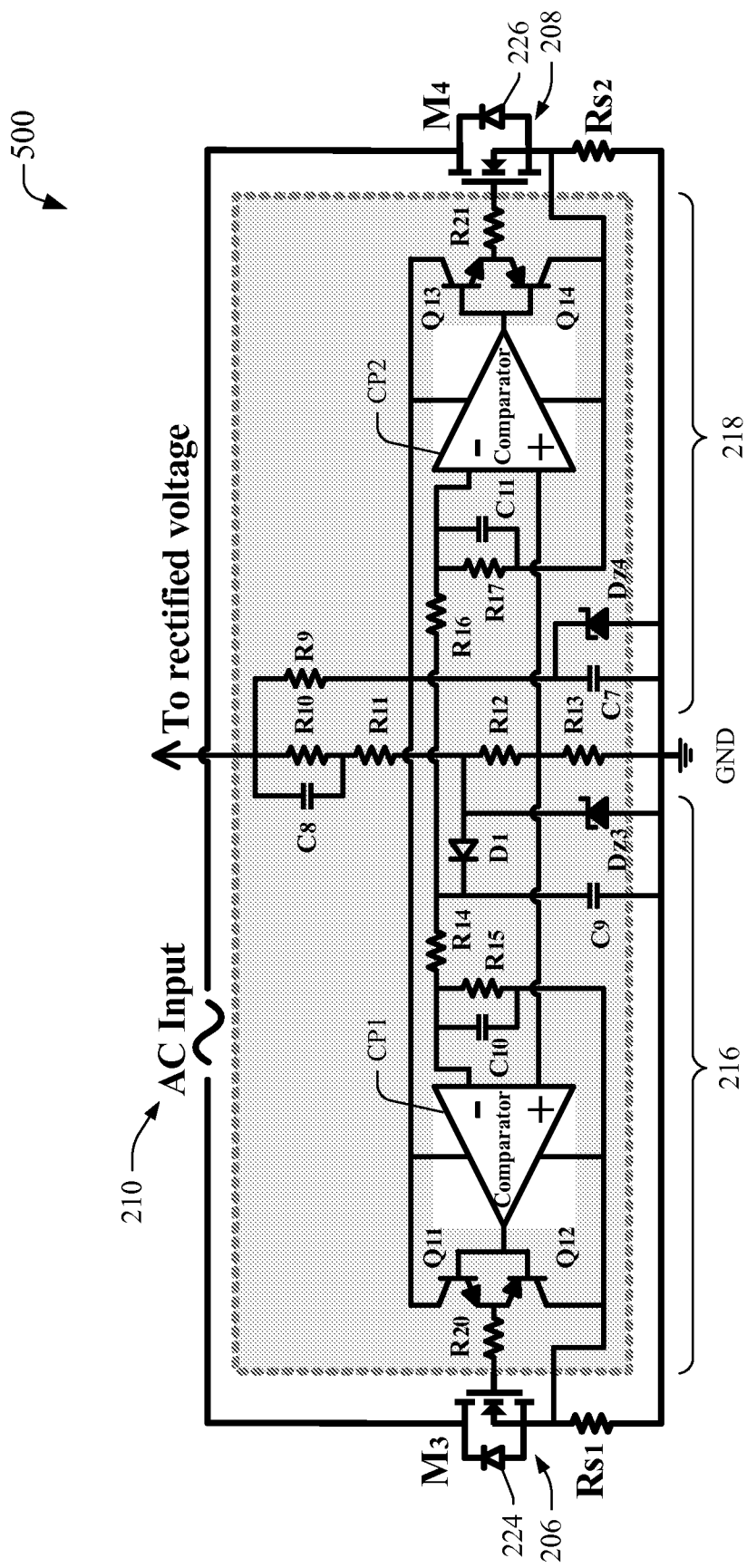
FIG. 5 depicts an example system comprising a low-side portion of the self-driven gate-drive (SDGD) subsystem in accordance with an embodiment.

Referring to FIG. 5 (along with FIG. 2), illustrated is a diagram of an example system 500 comprising a low-side portion of the SDGD subsystem in accordance with an embodiment. The low-side portion of the SDGD subsystem can include the SDGD component 216 and SDGD component 218. In an aspect, the SDGD component 216 can be associated with and can facilitate controlling the switch 206 (M3) (e.g., CCSD MOSFET), and the SDGD component 218 can be associated with and can facilitate controlling the switch 208 (M4) (e.g., CCSD MOSFET).

In an aspect, current sensing resistors, $R_{S1}$ (e.g., 2.0 mΩ) and $R_{S2}$ (e.g., 2.0 mΩ), and the respective comparators $CP_1$ and $CP_2$ can be respectively associated with switch 206 and switch 208, wherein the resistors, $R_{S1}$ and $R_{S2}$, and the respective comparators $CP_1$ and $CP_2$ can be used to detect the currents in the respective switches 206 and 208, and can drive the respective switches 206 and 208. In an embodiment, if desired, respective on-state resistors (not shown) of the respective switches 206 and 208 also can be used to replace the sensing resistors, $R_{S1}$ and $R_{S2}$, respectively, in SDGD component 216 and SDGD component 218.

In another aspect, in system 500, the capacitor $C_9$ (e.g., 220.0 nF) can be used to provide a positive voltage for the inverting inputs of the comparators $CP_1$ and $CP_2$, which can provide a safe margin set by the potential divider, comprising resistors $R_{14}$ (e.g., 4.7 MΩ), $R_{15}$ (e.g., 24.0 kΩ), $R_{16}$ (e.g., 4.7 MΩ), and $R_{17}$ (e.g., 24.0 kΩ), which can be respectively associated with capacitors $C_{10}$ (e.g., 470.0 nF) and $C_{11}$ (e.g., 470.0 nF) in the circuit of system 500 (and system 200). The voltage of the capacitor $C_7$ (e.g., 3.3 µF), which can be stabilized by the zener diode $D_{Z4}$, can be the power supply for the comparators $CP_1$ and $CP_2$. The capacitor $C_9$ can be charged up to the desired designated voltage before the voltage of the capacitor $C_7$ reaches a voltage level that is at a sufficiently high level for the comparators $CP_1$ and $CP_2$ to become operational (e.g., to drive the comparators $CP_1$ and $CP_2$). The output of comparator $CP_1$ can be provided to transistors $Q_{10}$ and $Q_{11}$, which can be associated with resistor $R_{20}$ (e.g., 10.0Ω) to facilitate controlling switching of switch 206; and output of comparator $CP_2$ can be provided to transistors $Q_{13}$ and $Q_{14}$, which can be associated with resistor $R_{21}$ (e.g., 10.0Ω) to facilitate controlling switching of switch 208. This circuitry of system 500 can facilitate ensuring that switch 206 and switch 208 (e.g., low-side MOSFETs $M_3$ and $M_4$) will be switched (e.g., from a first or an off state to a second or an on state) only when the proper logic control of the system 400 (e.g., and corresponding portion of system 200) is in a desired operational state (e.g., steady state).

Figure 6A:
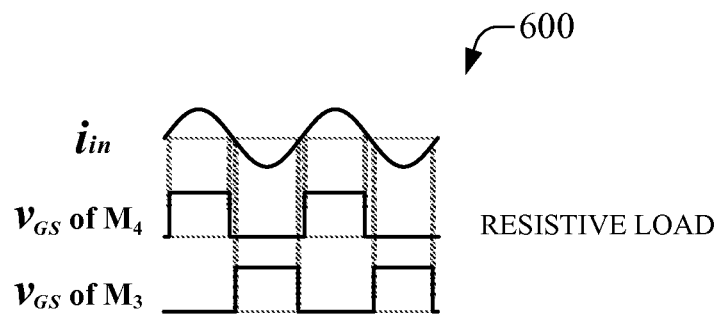
FIG. 6 illustrates a diagram of example driving waveforms in accordance with an aspect.
Figure 6B:
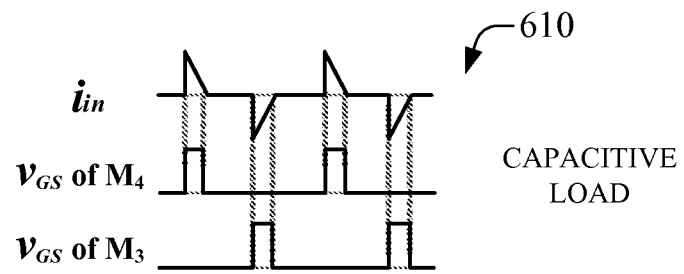
Figure 6C:
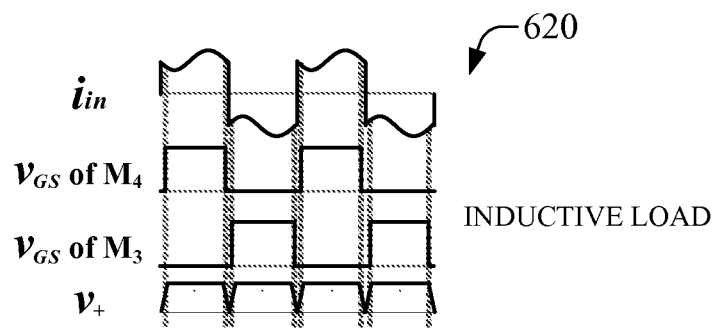

In an aspect, the self-driven synchronous rectifier of system 200 is designed to manage resistive, capacitive, and/or inductive loads. Referring briefly to FIGS. 6A, 6B, and 6C (along with FIG. 2), illustrated diagrams of example (e.g., typical) driving waveforms associated with the low-side portion of the SDGD subsystem in relation to different types of loads associated with (e.g., connected to) the SDGD subsystem, in accordance with an aspect. In FIGS. 6A, 6B, and 6C, $i_{in}$ is the input current having the same polarity of $v_{in}$. FIG. 6A depicts a diagram of an example driving waveform 600 associated with the low-side portion of the SDGD subsystem in relation to an associated resistive load, in accordance with an aspect. FIG. 6B depicts a diagram of an example driving waveform 610 associated with the low-side portion of the SDGD subsystem in relation to an associated capacitive load, in accordance with an aspect. FIG. 6C depicts a diagram of an example driving waveform 620 associated with the low-side portion of the SDGD subsystem in relation to an associated inductive load, in accordance with an aspect.

In an aspect, when a self-driven synchronous rectifier is connected to an inductive load, the input current can commutate very quickly after every half cycle. If there is not additional circuitry (e.g., additional control circuit) to facilitate turning the comparators $CP_1$ and $CP_2$ to an off state at certain desired times (e.g., at or near a half cycle), the comparators $CP_1$ and/or $CP_2$ may not respond quickly enough to turn off switch 206 and switch 208 under such a fast current change, which can or may cause an undesirable (e.g., fatal) short circuit situation. Therefore, in accordance with an aspect, the system 200 can include additional circuitry to provide a desired relatively small positive signal to the non-inverting inputs of the comparators $CP_1$ and $CP_2$.

Figure 7:
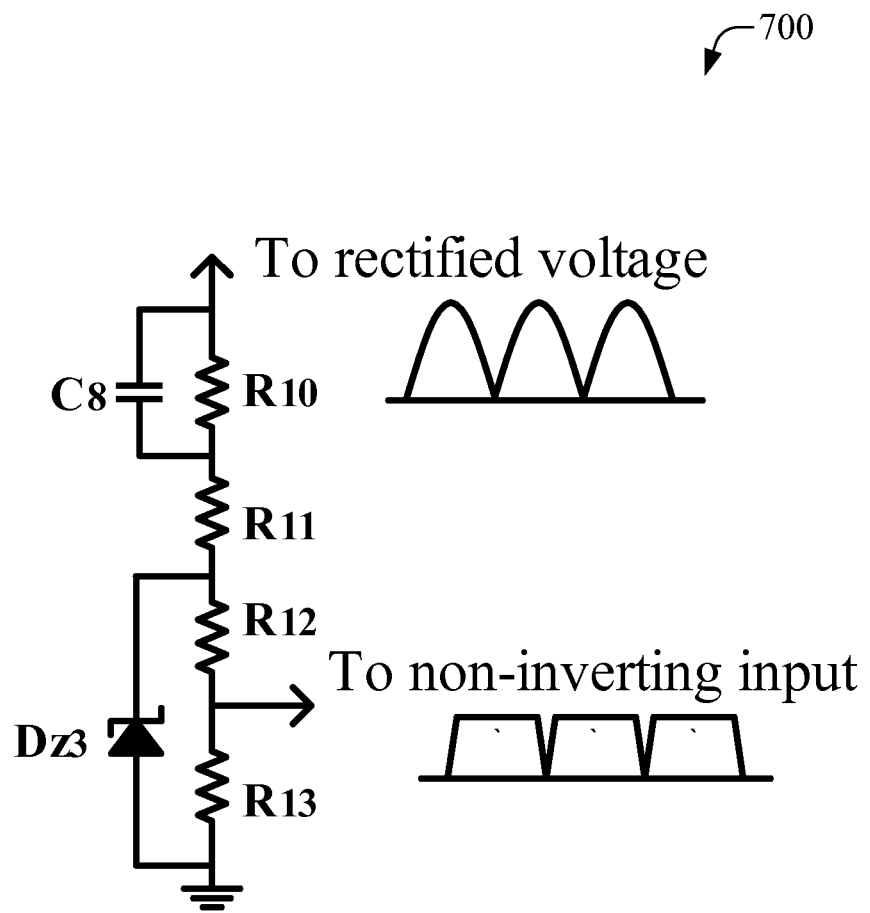
FIG. 7 depicts a diagram of an example system that can facilitate at least partially controlling operation of comparators of a synchronous rectifier at desired times in accordance with an aspect.

Referring briefly to FIG. 7 (along with FIG. 1 and FIG. 2), illustrated is a system 700 that can facilitate at least partially controlling operation (e.g., switching) of comparators $CP_1$ and $CP_2$ and associated power switches at desired times in accordance with an aspect. The desired relatively small positive signal can be generated from the rectified voltage (e.g., as illustrated in FIG. 1), and such signal can ensure or at least substantially ensure that operation of the comparators $CP_1$ and $CP_2$ can be controlled to turn switch 208 and switch 204 to an off state at or before a desired time, to facilitate preventing an undesirable (e.g., fatal) short circuit in the system 200. The system 700 (and system 200) can include a zener diode $D_{z3}$, which can have a predefined rating voltage parameter value (e.g., rating voltage at or approximately 10.0 V). When the rectified voltage begins to rise from zero voltage, the voltage of the zener diode $D_{z3}$ can rise until it reaches its predefined rating voltage. Once the zener diode $D_{z3}$ attains its predefined rating voltage, the zener diode $D_{z3}$ can maintain this voltage level with very little voltage fluctuation. In another aspect, the system 700 (and system 200) can include resistors $R_{12}$ (e.g., 10.0 MΩ) and $R_{13}$ (e.g., 43.0 kΩ) that can form a voltage divider to facilitate producing a scaled-down voltage signal with relatively reduced voltage fluctuation, wherein the scaled-down voltage signal can be provided to a diode $D_1$ associated with the comparators $CP_1$ and $CP_2$. The rising period and falling period of the scaled-down voltage signal can be slightly shaped based at least in part on the capacitance value of capacitor $C_8$ and the ratio of the respective resistance values of the resistors $R_{10}$ (e.g., 2.0 MΩ) and $R_{11}$ (e.g., 3.0 MΩ) (e.g., the ratio of $R_{10}/R_{11}$), wherein the capacitor $C_8$ and resistors $R_{10}$ and $R_{11}$ also can be associated with resistor $R_9$ (e.g., 1.0 MΩ), as shown in FIG. 7 (and FIG. 2).

The following can provide an analysis of the power loss of the disclosed SDSR and the conventional diode bridge. The power loss of the SR circuit can be expressed as:

$$P_{SR} = P_{Driver} + P_S + P_{SW}, \quad (1)$$

where, $P_{Driver}$ is the power loss of the driver of the SR circuit (not including current sensing loss); $P_S$ is the power loss of current sensing resistors; $P_{SW}$ is the power loss of the switches used in the SDSR circuit which in this paper are MOSFETs. $P_{Driver}$ is low enough to be neglected, however it mainly consist of the loss producing by $R_4$, $R_5$, and $R_9$. Therefore, $$P_{Driver} \approx \left( \frac{V_{in}^2}{R_4} + \frac{V_{in}^2}{R_5} \right) + \frac{V_{out}^2}{R_9}, \quad (2)$$

$$P_S = I^2 R_s, \quad (3)$$

where $R_s$ is the current sensing resistance;

$$P_{SW} = 2I^2 R_{DS(on)}, \quad (4)$$

where $R_{DS(on)}$ is the on state resistance of the MOSFETs.

For the power loss of the diode-bridge, $$P_{DB} = 2V_F I, \quad (5)$$

where $V_F$ is the forward voltage of the diode and can be considered as a constant in a rough estimation.

From equation (1)-(5), we can find out the current range, within which the power loss of the SDSR can be lower than a diode bridge, $$\frac{V_F - \sqrt{V_F^2 - (R_s + 2R_{DS(on)})P_{driver}}}{R_s + 2R_{DS(on)}} < I < \frac{V_F + \sqrt{V_F^2 - (R_s + 2R_{DS(on)})P_{driver}}}{R_s + 2R_{DS(on)}} \quad (6)$$

In the prototype, $R_4 = R_5 = 1.3$ MΩ; $R_9 = 1$ M≠; $R_s = 0.002$Ω; $R_{DS(on)} = 0.045$Ω; $V_F < 1.1$V at 30 A ($V_F = 1$V is assumed for calculation).

When $V_{out} = V_{in} = 110$V, $P_{Driver} \approx 31$ milliwatts (mW), and the current range is $0.016 < I < 21.724$ A. When $V_{out} = V_{in} = 220$V, $P_{Driver} \approx 124$ mW, and the current range is $0.062 < I < 21.677$ A.

Since the body diodes of the MOSFETs are used during the start-up phase of the system (before the DC output is ready to power the control electronic circuit of the SDSR) and after the corresponding MOSFETS have turned off at near-zero current (about 0.5 A), the conduction loss of the body diodes of the MOSFETs is negligible. In general, the power loss of the diode rectifier and the SDSR for the capacitive load and inductive load can be analyzed in the same way as the resistive load. The major power loss reduction component comes from the difference between the conduction loss of the diodes in the diode bridge and the on-state resistance of the MOSFETs in the SDSR. For a current of 10 A, for example, a diode has a conduction loss of about 10 W, while a MOSFET (with on-state resistance of 45 mΩ) only dissipates 4.5 W.

Experimental verification based on a single-phase synchronous rectifier was performed to compare a SDSR, in accordance with aspects and embodiments of the subject specification, with a conventional diode bridge. As part of the comparison, a diode bridge comprising diodes 60EPF06PbF with forward voltage drop of about 0.85V are used to compare with a SDSR (e.g., as depicted in FIG. 2) based at least in part on MOSFETs IPW60R045CP with on-state resistance of 45 mΩ, wherein the MOSFETs correspond to, for example, switches 202, 204, 206, and 208 in FIG. 2. Resistive, capacitive and inductive loads are used for evaluation of the SDSR.

Figure 8:
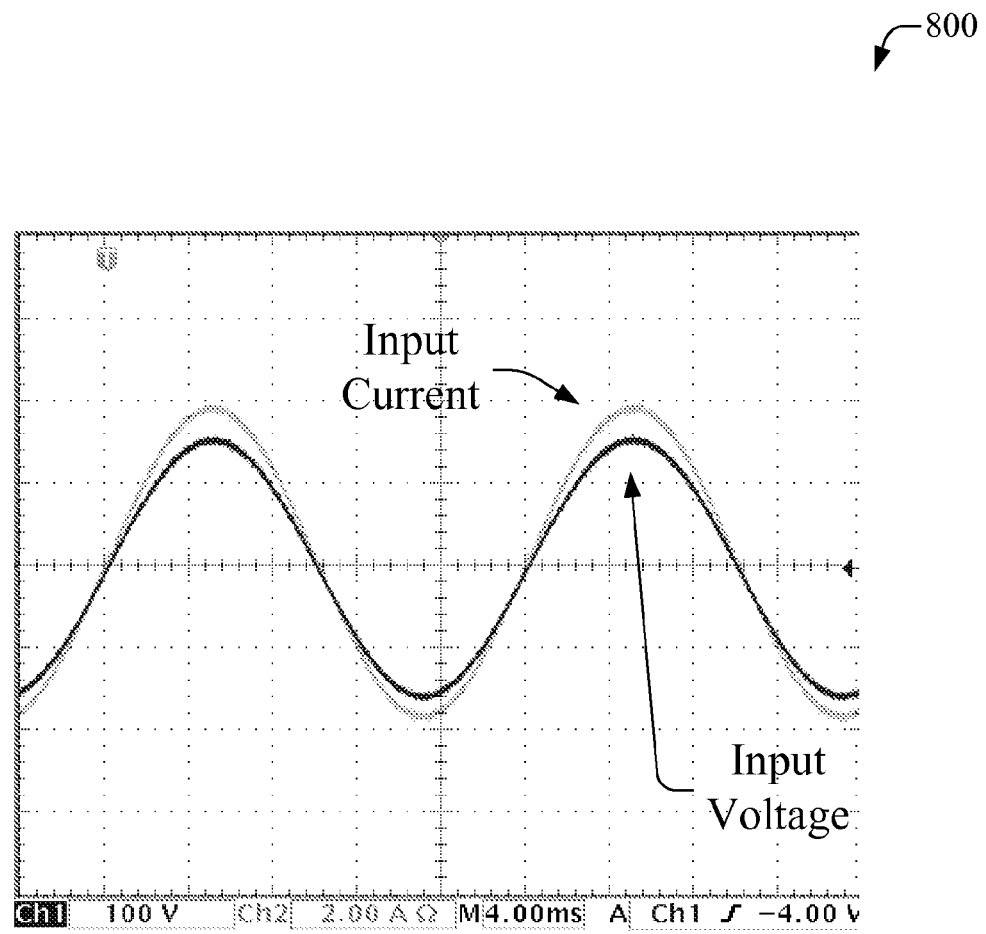
FIG. 8 illustrates a diagram of an example graph of input voltage and input current of the diode bridge for a resistive load.
Figure 9:
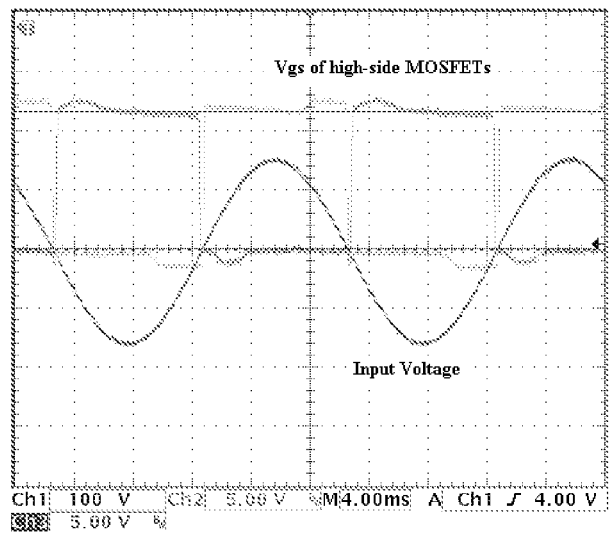
FIG. 9 depicts a diagram of an example graph of example gate-source voltage signals of the high-side portion switches of a synchronous rectifier and the input voltage in relation to a resistive load in accordance with an aspect.
Figure 10:
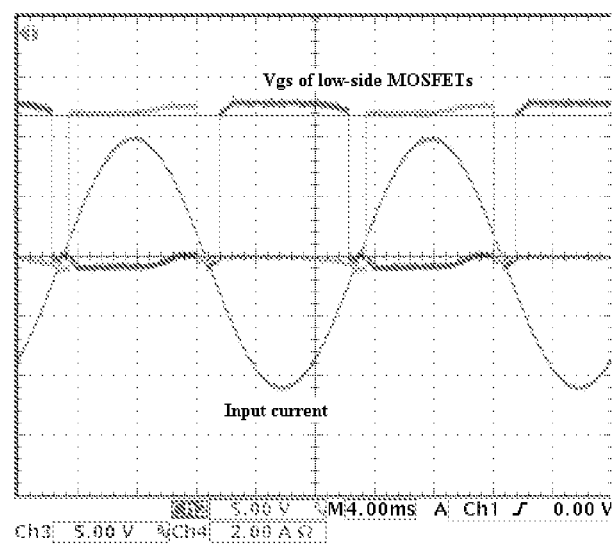
FIG. 10 depicts a diagram of an example graph comprising example corresponding gate-source voltage signals for the low-side portion switches of a synchronous rectifier and the input current.

FIG. 8 illustrates a diagram of an example graph 800 of input voltage and input current of the diode bridge for a resistive load. FIG. 9 depicts a diagram of an example graph 900 of example gate-source voltage signals (Vgs) of the high-side portion switches (e.g., switches 202 and 204, which can be (VCSD) MOSFETs) (represented respectively as a pink-colored waveform and a green-colored waveform) of the SDSR and the input voltage (represented as a blue-colored waveform) in relation to a resistive load (e.g., when the system 200 is subject to a resistive load) in accordance with an aspect. In relation to the graph 900, FIG. 10 depicts a diagram of an example graph 1000 comprising corresponding gate-source voltage signals (Vgs) for the low-side portion switches (e.g., switches 206 and 208 (CCSD) MOSFETs) (represented respectively as a pink-colored waveform and a first green-colored waveform) of the SDSR and the input current (represented as a second green-colored waveform) obtained from the SDSR for the same resistive load. It can be seen from that the input voltage and input current waveforms of the conventional diode bridge fed with a resistive load in FIG. 8 are the same or at least substantially the same as the input voltage waveform (in FIG. 9) and input current waveform (in FIG. 10) obtained from the SDSR for the same resistive load.

Figure 11:
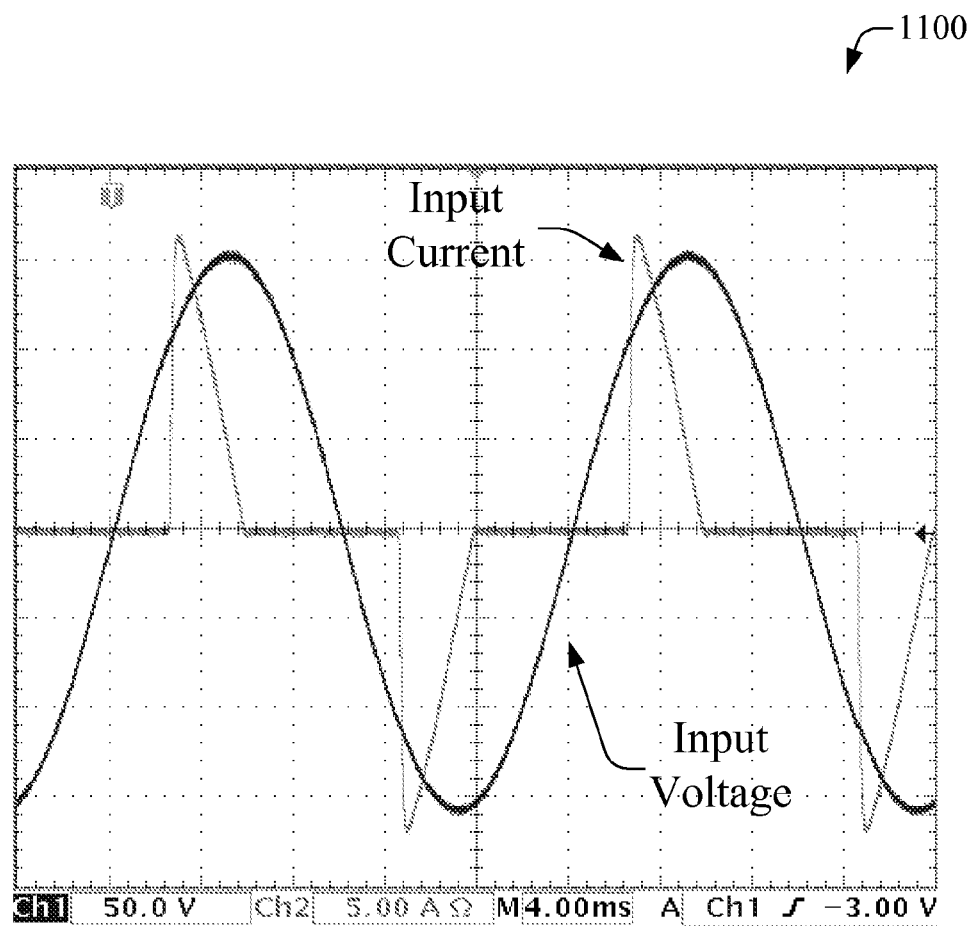
FIG. 11 depicts a diagram of an example graph of input voltage and input current for the diode bridge when associated with a capacitive-resistive load.
Figure 12:
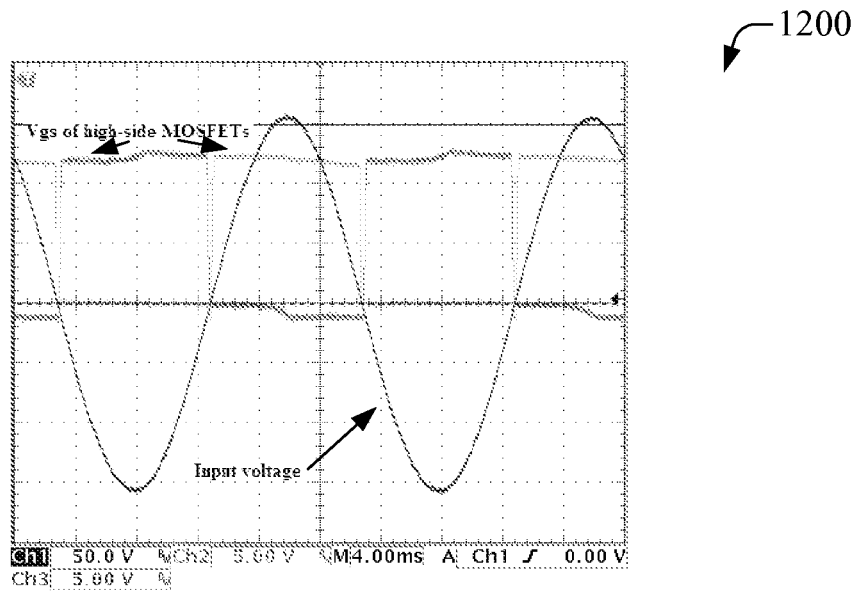
FIG. 12 illustrates a diagram of an example graph of example gate-source voltage signals of the high-side portion switches of a synchronous rectifier and the input voltage in relation to a capacitive-resistive load in accordance with an aspect.
Figure 13:
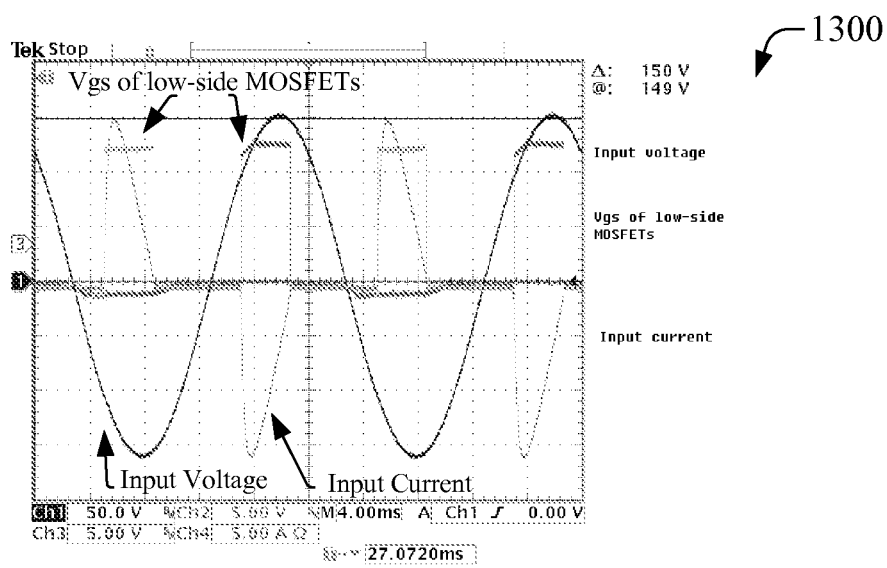
FIG. 13 depicts a diagram of an example graph comprising example corresponding gate-source voltage signals for the low-side portion switches of a synchronous rectifier, the input voltage, and the input current, in relation to a capacitive-resistive load, in accordance with an aspect.
Figure 14:
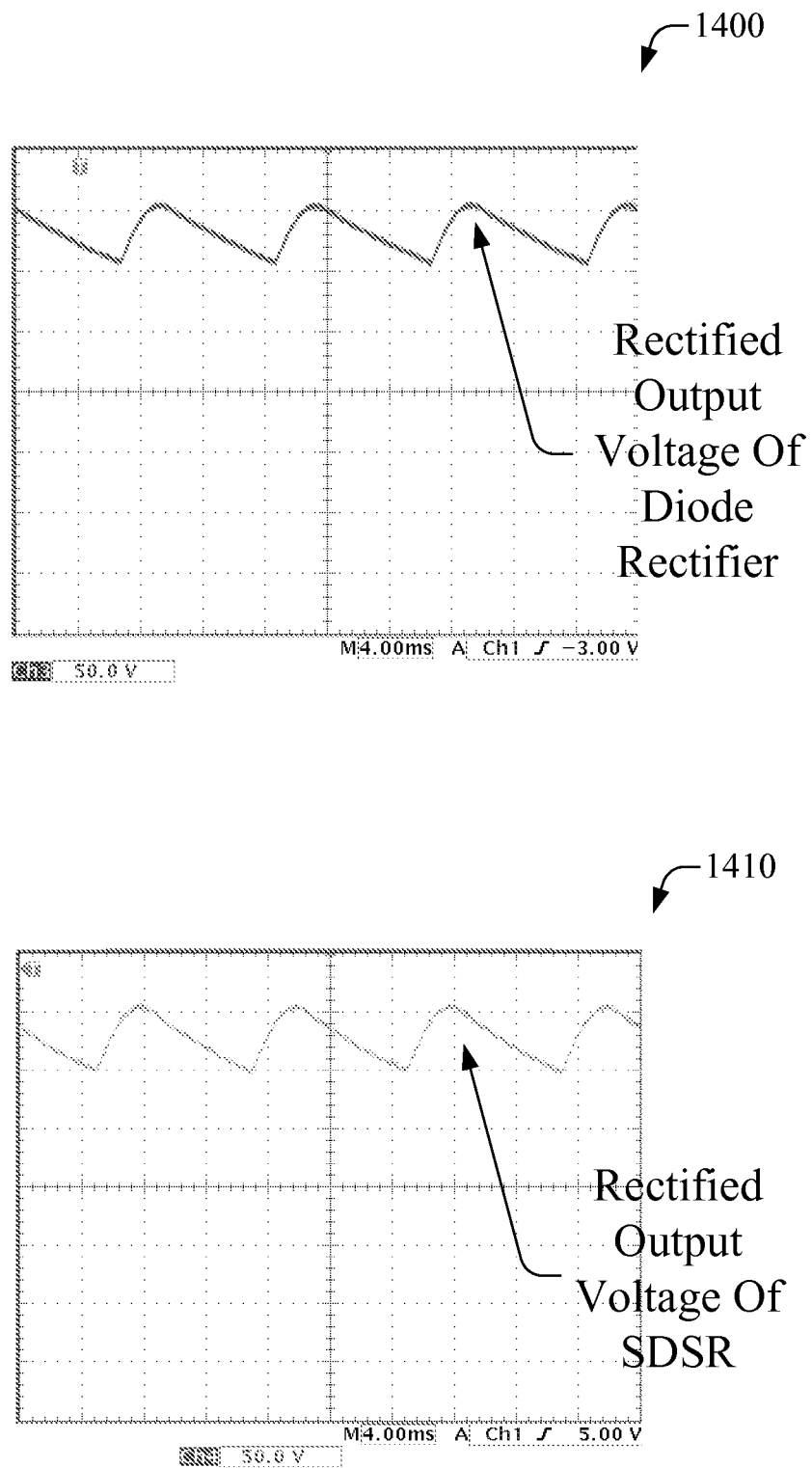
FIG. 14 depicts a diagram of an example graph comprising a rectified DC output capacitor voltage waveform associated with a conventional diode bridge in relation to the capacitive-resistive load, and a graph comprising a rectified DC output capacitor voltage waveform associated with a synchronous rectifier in relation to the capacitive-resistive load.

FIGS. 11, 12, 13, and 14 relate to example results when the system 200 comprising the single-phase SDSR is associated with (e.g., connected to) a capacitive-resistive load in comparison to a conventional diode bridge associated with a capacitive-resistive load. FIG. 11 depicts a diagram of an example graph 1100 of input voltage and input current for the diode bridge when associated with a capacitive-resistive load. As can be seen in graph 1100, input current pulses are observed as expected for a capacitive-resistive load. FIG. 12 illustrates a diagram of an example graph 1200 of example gate-source voltage signals (Vgs) of the high-side portion switches (e.g., switches 202 and 204, which can be (VCSD) MOSFETs) (represented respectively as a pink-colored waveform and a green-colored waveform) of the SDSR and the input voltage (represented as a blue-colored waveform) in relation to a capacitive-resistive load (e.g., when the system 200 is subject to a capacitive-resistive load), wherein the capacitive-load is the same as that for the conventional diode bridge. In relation to the graph 1200, FIG. 13 depicts a diagram of an example graph 1300 comprising corresponding gate-source voltage signals (Vgs) for the low-side portion switches (e.g., switches 206 and 208 (CCSD) MOSFETs) (represented respectively as a pink-colored waveform and a green-colored waveform) of the SDSR, the input voltage (represented as a blue-colored waveform), and the input current (represented as a green-colored waveform), in relation to the same capacitive-resistive load, in accordance with an aspect. It is noted that, with regard to FIG. 13, the input current (green-colored waveform in FIG. 13) looks the same as, or at least substantially the same as, a typical expected current waveform for a conventional diode bridge with a capacitive-resistive load, for example, as shown in FIG. 11. In relation to graph 1100, graph 1200, and graph 1300, FIG. 14 depicts a diagram of example graph 1400 comprising a rectified DC output capacitor voltage waveform associated with the conventional diode bridge in relation to the capacitive-resistive load, and graph 1410 comprising a rectified DC output capacitor voltage waveform associated with the SDSR in relation to the capacitive-resistive load. As can be observed, the rectified DC output voltage waveform for the SDSR is consistent with (e.g., essentially the same as) that of the conventional diode bridge for the same capacitive-resistive load.

Figure 15:
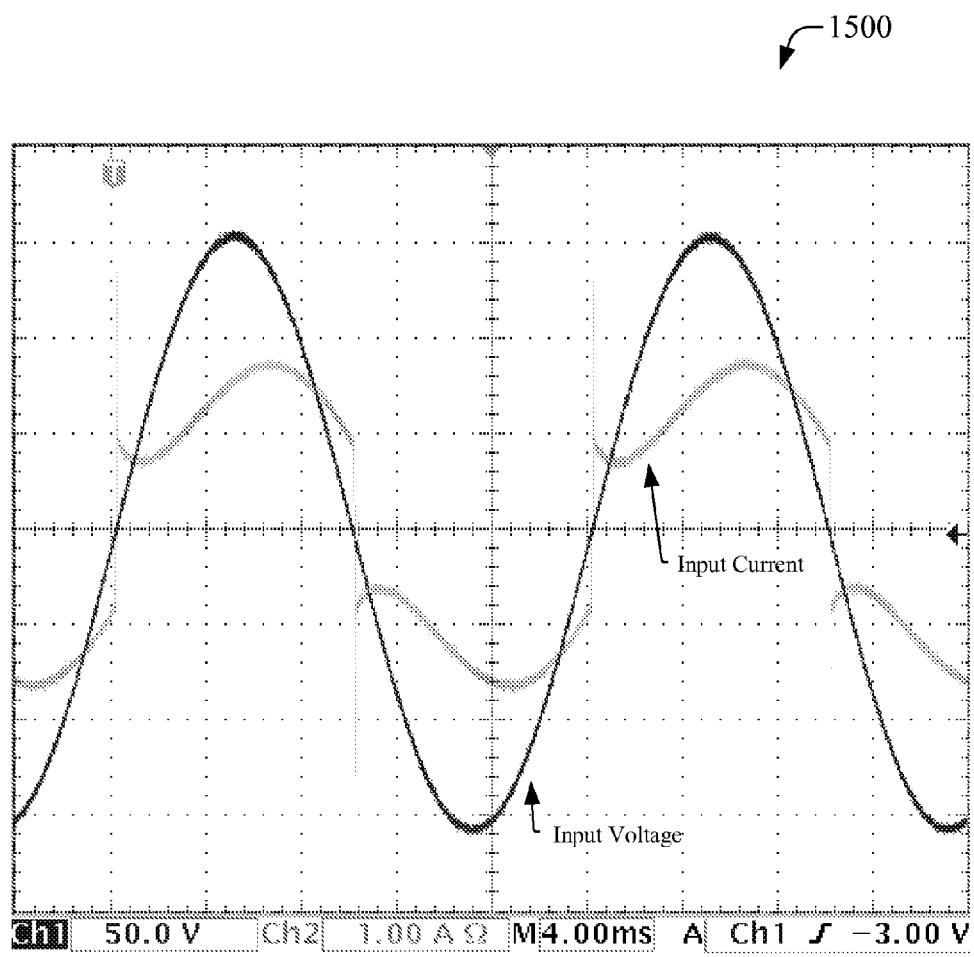
FIG. 15 depicts a diagram of an example graph of measured input voltage and input current waveforms of the conventional diode rectifier when associated with the inductive-resistive load.
Figure 16:
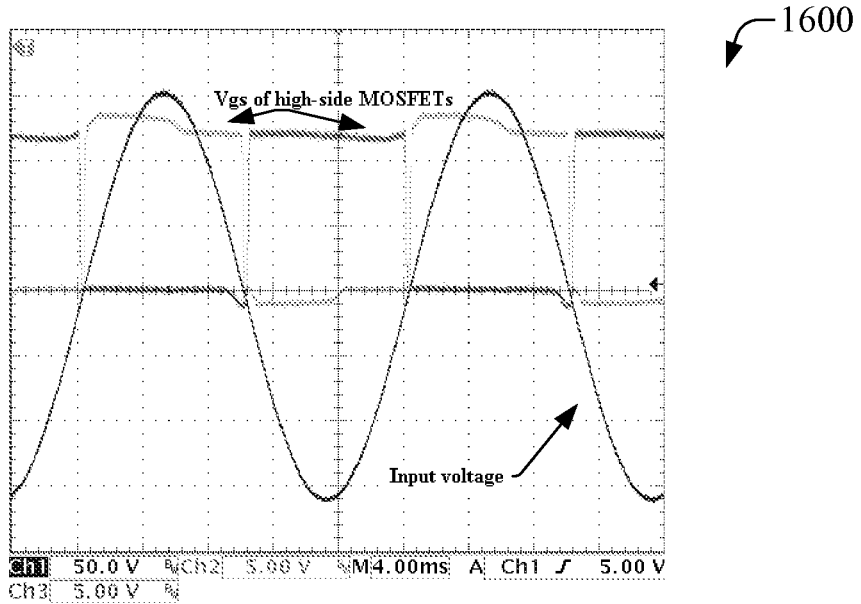
FIG. 16 illustrates a diagram of an example graph of example gate-source voltage signals of the high-side portion switches, the input voltage, and the input current for a synchronous rectifier in relation to an inductive-resistive load in accordance with an aspect.
Figure 17:
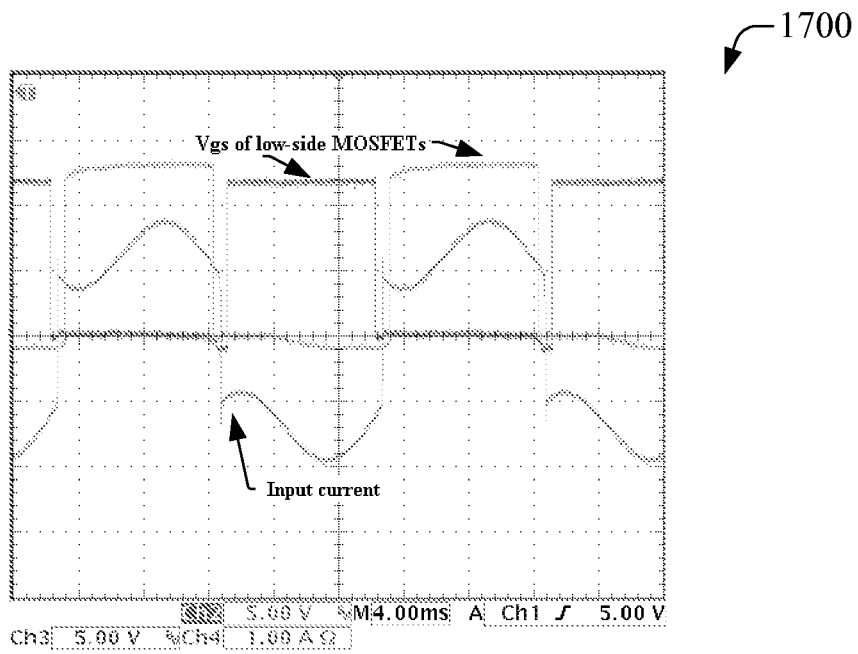
FIG. 17 depicts a diagram of an example graph comprising example corresponding gate-source voltage signals for the low-side portion switches, and an input current, for a synchronous rectifier, in accordance with an aspect.

FIG. 15 relates to example results when the conventional diode rectifier is associated with (e.g., connected to) an inductive-resistive load. FIG. 15 depicts a diagram of an example graph 1500 of measured input voltage and input current waveforms of the conventional diode rectifier when associated with the inductive-resistive load. FIGS. 16 and 17 relate to example results when the system 200 comprising the single-phase SDSR is associated with (e.g., connected to) an inductive-resistive load. FIG. 16 illustrates a diagram of an example graph 1600 of example gate-source voltage signals (Vgs) of the high-side portion switches (e.g., switches 202 and 204, which can be (VCSD) MOSFETs) (represented respectively as a pink-colored waveform and a green-colored waveform) of the SDSR, the input voltage (represented as a blue-colored waveform), and the input current (represented as a green-colored waveform) for the SDSR in relation to (e.g., when connected to) an inductive-resistive load (e.g., when the system 200 is subject to an inductive-resistive load) in accordance with an aspect. In relation to the graph 1600, FIG. 17 depicts a diagram of an example graph 1700 comprising example corresponding gate-source voltage signals (Vgs) for the low-side portion switches (e.g., switches 206 and 208 (CCSD) MOSFETs) (represented respectively as a pink-colored waveform and a dark green-colored waveform) of the SDSR, and an input current (represented as a light-green-colored waveform), for the SDSR (e.g., of system 200), in accordance with an aspect. It is noted that, with regard to FIG. 17, the input current waveform (light-green-colored waveform in FIG. 17) looks exactly the same as, or at least substantially the same as, a typical expected current waveform for a conventional diode bridge with an LR load, as shown in FIG. 15. These practical measurements confirm that the SDSR disclosed herein can behave like a conventional diode bridge for different types of loads.

The forward voltage drop of diode 60EPF06PbF is found out to be about 0.85V in experiments. Power loss of the diode bridge is $P_{DB}=2V_F I$. For MOSFET IPW60R045CP, $R_{DS(on)}=0.045\Omega$. The power loss of the SDSR is approximately $P_{SR}=I^2(2R_{DS(on)}+R_S)$ when the power losses of gate-drives, which can be relatively negligible, are ignored.

Figure 18:
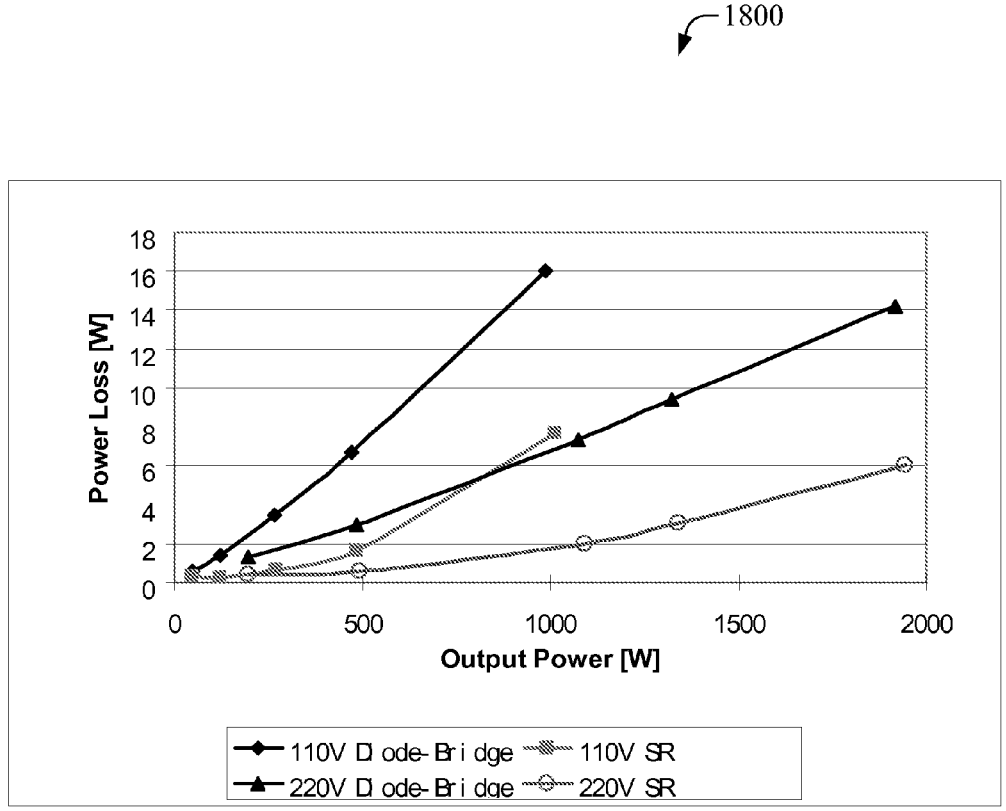
FIG. 18 illustrates a diagram of an example graph of example results relating to power loss of the self-driven synchronous rectifier and a diode rectifier under the mains operation of 110V (up to 1 kW output power) and 220V (up to 2 kW output power), in an aspect.

FIG. 18 illustrates a diagram of an example graph 1800 of example results relating to power loss of the disclosed SDSR (e.g., of system 200) and the conventional diode rectifier under the mains operations of 110V (up to 1 kW output power) and 220V (up to 2 kW output power), in an aspect. As shown in the graph 1800, at 1 kW and 110V operation, the SDSR can achieve approximately 52% power loss reduction as compared to the diode bridge. At 2 kW and 220V operation, the SDSR can achieve power loss reduction of approximately 57% as compared to the diode bridge.

Figure 19:
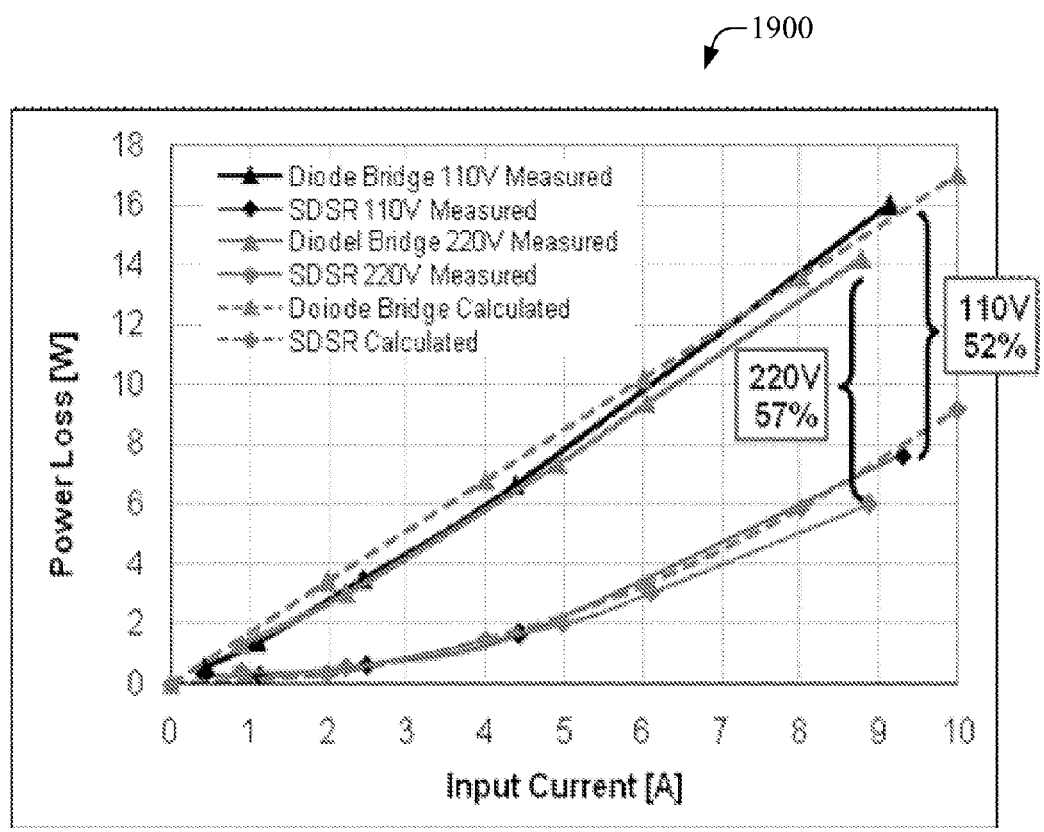
FIG. 19 depicts a diagram of a graph of the measured and calculated power losses versus the input current.

FIG. 19 depicts a diagram of a graph 1900 of the measured and calculated power losses versus the input current. As can be seen in the graph 1900, the calculated power loss curves substantially correspond with the measurements.

The subject specification can employ a SDSR (e.g., self-driven AC-DC synchronous rectifier) that can be employed to replace a diode bridge as a general-purpose AC-DC rectifier.

The high-side portion and low-side portion (SDGD subsystem) of the SDSR can efficiently (e.g., with regard to reduced cost, relative ease of implementation, improved power loss reduction, etc.) provide the normal rectification functions for resistive, capacitive and inductive loads as a traditional diode rectifier would provide, except that the power loss of the SDSR can be up to 57% less than that of a traditional diode bridge. The subject specification can result in a net cost reduction stemming in part from a reduction in the size of the heatsink to be employed when using the SDSR as compared to a traditional diode rectifier as well as the energy-saving (e.g., power loss reduction), which can more than compensate for any potential minor increase in the component counts of the inexpensive and low-power components in the high-side portion and low-side portion. In another aspect, the subject specification can achieve high system compactness, due in part to reduced heat dissipation (relative to conventional rectifiers), as compared to conventional rectifiers. Also, as desired, the control circuit of the disclosed SDSR (e.g., single-phase SDSR, multi-phase SDSR) can in principle be built in the same module block with the power switches (e.g., power MOSFETs) so that the module can be a replacement of the diode rectifier module.

Figure 20:
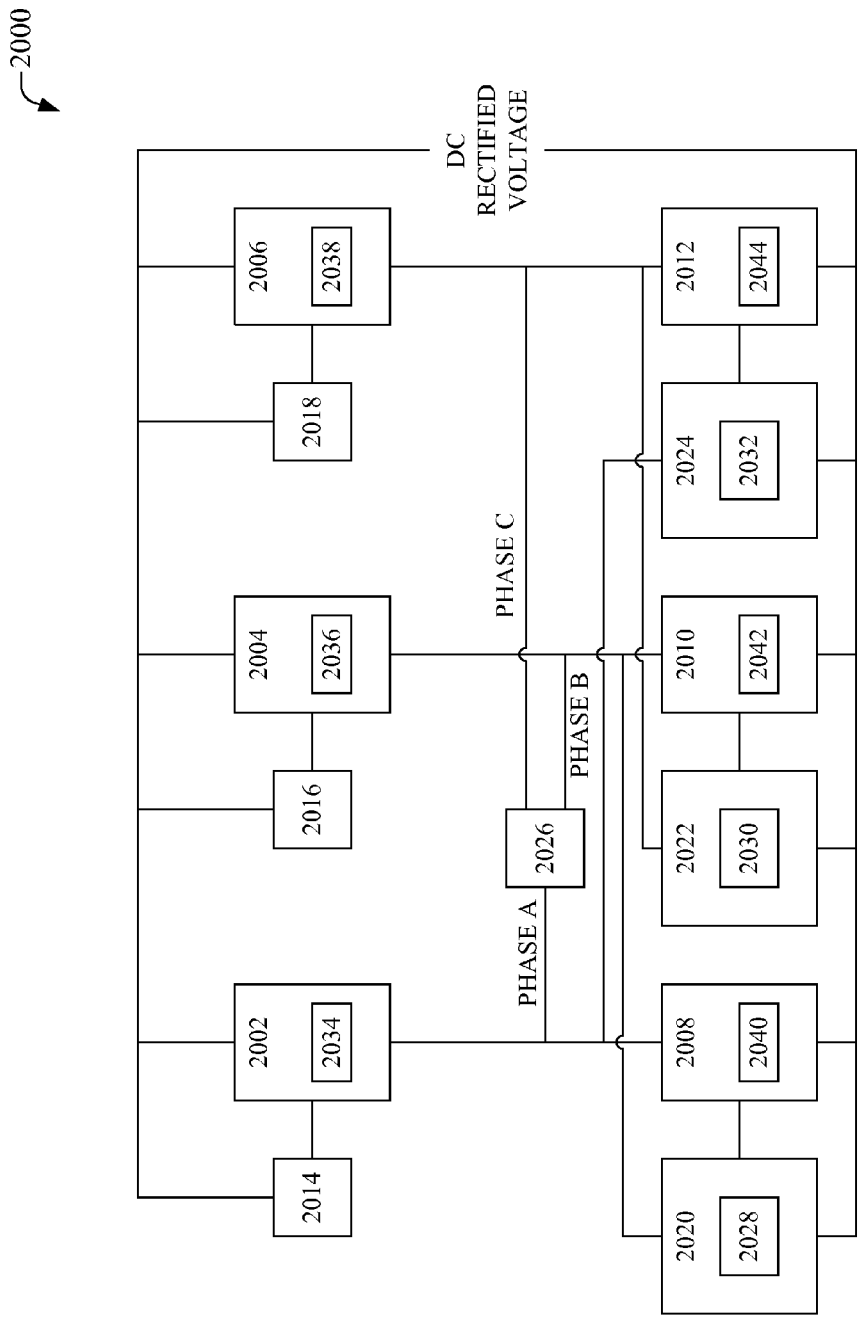
FIG. 20 illustrates a system that can comprise a multi-phase self-driven synchronous rectifier that can be employed to receive and synchronously rectify a multi-phase AC power signal and produce a desired DC signal as an output, in accordance with an embodiment of the disclosed subject matter.

Turning to FIG. 20, illustrated is a system 2000 that can comprise a multi-phase (e.g., three-phase) SDSR that can be employed to receive and synchronously rectify a multi-phase AC power signal and produce a desired DC signal as an output, in accordance with an embodiment of the disclosed subject matter. In an aspect, system 2000 can include six switches, comprising switch 2002, switch 2004, switch 2006, switch 2008, switch 2010, and switch 2012, which can be power switches that can facilitate synchronously rectifying the input multi-phase AC power signal. The switches 2002 through 2012 can form the main circuit for multi-phase (e.g., three-phase) full-wave rectification. In an embodiment, the switches 2002 through 2012 can be power MOSFETs. In another aspect, the six switches 2002 through 2012 can be oriented in a circuit in relation to each other to form a multi-phase synchronous rectifier, which can be in the form of, function as, or emulate a diode bridge, and can rectify an input multi-phase AC power signal and produce a desired DC signal as an output. In accordance with an embodiment, the high-side switches, switch 2002, switch 2004, and switch 2006 can be VCSD switches, and the low-side switches, switch 2008, switch 2010, and switch 2012 can be CCSD switches, although it is to be appreciated and understood that, in accordance with other embodiments, switch 2002, switch 2004, and/or switch 2006 can be CCSD switches, instead of VCSD switches. In an aspect, the multi-phase synchronous rectifier of the system 2000 can be employed in high-voltage power applications (e.g., 110 V or 220 V mains) and/or high frequency applications.

In still another aspect, the six switches 2002 through 2012 can be associated with six SDGD components 2014, 2016, 2018, 2020, 2022, and 2024, wherein the SDGD components 2014, 2016, and 2018 can be part of a high-side portion of an SDGD subsystem, and the SDGD components 2020, 2022, and 2024 can be part of a low-side portion of the SDGD subsystem, which can be employed to facilitate controlling respective switching of the six switches 2002 through 2012. In an aspect, the high-side portion and low-side portion of the SDGD subsystem can be symmetrical. The six SDGD components 2014 through 2024 (e.g., self-driven gate-drive circuits) can be designed such that they consume a relatively low amount of power and do not require an extra or separate power supply in order to operate, as power to drive the six SDGD components 2014 through 2024 can be supplied by the output DC voltage from the multi-phase synchronous rectifier. In an embodiment, the six SDGD components 2014 through 2024 can be formed on an integrated circuit.

The system 2000 can include a power source 2026, such as, for example, a multi-phase (e.g., three-phase) power source, that can provide desired power to the six switches 2002 through 2012, which can generate a desired rectified DC signal as an output, wherein the output can be associated with (e.g., connected to) a desired load (e.g., resistive, capacitive, and/or inductive load), and wherein a desired relatively small portion of the output DC signal can be used to drive the SDGD subsystem (e.g., the six SDGD components 2014 through 2024).

In yet another aspect, if the six SDGD components 2014 through 2024 are not ready for operation (e.g., have not reached steady-state operation) immediately at the start-up of the SDSR of the system 2000, the SDSR, formed at least in part by the six switches 2002 through 2012, can still function to rectify an input power signal, as diode-bridge type functionality is inherent in the SDSR. For instance, switch 2002 can include body diode 2034, switch 2004 can include body diode 2036, switch 2006 can include body diode 2038, switch 2008 can include body diode 2040, switch 2010 can include body diode 2042, and switch 2012 can include body diode 2044, wherein the arrangement of the switches 2002, 2004, 2006, 2008, 2010, and 2012, and thus, the body diodes 2034, 2036, 2038, 2040, 2042, and 2044 in the circuit can be such that the body diodes 2034, 2036, 2038, 2040, 2042, and 2044 can be structured and can inherently function as a bridge-rectifier including during initial start-up of the SDSR (e.g., prior to the rectified DC voltage providing at least a portion of the desired power to the switches of the SDSR). That is, the six body diodes 2034, 2036, 2038, 2040, 2042, and 2044 of the six switches 2002, 2004, 2006, 2008, 2010, and 2012 can form a three-phase diode rectifier when all the switches 2002 through 2012 (e.g., MOSFETs) are not switched on.

As more fully described herein, an undesirable (e.g., fatal) short circuit situation can or may occur at or near zero-crossing points unless there is a controller component or circuitry to facilitate controlling certain components, such as comparators (not shown in FIG. 20) and thereby associated power switches (e.g., power MOSFETs) in the low-side portion of the SDGD subsystem, to facilitate ensuring that associated power MOSFETs (e.g., corresponding switches 2002, 2004, 2006, 2008, 2010, or 2012) are turned off at a desired time at or near zero-crossing points. In still another aspect, the system 2000 can include zero-crossing controller component 2028, zero-crossing controller component 2030, and zero-crossing controller component 2032 that can comprise additional circuitry and components that can respectively facilitate at least partially controlling respective comparators (e.g., $CP_1$, $CP_2$, and $CP_3$) in the low-side portion of the SDGD subsystem, and thereby respectively associated power switches 2008, 2010, and 2012, by providing a small positive voltage signal to the non-inverting inputs of comparators to facilitate turning off the corresponding switches 2008, 2010, and 2012 (e.g., power MOSFETs) at desired times at or near a zero-crossing point, as more fully described herein.

Figure 21:
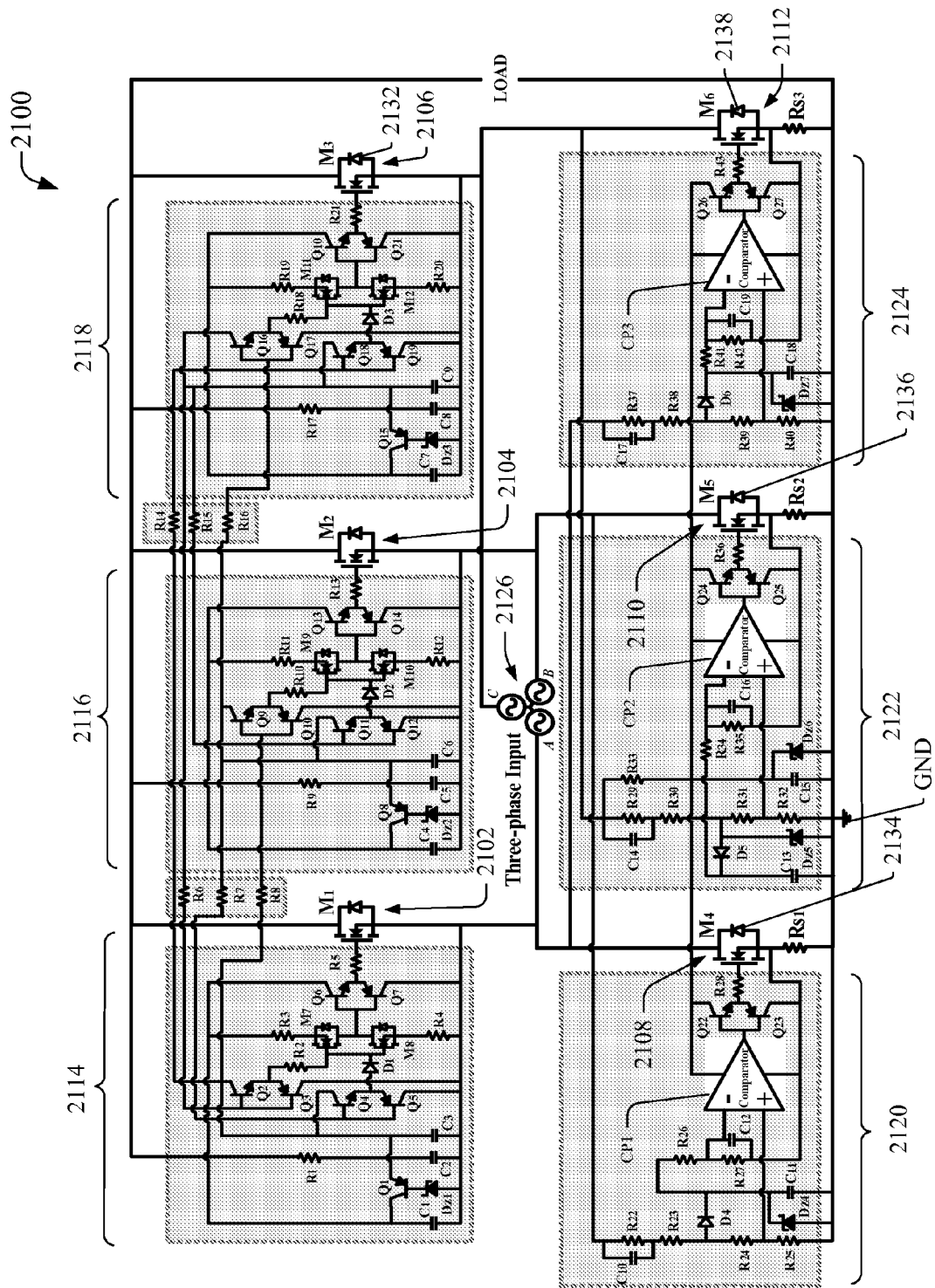
FIG. 21 depicts an example circuit diagram of a system that can comprise a multi-phase self-driven synchronous rectifier that can be employed to receive and synchronously rectify a multi-phase AC power signal and produce a desired DC signal as an output, in accordance with another embodiment of the disclosed subject matter.

Turning to FIG. 21, depicted is an example circuit diagram of a system 2100 that can comprise a multi-phase (e.g., three-phase) SDSR that can be employed to receive and synchronously rectify a multi-phase AC power signal and produce a desired DC signal as an output, in accordance with another embodiment of the disclosed subject matter. In an aspect, the system 2100 can include six switches, switch 2102, switch 2104, switch 2106, switch 2108, switch 2110, and switch 2112, which can be configured in system 2100 as shown in FIG. 21. In an embodiment, the switches 2102 through 2112 can be six power MOSFETs $M_1$ through $M_6$. The switches 2102 through 2112 can form the main circuit for three-phase full-wave rectification of an input three-phase AC signal.

The system 2100 can include a SDGD subsystem (e.g., highlighted in the shaded areas of FIG. 21), comprising self-driven gate-drive circuitry, that can be associated with (e.g., connected to) the switches 2102 through 2112 to facilitate controlling operation (e.g., switching) of the switches 2102 through 2112 at desired respective times to facilitate operation of the multi-phase synchronous rectifier. The SDGD subsystem can comprise SDGD component 2114, which can be associated with and can facilitate controlling operation of the switch 2102; SDGD component 2116, which can be associated with and can facilitate controlling operation of the switch 2104; SDGD component 2118, which can be associated with and can facilitate controlling operation of the switch 2106; SDGD component 2120, which can be associated with and can facilitate controlling operation of the switch 2108; SDGD component 2122, which can be associated with and can facilitate controlling operation of the switch 2110; and SDGD component 2124, which can be associated with and can facilitate controlling operation of the switch 2112.

Figure 25A:
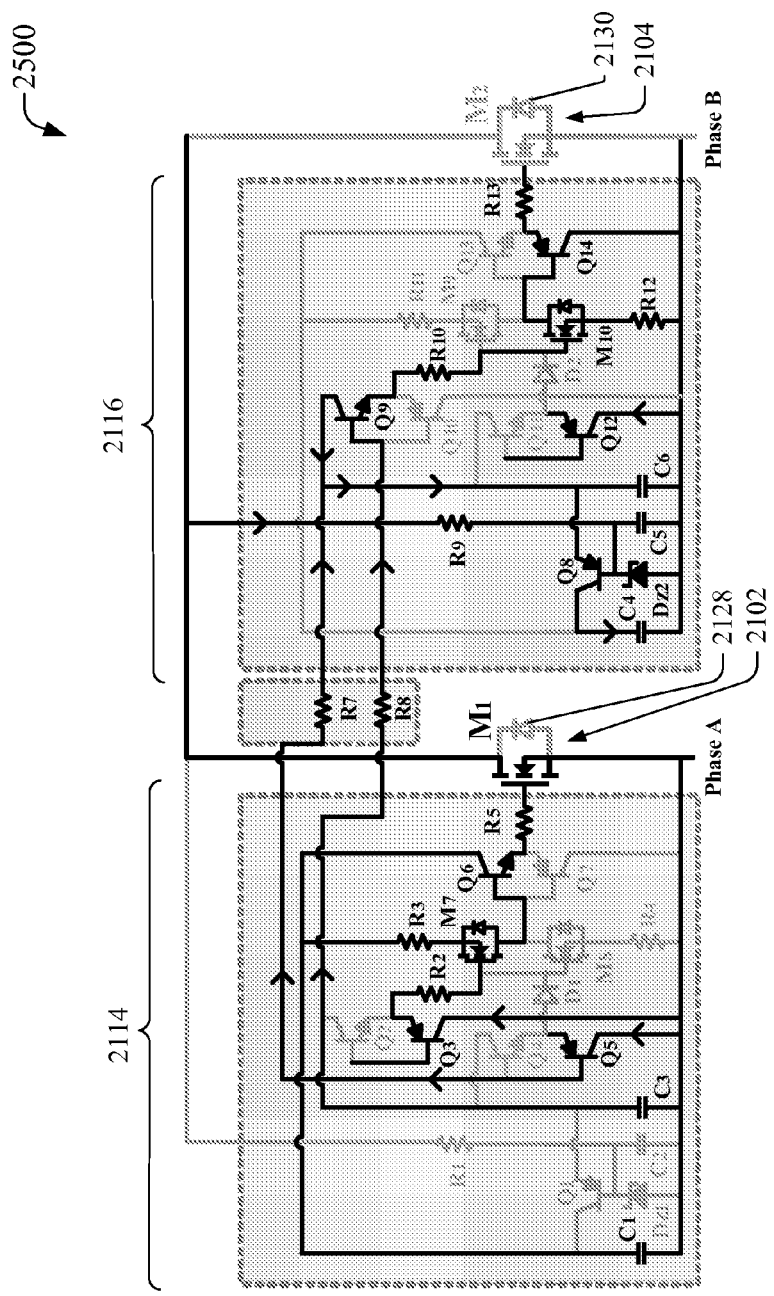
FIGS. 25A through 25H illustrate diagrams of operation, in relation to time, of an example system comprising high-side gate-drives associated with the self-driven multi-phase synchronous rectifier, in accordance with various aspects of the disclosed subject matter.

The respective switches 2102, 2104, 2106, 2108, 2110, and 2112, each can include respective body diodes 2128 (for reason of clarity, included but not expressly labeled in FIG. 21, but expressly identified in other figures, including FIG. 25A), 2130 (for reason of clarity, included but not expressly labeled in FIG. 21, but expressly identified in other figures, including FIG. 25A), 2132, 2134, 2136, and 2138. In an aspect, the body diodes 2128, 2130, 2132, 2134, 2136, and 2138 can be structured and can be arranged in the circuit in relation to each other and other components, such that they can inherently function as a bridge-rectifier, as desired, including during initial start-up of the SDSR (e.g., prior to the rectified DC voltage providing at least a portion of the desired power to the switches of the SDSR).

The SDGD subsystem is designed to consume a relatively low amount of power, and can be powered by and receive power from the output rectified DC signal from the SDSR. In an embodiment, the SDGD subsystem can be formed as an integrated circuit. In an aspect, the SDGD subsystem can be divided into a desired number of parts, such as, for example, two parts comprising a high-side portion and low-side portion. The high-side portion and low-side portion can be symmetrical.

As disclosed, the switches 2102 through 2112, and associated body diodes 2128 through 2138, can be arranged in the circuit of system 2100 to form, at least in part, the multi-phase SDSR that can be in the form of, function as, or emulate a diode bridge (e.g., diode rectifier). As a result, even if the SDGD components are not ready for operation (e.g., steady state operation) immediately at the start-up of the system 2100, the diode bridge functionality is inherent in the system 2100 to desirably perform the function of multi-phase rectification of the input power signal, because the six body diodes 2128 through 2138 of the six switches 2102 through 2112 are arranged in the circuit to form a three-phase diode bridge that can rectify the applied input power signal to produce a desired rectified DC voltage as an output when the switches 2102 through 2012 are not turned on (e.g., during initial start-up of the SDSR prior to steady-state operation of the SDSR). In an aspect, the system 2100 can include a power source 2126, which can be a multi-phase (e.g., three-phase) AC source, that can be connected to, and can apply the input power signal (e.g., AC power signal) to, the power switches 2102 through 2112, wherein the switches 2102 through 2112 can facilitate performing multi-phase rectification of the input power signal to generate a desired DC signal as an output.

The SDGD subsystem can include desired circuitry to facilitate controlling switching of the power switches while also be self-driven and consuming a low amount of power. In accordance with various aspects, there can be, for example, three capacitors in each of the three high-side portion SDGD components 2114, 2116, and 2118, wherein SDGD component 2114 can include capacitors $C_1$, $C_2$ and $C_3$ for use in conjunction with switch 2102 ($M_1$); SDGD component 2116 can include capacitors $C_4$, $C_5$ and $C_6$ for use in conjunction with switch 2104 ($M_2$); and SDGD component 2118 can include capacitors $C_7$, $C_8$ and $C_9$ for use in conjunction with switch 2106 ($M_3$). Also, each of the three high-side portion SDGD components 2114, 2116, and 2118 can include three driving stages. Taking SDGD component 2114 and switch 2102 ($M_1$) as an example, the transistors $Q_2$, $Q_3$, $Q_4$, and $Q_5$; switches $M_7$ and $M_8$; and transistors $Q_6$ and $Q_7$ can respectively form the three driving stages. The transistors $Q_2$ through $Q_5$ can be employed for signal amplifying and providing charging paths for the SDGD component 2114, wherein resistor $R_2$ can be employed for use with transistor $Q_2$ and switch $M_7$, and wherein resistor $R_6$ can be employed for use with transistors $Q_2$ and $Q_3$; the switches $M_7$ and $M_8$ can form an inverter; and the transistors $Q_6$ and $Q_7$ can be employed for desirably fast driving of the power switch 2102 (M1), wherein resistor $R_5$ can be employed for use with transistors $Q_6$ and $Q_7$, and power switch 2102 (M1).

Initially, when powering up the system 2100, the SDGD subsystem can go through a start-up phase until steady state operation is achieved. During the start-up phase, the capacitors $C_1$, $C_4$ and $C_7$ will be charged up as the power supplies of the first-stage. Before the capacitors $C_1$, $C_4$ and $C_7$ have been charged up to an applicable predefined threshold voltage (e.g., 10V), the driving logic in the SDGD subsystem will not be ready to fully function to facilitate controlling respective switching of the switches 2102 through 2112.

In another aspect, the capacitors $C_3$, $C_6$ and $C_9$ are to be charged as the power supplies to facilitate driving the switch 2102 ($M_1$), the switch 2104 ($M_2$), and the switch 2106 ($M_3$), respectively. During the start-up stage, the capacitors $C_2$, $C_5$ and $C_8$, which can be respectively associated with resistors $R_1$, $R_9$ and $R_{17}$ for use by capacitors $C_2$, $C_5$ and $C_8$, can be designed to be charged up more quickly than the capacitors $C_1$, $C_4$ and $C_7$, until the capacitors $C_2$, $C_5$ and $C_8$ respectively reach a predefined voltage, wherein the predefined voltage can be determined based at least in part on the respective zener diodes $D_{Z1}$, $D_{Z2}$ and $D_{Z3}$. In still another aspect, bipolar transistors $Q_1$, $Q_8$, and $Q_{15}$ can be used to facilitate ensuring the capacitors $C_3$, $C_6$ and $C_9$ will not be charged (e.g., fully charged to a predefined voltage level) before a time that the capacitors $C_1$, $C_4$ and $C_7$ have been charged up to a voltage level that is higher than the voltage level of the capacitors $C_2$, $C_5$ and $C_8$. As a result, the power switches, switch 2102 ($M_1$), switch 2104 ($M_2$), and switch 2106 ($M_3$), will not switch before the driving logic of the SDGD subsystem has been initialized and set up to operate at a desired steady-state operation.

Figure 22:
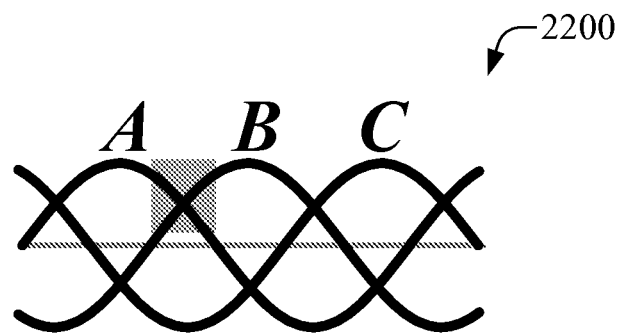
FIG. 22 depicts an example portion of an input power signal waveform for a three-phase signal, comprising phase A, phase B, and phase C, in an aspect.

To make the analysis more clear, assume that the voltage of the capacitors $C_1$, $C_4$ and $C_7$ will remain constant at a voltage V. The voltage $v_{BCn}$ can represent the base-collector voltages of $Q_n$ (e.g., BJT $Q_n$), wherein n can be an integer value. Referring briefly to FIG. 22 (along with FIG. 21), depicted is an example portion of an input power signal waveform 2200 for a three-phase signal, comprising phase A, phase B, and phase C, in an aspect. Due to the symmetry of the circuit of system 2100 (e.g., symmetry of the high-side portion and low-side portion of the SDGD subsystem), only a short time period, which is shown as shaded in FIG. 22, is needed to be analyzed.

Figure 23:
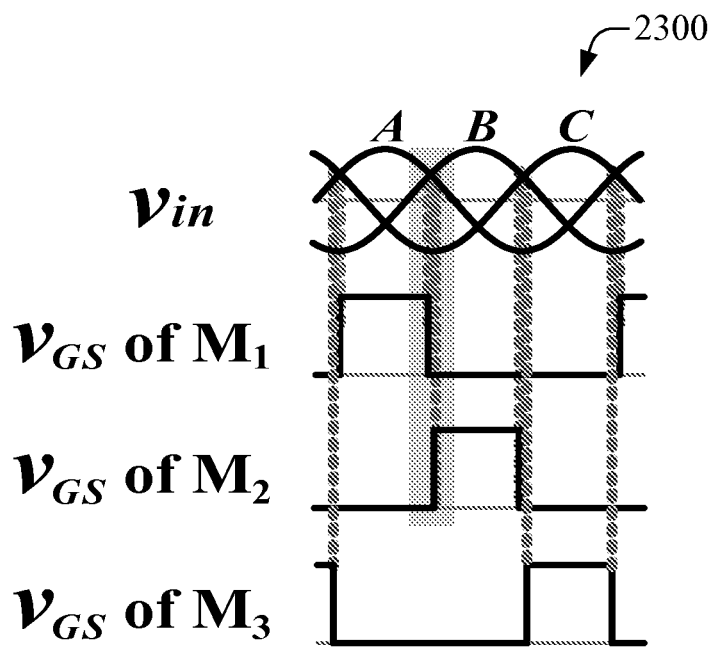
FIG. 23 illustrates a diagram of example graph of example gate-source voltage signals for three high-side portion power switches versus input voltage.

During this short time period, as shaded in FIG. 22, the output phase will change from phase A to phase B. At this point, the switch 2102 ($M_1$) should be or is turned off before the commutation point and the switch 2104 ($M_2$) should be or is turned on after the commutation point, which can be seen in FIG. 23, which illustrates a diagram of example graph 2300 of example gate-source voltage signals for the three power switches, switch 2102, switch 2104, and switch 2106, versus input voltage from the input voltage source 2126. Due at least in part to the voltage $v_c$ being the lowest in the time period, the voltages $v_{BC3}$ and $v_{BC12}$ can be clamped to zero volts by the p-n junction between the collector and base of the transistors $Q_3$ and $Q_{12}$. This should be noted in the following analysis.

Figure 24:
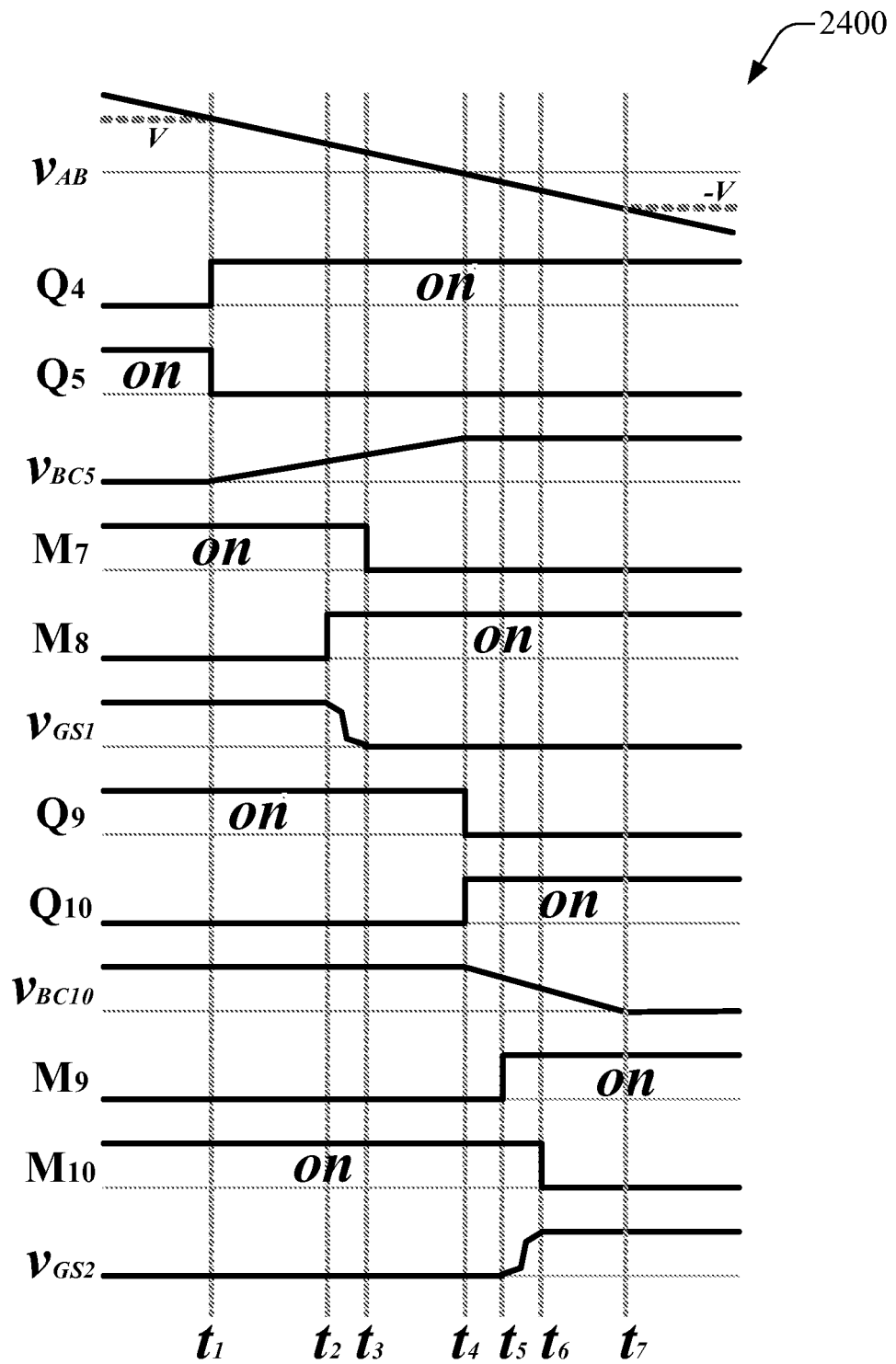
FIG. 24 depicts a timing diagram of example operation states and parameter values relating to certain components of the system comprising a self-driven multi-phase synchronous rectifier, in accordance with various aspects.

Referring to FIG. 24 and FIGS. 25A through 25H (along with FIG. 21), FIG. 24 depicts a timing diagram of example operation states and parameter values 2400 relating to certain components of the system 2600, in accordance with various aspects. FIGS. 25A through 25H illustrate diagrams of operation, in relation to time, of an example system 2500, which is a portion of the system 2100 comprising the a portion of the high-side gate-drives (e.g., SDGD component 2114 and SDGD component 2116) to facilitate demonstrating operation of the high-side portion of the SDGD subsystem (e.g., high-side gate drives) over time in accordance with various aspects of the disclosed subject matter.

Referring to FIG. 25A, illustrated is operation of the system 2500 (and the system 2100 and FIG. 21) during a time prior to time $t_1$. During the time period prior to time $t_1$, the voltage $v_{AB}$ can be at a higher voltage level than the voltage V (e.g., the voltage level for capacitor $C_1$). Both the current directions in resistors $R_7$ and $R_8$ can be from left to right as illustrated in FIG. 25A. The voltage $v_{BC5}$ can be clamped to a zero voltage by the collector-base p-n junction of the transistor $Q_5$. As a result, the switch $M_7$ (e.g., a p-channel MOSFET $M_7$) can be switched to an on state, and the switch $M_8$ (e.g., the n-channel MOSFET $M_8$) can be switched to an off state, wherein such condition can maintain the gate-source voltage of the switch 2102 ($M_1$) at a high level, thus turning the switch 2102 ($M_1$) to an on state. Also, during the time period prior to time $t_1$, the current in the resistor $R_8$ can flow through the base-collector p-n junction of the transistor $Q_9$, which can clamp the voltage $v_{BC10}$ at a specified voltage V. Due in part to the diode $D_2$ being reverse biased, the gate-source voltage of the switch $M_{10}$ can be maintained at a specified voltage V. As a result, the switch $M_9$ can be in an off state and the switch $M_{10}$ can be in an on state to facilitate maintaining the gate-source voltage of the switch 2104 ($M_2$) at a low level, and thus, in an off state.

Figure 25B:
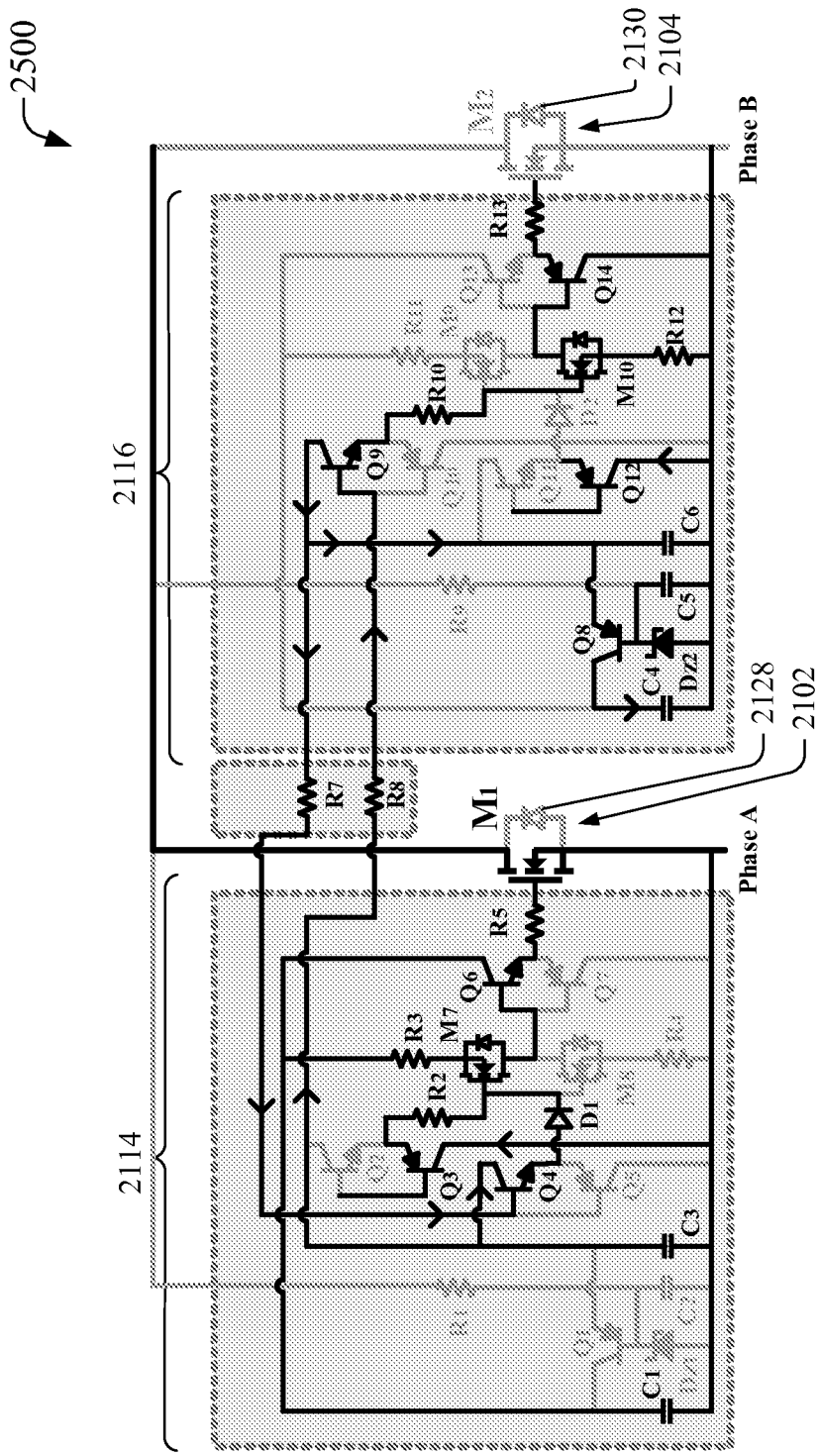

Turning to FIG. 25B, depicted is operation of the system 2500 (and the system 2100 in FIG. 21) during the time period of time $t_1$ to $t_2$. During this time period, when the voltage $v_{AB}$ reaches (e.g., drops down to) a lower voltage level than the voltage V after time $t_1$, the current in the resistor $R_7$ can change its direction. As a result, the transistor $Q_4$ can be turned to an on state from an off state, and the transistor $Q_5$ can switch from an on state to an off state. The voltage $v_{BC5}$ can begin to be charged up from a zero voltage to a higher voltage level. Due at least in part to the diode $D_1$ and the transistor $Q_4$, the gate-source voltage of the switch $M_8$ can follow or can have a voltage level that can be based at least in part on the voltage $v_{BC5}$. At or near the end of the time period of time $t_1$ to $t_2$, the gate-source voltage of the switch $M_8$ can reach its predefined gate threshold switching voltage level, at or above which the switch $M_8$ can become conductive.

Figure 25C:
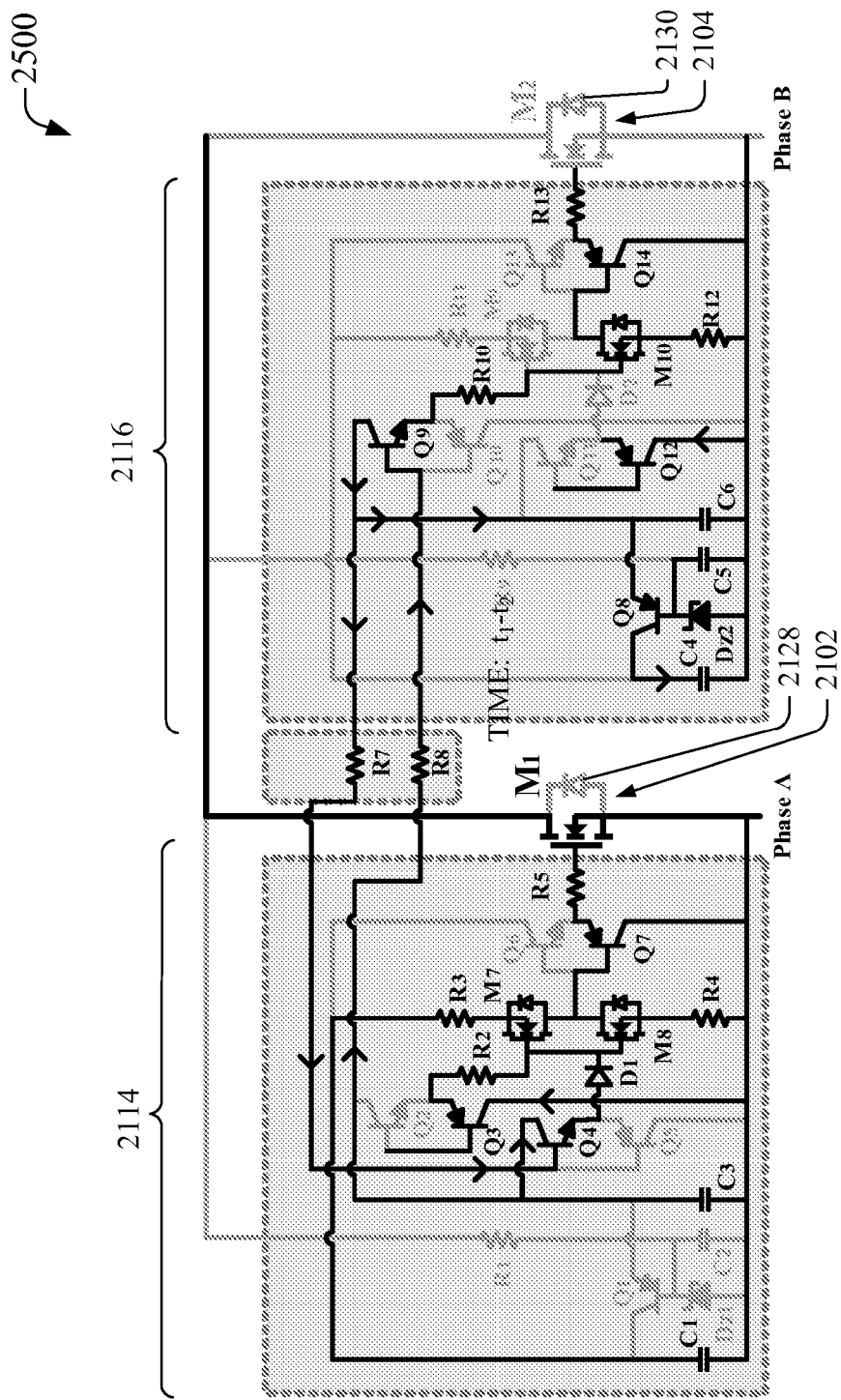

Referring to FIG. 25C, illustrated is operation of the system 2500 (and the system 2100 in FIG. 21) during the time period of time $t_2$ to $t_3$. At or near time $t_2$, when the switch $M_8$ reaches its predefined gate threshold switching voltage level, the switch $M_8$ can switch from an off state to an on state and can begin to conduct. During the time period, the voltage $v_{GS1}$ can begin to decrease from a high voltage level to a lower voltage level. The voltage $v_{BC5}$ can continue to increase in voltage level. Before the switch $M_7$ reaches (e.g., before the gate-source voltage of the switch $M_7$ drops down to) the applicable predefined gate threshold switching voltage level (e.g., below which the switch will not be conductive) for the switch $M_7$ to switch from an on state to an off state, which can occur at time $t_3$, the switch $M_7$ and switch $M_8$ can conduct simultaneously, as illustrated in FIG. 25C. At some point during this time period, the voltage $v_{GS1}$ can drop down to the applicable predefined gate threshold switching voltage of the switch 2102 ($M_1$), the time of which can be controlled at least in part by the proportion (e.g., ratio) of the resistors $R_3$ and $R_4$ (e.g., ratio of $R_3/R_4$). The time period of time $t_2$ to $t_3$ can end when the voltage $v_{GS1}$ drops down to a zero voltage and the switch 2102 ($M_1$) has been switched to an off state, which can occur when the gate-source voltage of switch 2102 is below the predefined gate threshold switching voltage for switch 2102.

Figure 25D:
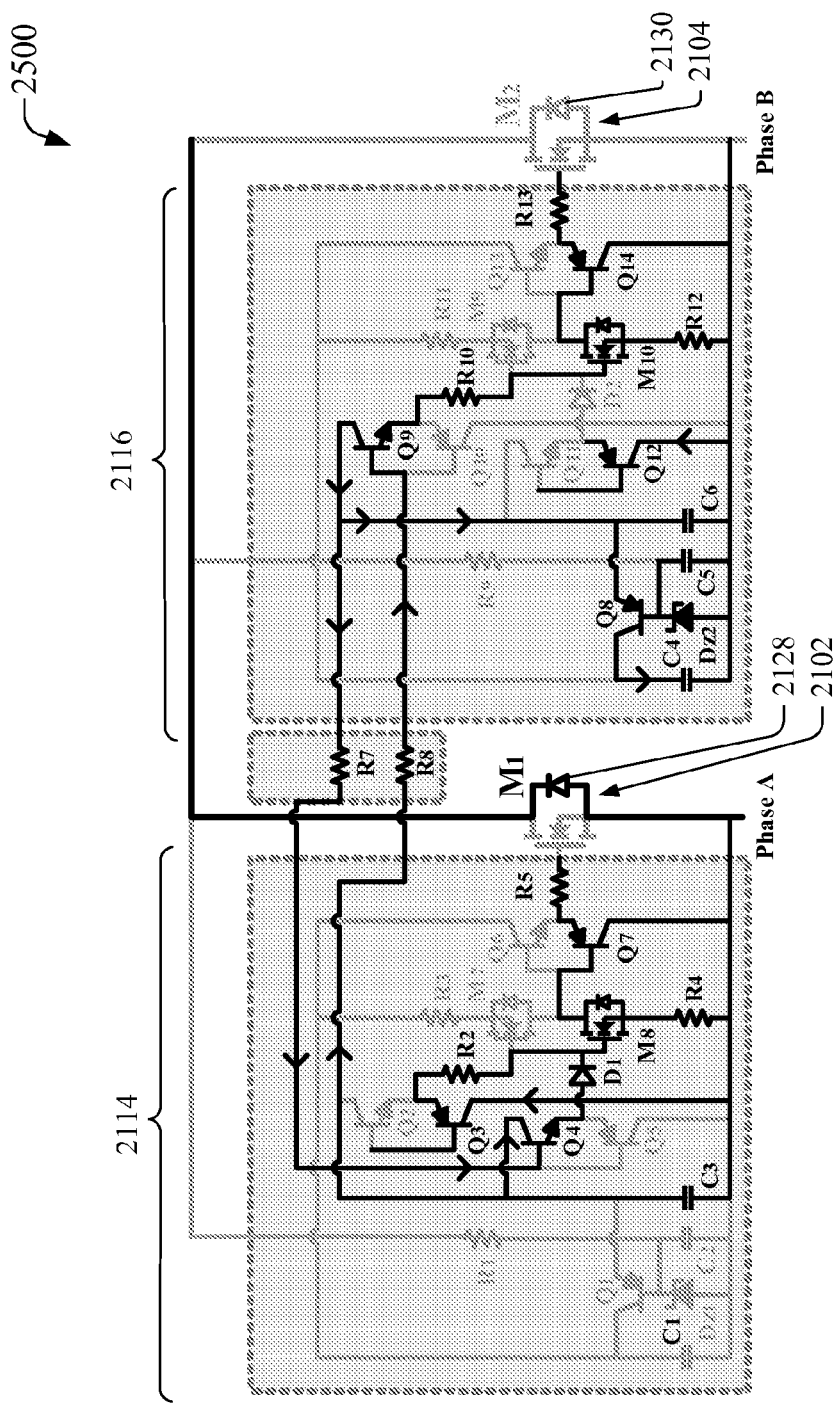

FIG. 25D depicts operation of the system 2500 (and the system 2100 in FIG. 21) during the time period of time $t_3$ to $t_4$. At or near time $t_3$, the switch $M_7$ can switch from an on state to an off state based at least in part on the predefined threshold switching voltage applicable to switch $M_7$, and the switch $M_8$ can remain in an on state to facilitate maintaining the switch 2102 ($M_1$) in an off state. The current can flow through the source drain diode of the switch 2102 ($M_1$). Commutation can occur at or near time $t_4$.

Figure 25E:
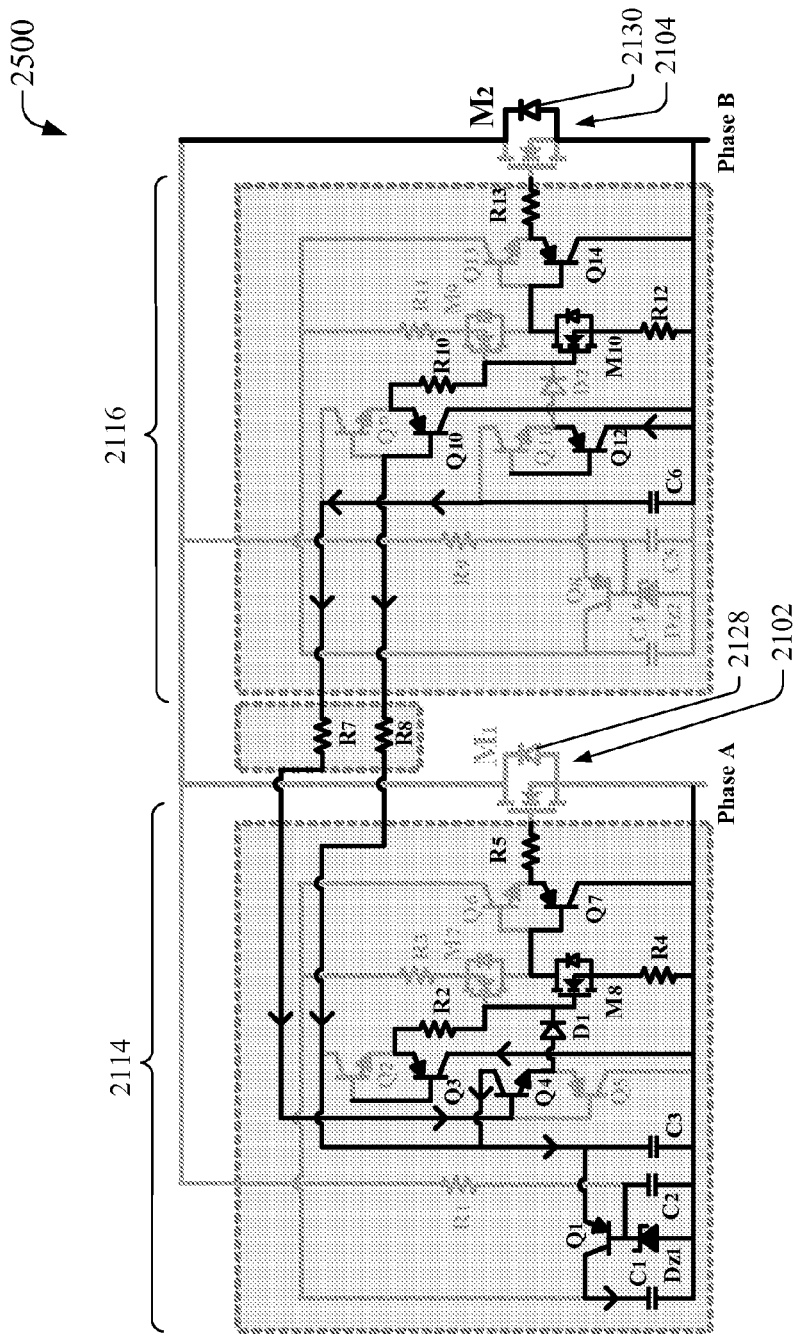

FIG. 25E depicts operation of the system 2500 (and the system 2100 in FIG. 21) during the time period of time $t_4$ to $t_5$. After time $t_4$, the voltage $v_{AB}$ can drop lower than zero volts, and when the voltage $v_{AB}$ drops lower than zero voltage, the current in the resistor $R_8$ can change its direction. The voltage $v_{BC10}$ can begin to decrease from voltage V, thereby indicating that the transistor $Q_9$ is turned from an on state to an off state, and the transistor $Q_{10}$ is turned from an off state to an on state. While at or near time $t_4$, the voltage $v_{BC5}$ can reach voltage V and can be clamped at the voltage of capacitor $C_3$ by the base-collector p-n junction of the transistor $Q_4$. Meanwhile, during the time period of time $t_4$ to $t_5$, the source drain diode of the switch 2102 ($M_1$) can be turned from an on state to an off state, and the source drain diode of the switch 2104 ($M_2$) can switch from an off state to an on state and can begin to conduct. This time period can end when voltage $v_{BC10}$ drops down to an applicable predefined threshold switching voltage for the switch $M_9$ to switch the switch $M_9$ from an off state to an on state.

Figure 25F:
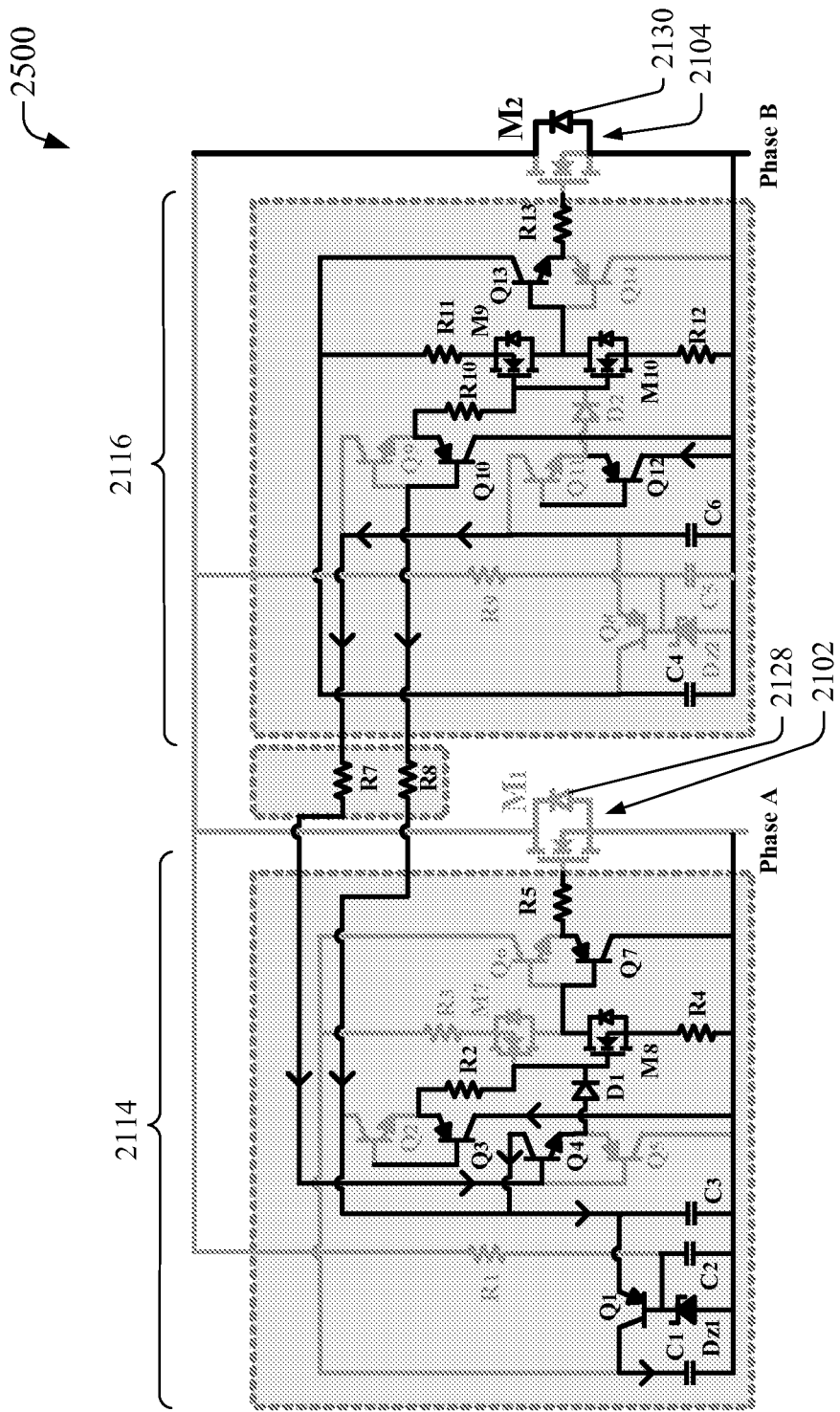

Turning to FIG. 25F, illustrated is operation of the system 2500 (and the system 2100 in FIG. 21) during the time period of time $t_5$ to $t_6$. At or near time $t_5$, the applicable predefined threshold switching voltage can be reached, and, in response, the switch $M_9$ can be turned from an off state to an on state and can begin to conduct, and voltage $v_{BC10}$ can continue to decrease. Before the voltage $v_{BC10}$ drops down to the applicable predefined gate threshold switching voltage of the switch $M_{10}$, which can occur at or near time $t_6$, the switch $M_9$ and switch $M_{10}$ can conduct simultaneously. The voltage $v_{GS2}$ can begin to increase and can reach a high level at or near the end of time period of time $t_5$ to $t_6$, which can facilitate switching the switch 2104 ($M_2$) from an off state to an on state.

Figure 25G:
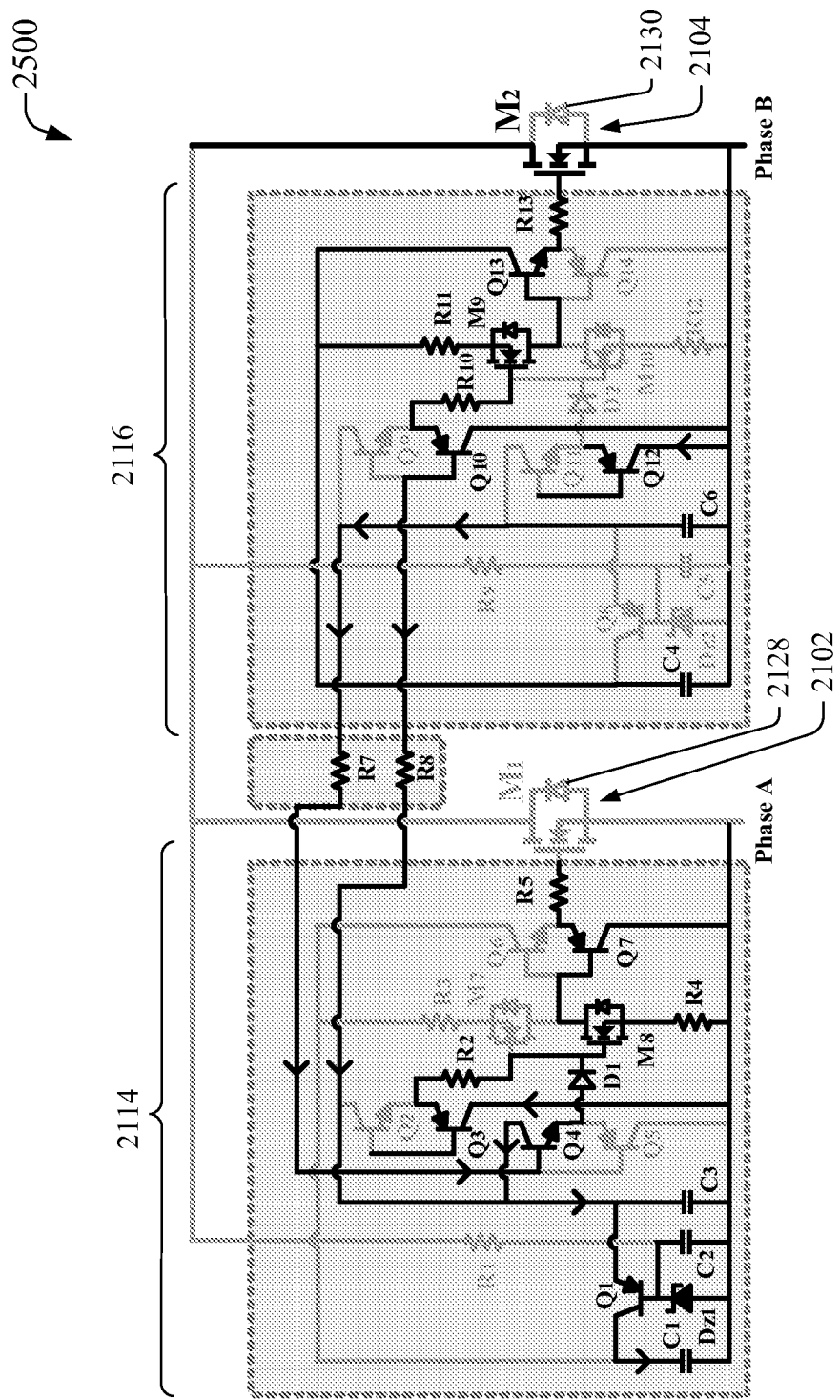

Referring to FIG. 25G, depicted is operation of the system 2500 (and the system 2100 in FIG. 21) during the time period of time $t_6$ to $t_7$. At or near time $t_6$, the voltage $v_{BC10}$ can drop down below the applicable predefined gate threshold switching voltage of the switch $M_{10}$, and, as a result, the switch $M_{10}$ can be turned from an on state to an off state, and voltage $v_{BC10}$ can continue to decrease. The time period of time $t_6$ to $t_7$ can end when voltage $v_{BC10}$ reaches zero voltage.

Figure 25H:
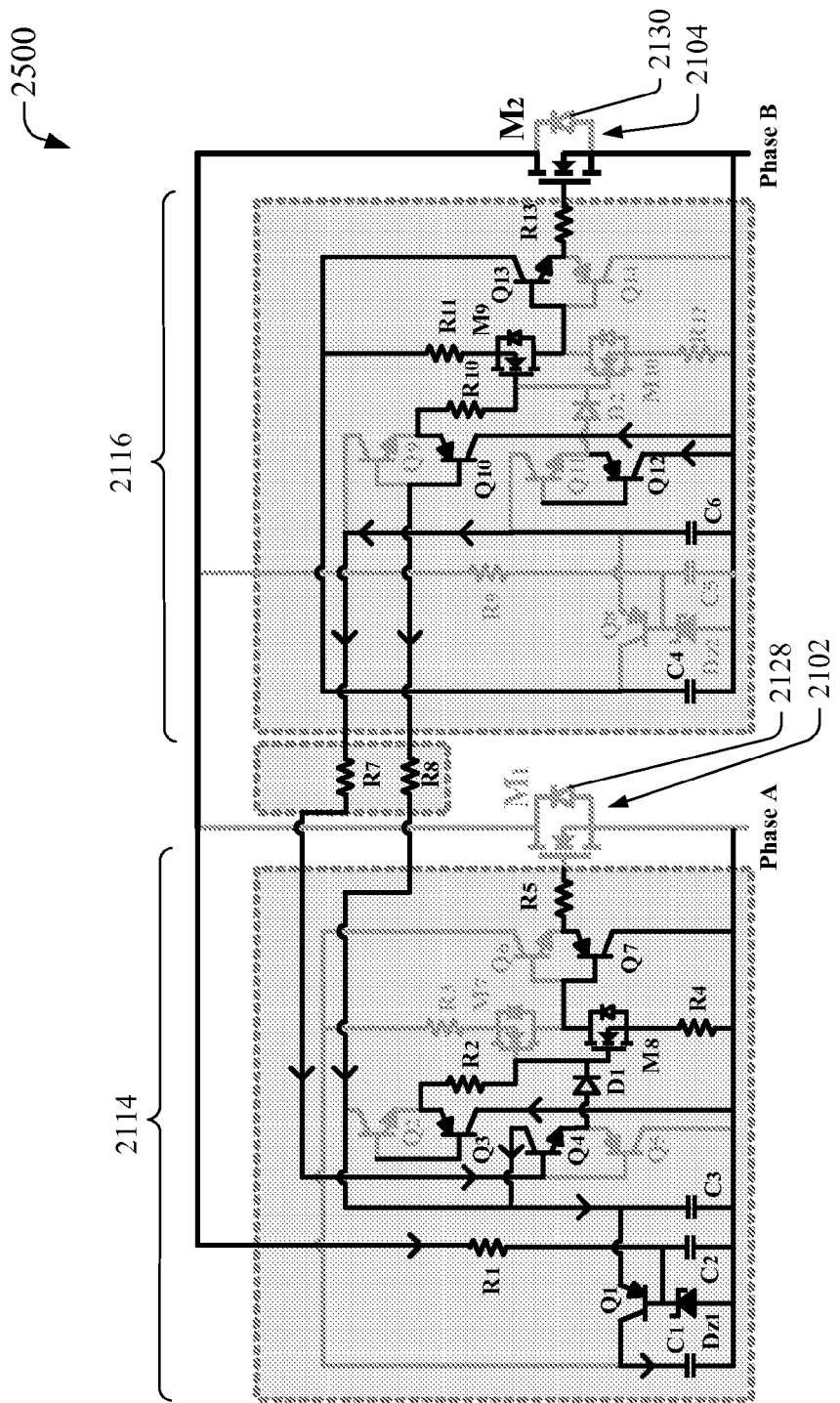

FIG. 25H illustrates operation of the system 2500 (and the system 2100 in FIG. 21) during the time period after time $t_7$. During this time period, the voltage $v_{10}$ can be at a lower voltage than $-V$. The voltage $v_{BC10}$ can be clamped to zero voltage based at least in part on the collector-base p-n junction of the transistor $Q_{10}$.

Referring again to FIG. 21, in accordance with an aspect, in the system 2100, the low-side power switches, switch 2108, switch 2110, and switch 2112 can be controlled by the SDGD circuits of the low-side portion of the SDGD subsystem. The SDGD components 2120, 2122, and 2124 can respectively include current sensing resistors $R_{S1}$, $R_{S2}$, and $R_{S3}$ and comparators $CP_1$, $CP_2$, and $CP_3$ that can be used to detect the currents in the respective switches 2108, 2110, and 2112 and drive the respective switches 2108, 2110, and 2112.

Figure 26:
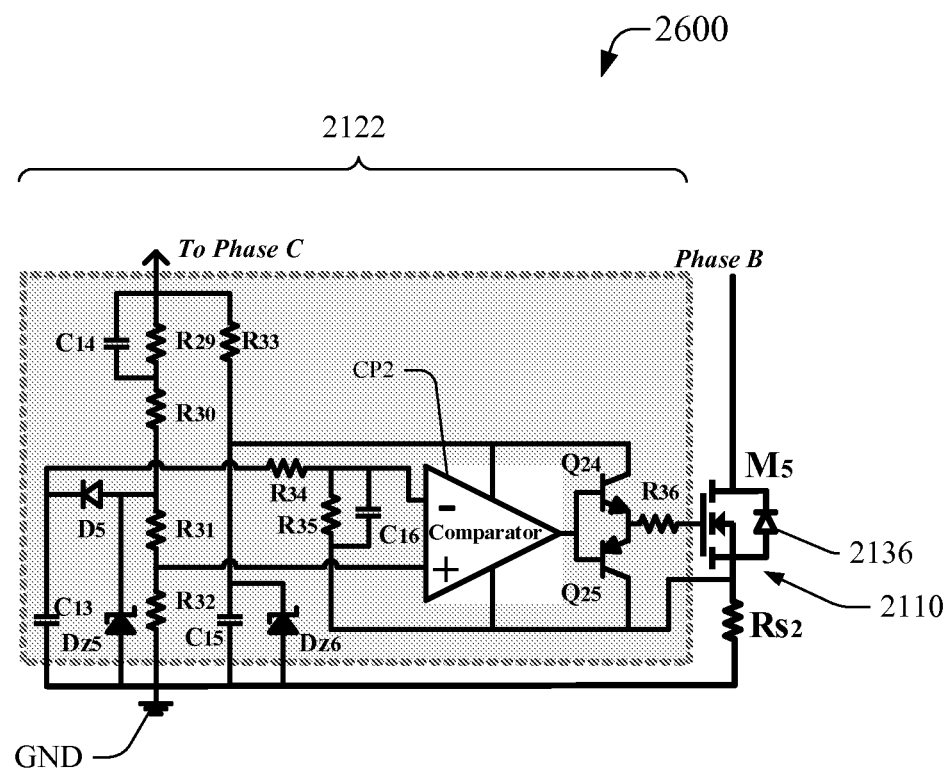
FIG. 26 illustrates an example SDGD component, which can be the drive circuit of a power switch associated with one phase of a multi-phase system, in accordance with an aspect.

Turning to FIG. 26 (along with FIG. 21), FIG. 26 illustrates an example system 2600 comprising the SDGD component 2122, which can be the drive circuit of the switch 2110 ($M_5$) (Phase B), in accordance with an aspect. In an aspect, the SDGD component 2122 can include capacitor $C_{13}$ that can be used to supply a desired positive voltage signal for the inverting inputs of the comparators $CP_1$ (as shown in FIG. 21), $CP_2$ (as shown if FIGS. 21 and 26), and $CP_3$ (as shown in FIG. 22), which can provide a desired safe margin that can be set based at least in part by the potential divider, comprising the resistors $R_{34}$ and $R_{35}$, wherein diode $D_5$ can be employed for use with capacitor $C_{13}$ and resistors $R_{34}$ and $R_{35}$, and wherein capacitor $C_{16}$ can be employed for use with comparator $CP_2$ and resistors $R_{34}$ and $R_{35}$. The output of comparator $CP_2$ can be provided to transistors $Q_{24}$ and $Q_{25}$, which can be associated with resistor $R_{36}$ to facilitate controlling switching of switch 2110. In another aspect, the voltage of capacitor $C_{15}$, which can be stabilized by the zener diode $D_{Z6}$, can be the power supply for the comparators $CP_1$, $CP_2$, and $CP_3$, wherein resistor $R_{33}$ can be employed for use with capacitor $C_{15}$ as well as other associated components, as shown in FIG. 21. The capacitor $C_{13}$ will be charged up to the designated voltage before the voltage of capacitor $C_{15}$ increases to reach a voltage high enough for the comparators $CP_1$, $CP_2$, and $CP_3$ to operate. This arrangement of the SDGD subsystem, including SDGD component 2122, can ensure that the low-side switches, switch 2108 ($M_4$), switch 2110 ($M_5$), and switch 2112 ($M_6$), to be switched only when the SDGD subsystem has completed the start-up phase and reaches steady-state operation.

Figure 27:
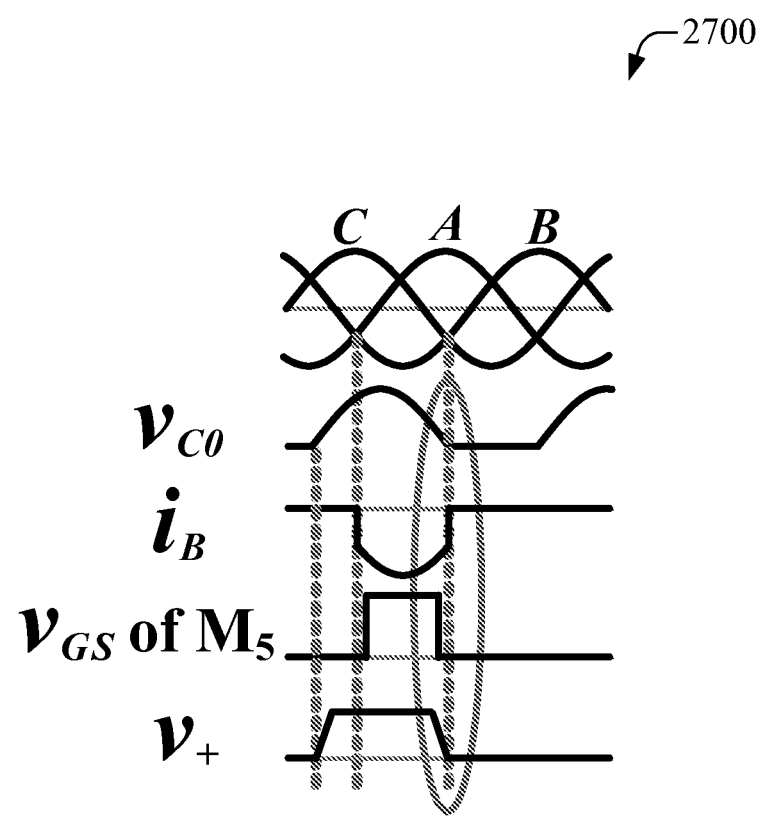
FIG. 27 depicts a diagram of example driving waveforms of one phase of a multi-phase system, comprising a multi-phase synchronous rectifier, for a resistive load in accordance with an aspect.

In an aspect, the SDSR of system 2100 is designed to manage resistive, capacitive, and/or inductive loads. Referring briefly to FIG. 27 (along with FIG. 21), illustrated is a diagram of example (e.g., typical) driving waveforms 2700 of Phase B for a resistive load in accordance with an aspect. The voltage $v_{C0}$ can be the input voltage of Phase C taking the low rectified voltage as reference zero (FIG. 21) and current $i_B$ can be the current flowing through the switch 2110 ($M_5$). The current can commutate with a sharp slope. As a result, if there is not additional circuitry (e.g., additional control circuit) to facilitate turning the comparator $CP_2$ to an off state at the zero-crossing point, the comparator $CP_2$ can or may not respond quickly enough to turn the power switch 2110 ($M_5$) from an on state to an off state under such a fast current change, which can or may cause an undesirable short circuit situation. To counter this potential problem, the subject specification (e.g., system 2100, system 2100) can include a zero-crossing controller component to that can facilitate desired switching of an associated power switch at zero-crossing points.

Figure 28:
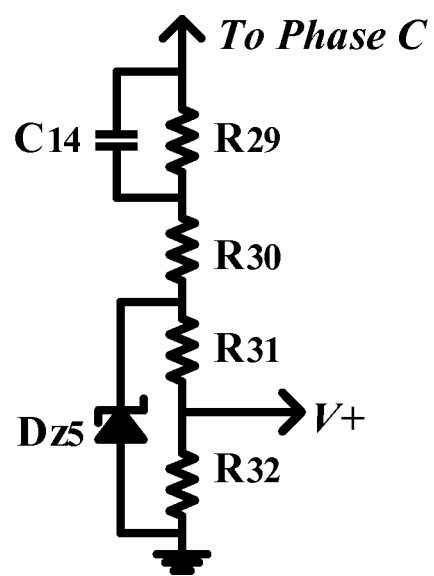
FIG. 28 illustrates an example zero-crossing controller component that can facilitate at least partially controlling operation of a comparator and associated power switch at desired times in accordance with an aspect.

Referring briefly to FIG. 28 (along with FIG. 21 and FIG. 21), illustrated is an example zero-crossing controller component 2800 that can facilitate at least partially controlling operation (e.g., switching) of a comparator (e.g., $CP_2$) and associated power switch (e.g., switch 2110 ($M_5$)) at desired times (e.g., at or near zero-crossing points) in accordance with an aspect. In an aspect, the zero-crossing controller component 2800 can provide or supply a desired relatively small positive voltage signal to the non-inverting inputs of a comparator (e.g., $CP_2$). The small positive voltage signal can be generated from the input voltage of Phase C as illustrated in FIG. 27, which illustrates a diagram of example driving waveforms 2700 of the Phase B low-side portion (e.g., SDGD component 2122) of the SDGD subsystem. In an aspect, the small positive voltage signal can facilitate ensuring that the comparator $CP_2$ can operate to apply a desired voltage to the gate of the power switch 2110 ($M_5$) to switch the power switch 2110 ($M_5$) in time at or near the zero-crossing point to prevent an undesirable short circuit situation. In another aspect, the zero-crossing controller component 2800 can contain a zener diode $D_{z5}$ which can have a desired predefined rating voltage (e.g., 10V). When the voltage $v_{C0}$ begins to rise from zero volts, the voltage of the zener diode $D_{z5}$ will rise until the voltage level reaches the predefined rating voltage of the zener diode $D_{z5}$. The zener diode $D_{z5}$ can maintain this voltage at the predefined rating voltage with very small fluctuation. In still another aspect, the zero-crossing controller component 2800 can include resistors $R_{31}$ and $R_{32}$ that can form a voltage divider to facilitate scaling down the voltage signal (with a desired amount of scaling down) with reduced fluctuation, and also can include capacitor $C_{14}$, and resistors $R_{29}$ and $R_{30}$, for use in the zero-crossing controller component 2800.

Referring again to FIG. 21 and system 2100, it is to be appreciated and understood that, due at least in part to the symmetry of the system 2100, the system 2100, as disclosed herein with regard to operation of the system wherein the output phase changes from phase A to phase B, can correspondingly operate as the output phase changes from phase B to phase C, and from phase C to phase A. As a result, corresponding components (e.g., resistors, capacitors, transistors, diodes, zener diodes, switches, etc.) of SDGD component 2118 can operate in a same or similar manner as the SDGD components 2114 and 2116 (e.g., in the high-side portion of the SDGD subsystem), and the SDGD components 2120 and 2124 can operate in a same or similar manner as the SDGD component 2122 (e.g., in the low-side portion of the SDGD subsystem). Thus, components of SDGD component 2116, including, for example, resistors ($R_9$ through $R_{13}$, inclusive), capacitors ($C_4$ through $C_6$, inclusive), switches ($M_9$ and $M_{10}$), transistors ($Q_8$ through $Q_{14}$, inclusive), diode $D_2$, and zener diode $D_{z2}$, and components of SDGD component 2118, including, for example, resistors ($R_{17}$ through $R_{21}$, inclusive), capacitors ($C_7$ through $C_9$, inclusive), switches ($M_{11}$ and $M_{12}$), transistors ($Q_{15}$ through $Q_{21}$, inclusive), diode $D_3$, and zener diode $D_{z3}$, can function in a same or similar manner as corresponding components in SDGD component 2112. Further, components of SDGD component 2120, including, for example, resistors ($R_{22}$ through $R_{28}$, inclusive), capacitors ($C_{10}$ through $C_{12}$, inclusive), transistors ($Q_{22}$ and $Q_{23}$), diode $D_4$, and zener diode $D_{z4}$, and components of SDGD component 2124, including, for example, resistors ($R_{37}$ through $R_{43}$, inclusive), capacitors ($C_{17}$ through $C_{19}$, inclusive), transistors ($Q_{26}$ and $Q_{27}$), diode $D_6$, and zener diode $D_{z7}$, can function in a same or similar manner as corresponding components in SDGD component 2122. Furthermore, resistors $R_{14}$, $R_{15}$, and $R_{16}$ can function in a same or similar manner as resistors $R_6$, $R_7$, and $R_8$.

Figure 29:
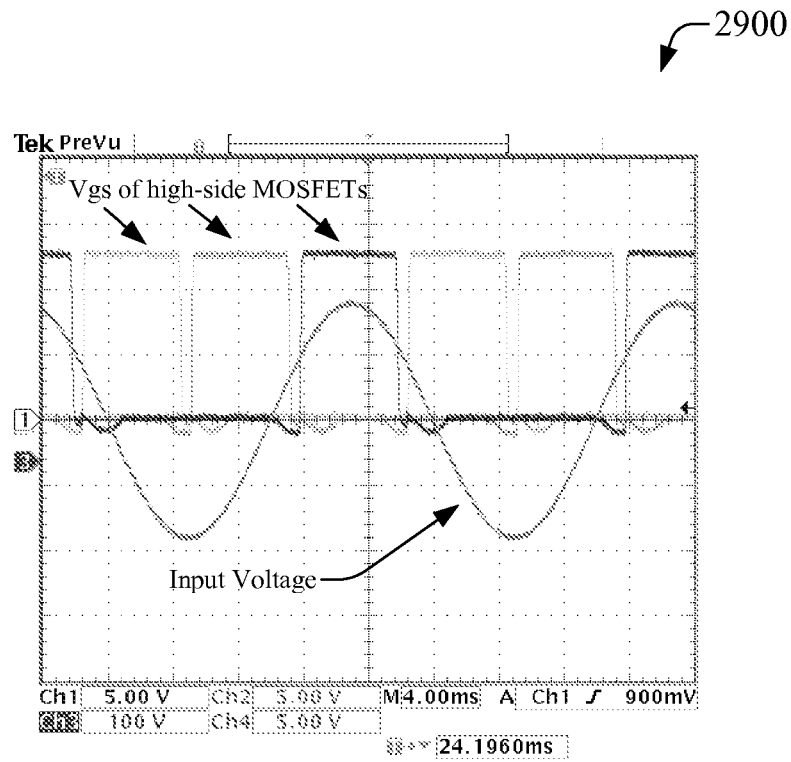
FIG. 29 is a diagram of an example graph illustrating gate-source voltage signals of three high-side (VCSD) switches and the input voltage of one phase of a three-phase system, comprising a three-phase synchronous rectifier, for a resistive load, in accordance with an aspect.
Figure 30:
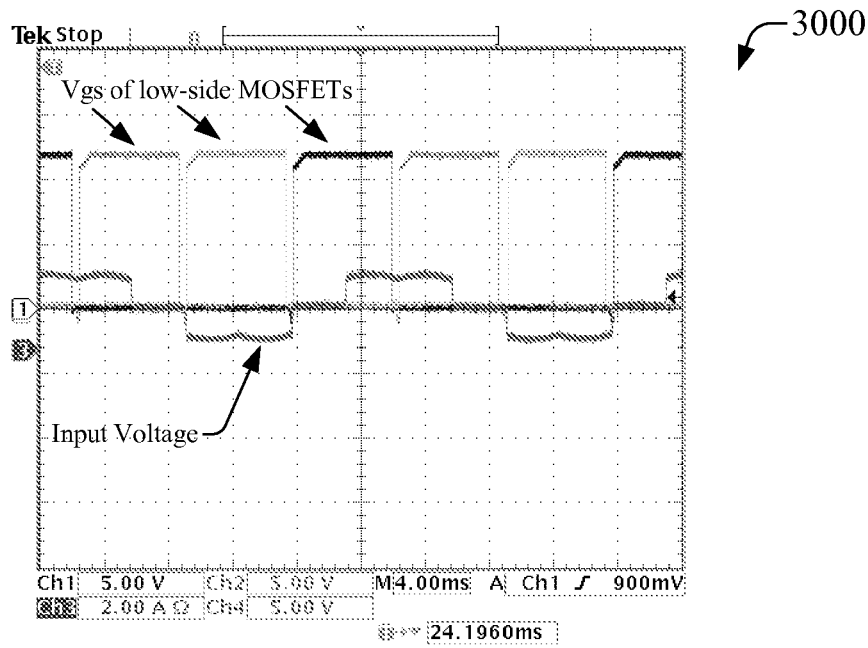
FIG. 30 depicts a diagram of an example graph that shows the corresponding gate-source voltage signals for the low-side (CCSD) switches and the input current of one phase of the three-phase system, comprising a three-phase synchronous rectifier, for the resistive load, in accordance with an aspect.

Turning to FIG. 29, illustrated is a diagram of an example graph 2900 showing the gate-source voltage signals (Vgs) of the three high-side (VCSD) switches (e.g., switch 2102, switch 2104, and switch 2106) (represented in the graph 2900 as blue-colored, light-blue-colored, and green-colored waveforms) and the input voltage of one phase (represented in the graph 2900 as a pink-colored waveform) of a three-phase system for a resistive load, in accordance with an aspect. FIG. 30 illustrates a diagram of an example graph 3000 that shows the corresponding gate-source voltage signals (Vgs) for the low-side (CCSD) switches (e.g., switch 2108, switch 2110, and switch 2112) (represented in the graph 3000 as blue-colored, light-blue-colored, and green-colored waveforms) and the input current of one phase (represented in the graph 3000 as a pink-colored waveform) of the three-phase system for the resistive load, in accordance with an aspect.

Figure 31:
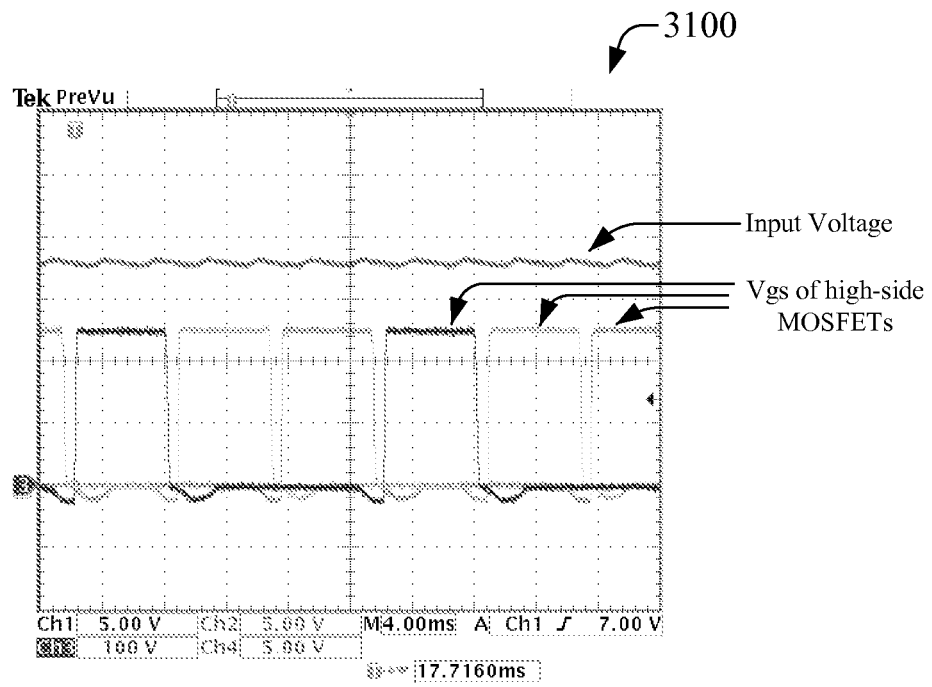
FIG. 31 illustrates a diagram of an example graph illustrating gate-source voltage signals of three high-side (VCSD) switches and the input voltage of one phase of a three-phase system, comprising a three-phase synchronous rectifier, for a capacitive-resistive load, in accordance with an aspect.
Figure 32:
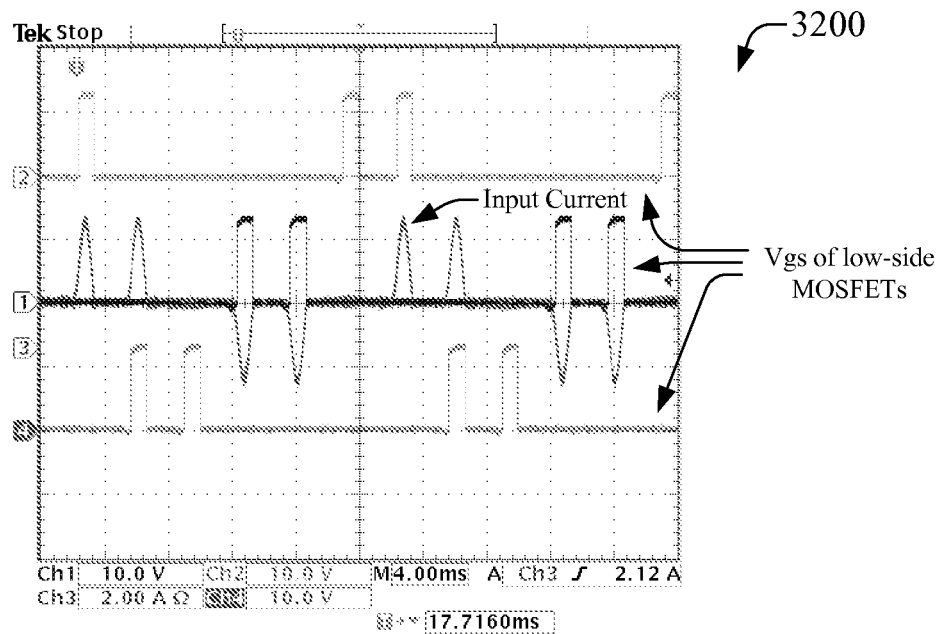
FIG. 32 depicts a diagram of an example graph that illustrates corresponding gate-source voltage signals for the low-side (CCSD) switches and the input current of one phase of the three-phase system, comprising a three-phase synchronous rectifier, for a capacitive-resistive load, in accordance with an aspect.

Referring to FIG. 31, illustrated is a diagram of an example graph 3100 illustrating the gate-source voltage signals (Vgs) of the three high-side (VCSD) switches (e.g., switch 2102, switch 2104, and switch 2106) (represented in the graph 3100 as blue-colored, light-blue-colored, and green-colored waveforms) and the input voltage of one phase (represented in the graph 3100 as a pink-colored waveform) of a three-phase system for a capacitive-resistive load, in accordance with an aspect. FIG. 32 depicts a diagram of an example graph 3200 that illustrates the corresponding gate-source voltage signals (Vgs) for the low-side (CCSD) switches (e.g., switch 2108, switch 2110, and switch 2112) (represented in the graph 3200 as blue-colored, light-blue-colored, and green-colored waveforms) and the input current of one phase (represented in the graph 3200 as a pink-colored waveform) of the three-phase system for a capacitive-resistive load, in accordance with an aspect.

For an inductive-resistive load connected to a three-phase system comprising the SDSR (e.g., system 2100), the input voltage and current are substantially the same as that of the resistive load. A larger inductor typically only causes the fluctuation of the input current to be smaller, which does not affect the function of the driver. So the driving signals for an inductive-resistive load are the same, or at least substantially the same, as the driving signals with a resistive load.

Figure 33:
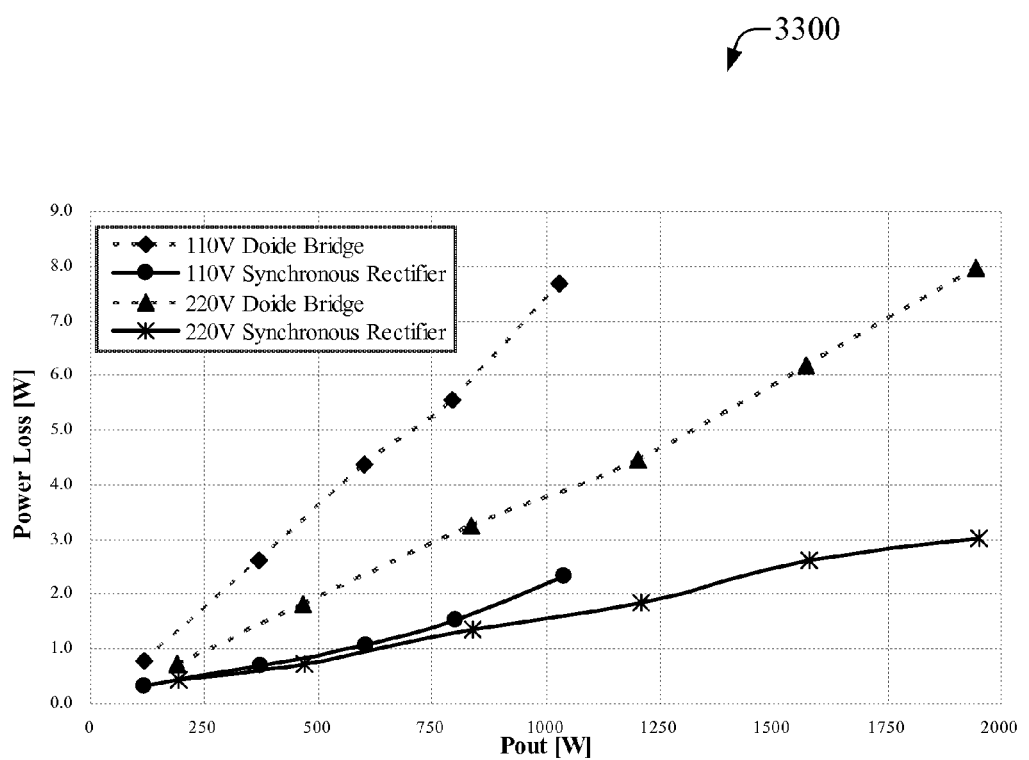
FIG. 33 illustrates a diagram of a graph of respective power loss of the multi-phase synchronous rectifier and a conventional diode rectifier under various mains operations, in an aspect.

FIG. 33 illustrates a diagram of a graph 3300 of respective power loss of the multi-phase SDSR (e.g., of system 2100) and a conventional diode rectifier under the mains operations of 110V (up to 1 kW output power) and 220V (up to 1.95 kW output power), in an aspect. As can be seen from the graph 3300, at 1 kW and 110V operation, the multi-phase SDSR can realize a 69% power loss reduction in relation to the conventional diode rectifier. At 1.95 kW and 220V operation, the multi-phase SDSR can realize a power loss reduction of 61% as compared to the conventional diode rectifier.

The subject specification can employ a SDSR (e.g., self-driven multi-phase AC-DC synchronous rectifier) that can be employed to replace a diode bridge as a general-purpose multi-phase AC-DC rectifier. Similar to the single-phase SDSR disclosed herein, the high-side portion and low-side portion (SDGD subsystem) of the multi-phase SDSR can efficiently (e.g., with regard to reduced cost, relative ease of implementation, improved power loss reduction, etc.) provide the normal rectification functions for resistive, capacitive and inductive loads as a traditional diode rectifier would provide, except that the power loss of the multi-phase SDSR can be up to 69% less than that of a traditional diode bridge. The subject specification can result in a net cost reduction stemming in part from a reduction in the size of the heatsink to be employed when using the multi-phase SDSR as compared to a traditional diode rectifier as well as the energy-saving (e.g., power loss reduction), which can more than compensate for any potential minor increase in the component counts of the inexpensive and low-power components in the high-side portion and low-side portion. In another aspect, the multi-phase SDSR disclosed herein can achieve high system compactness as compared to conventional rectifiers, due at least in part to reduced heat dissipation of the multi-phase SDSR relative to conventional rectifiers.

It is to be appreciated and understood that various example component values (e.g., resistance values, capacitance values, etc.) have been disclosed herein with regard to various example components (e.g., resistors, capacitors, etc.). These example component values are but non-limiting examples of component values that can be employed in accordance with various aspects and embodiments of the disclosed subject matter, and the subject specification is no so limited, as in accordance with various other embodiments, other component values and component arrangements can be employed consistent with the disclosed subject matter to construct or create a SDSR that can function as disclosed herein, and all such embodiments are considered to be part of the subject specification.

In accordance with one embodiment of the disclosed subject matter, the systems, subsystems, devices, and/or other components disclosed herein, can be situated or implemented on a single integrated-circuit chip. In accordance with another embodiment, the systems, subsystems, devices, and/or other components disclosed herein, can be implemented on an application-specific integrated-circuit (ASIC) chip. In yet another embodiment, the systems, subsystems, devices, and/or other components disclosed herein, can be situated or implemented on multiple dies or chips.

The aforementioned systems and/or devices have been described with respect to interaction between several components. It should be appreciated that such systems and components can include those components or sub-components specified therein, some of the specified components or sub-components, and/or additional components. Sub-components could also be implemented as components communicatively coupled to other components rather than included within parent components. Further yet, one or more components and/or sub-components may be combined into a single component providing aggregate functionality. The components may also interact with one or more other components not specifically described herein for the sake of brevity, but known by those of skill in the art.

Figure 34:
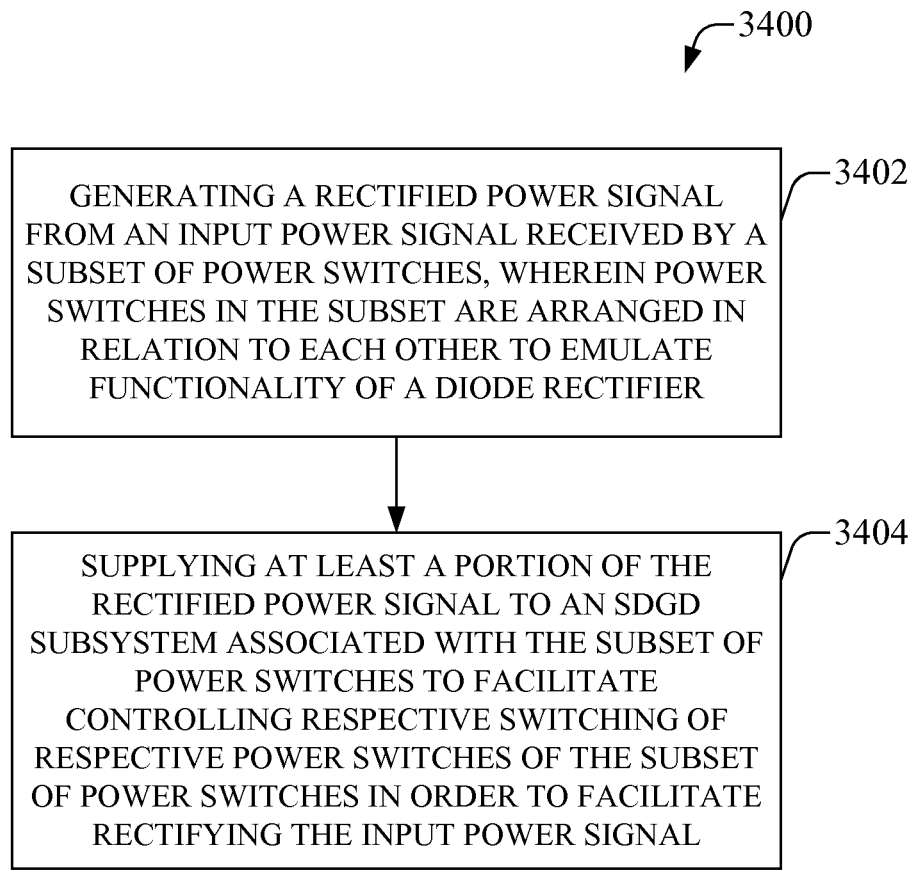
FIG. 34 depicts a flowchart of an exemplary methodology for efficiently rectifying an input power signal in accordance with various embodiments and aspects of the disclosed subject matter.
Figure 35:
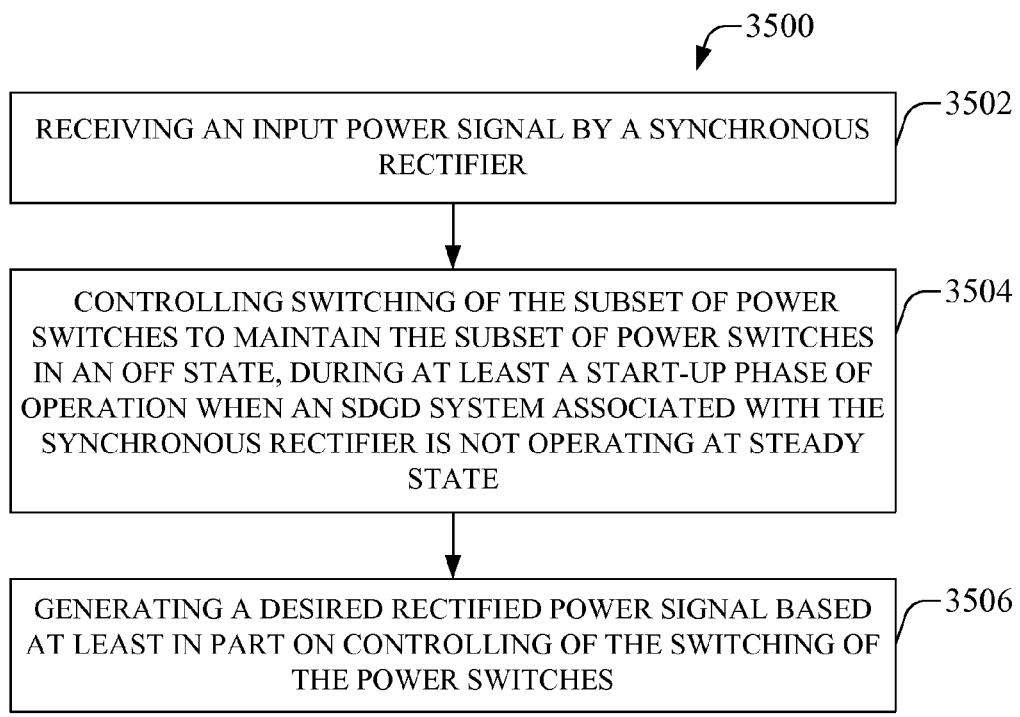
FIG. 35 illustrates a flowchart of an exemplary methodology that can facilitate rectifying an input power signal in accordance with various aspects of the disclosed subject matter.
Figure 36:
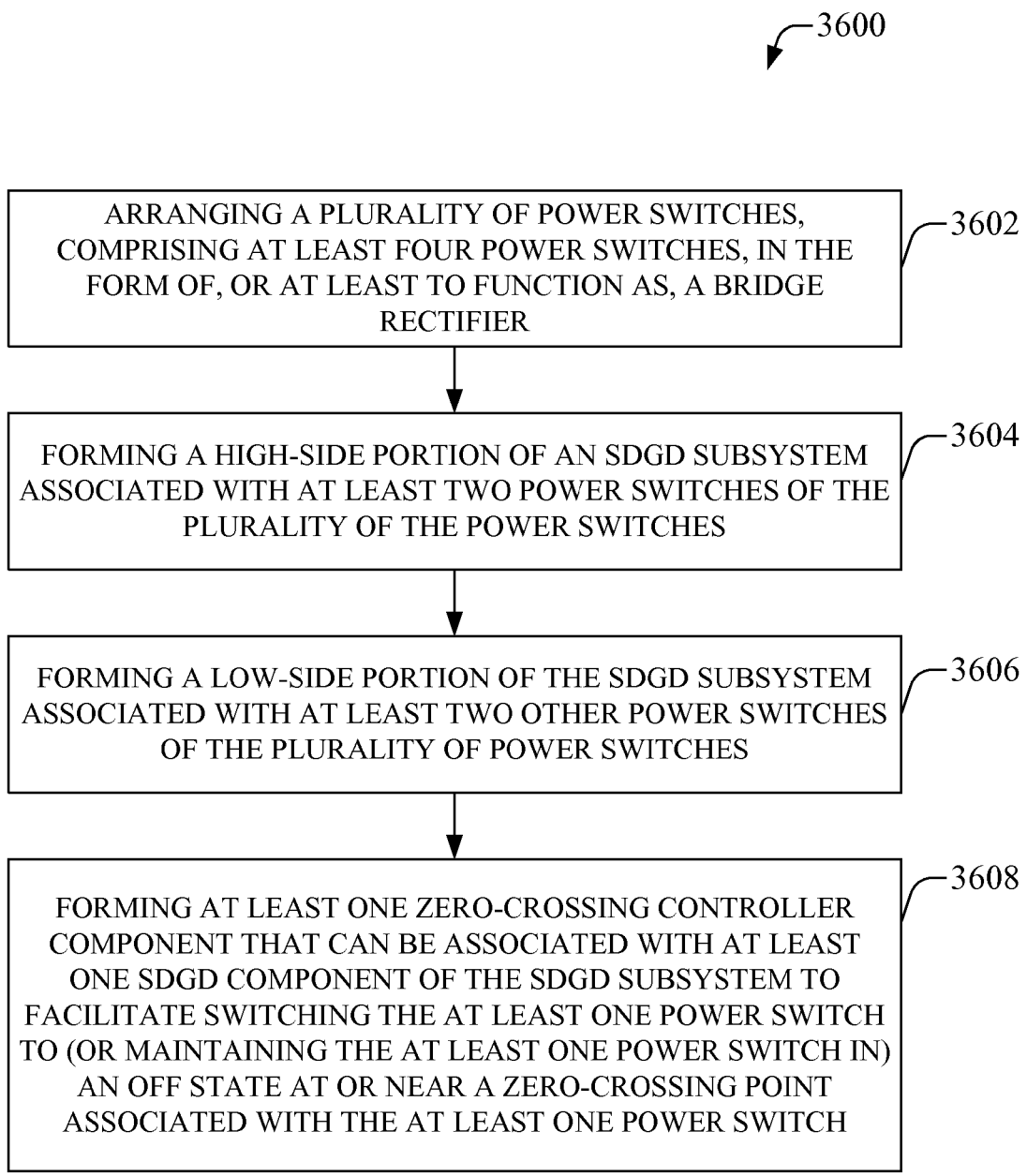
FIG. 36 depicts a flowchart of an exemplary methodology for creating a synchronous rectifier in accordance with various aspects and embodiments of the disclosed subject matter.

FIGS. 34-36 illustrate methodologies and/or flow diagrams in accordance with the disclosed subject matter. For simplicity of explanation, the methodologies are depicted and described as a series of acts. It is to be understood and appreciated that the subject disclosure is not limited by the acts illustrated and/or by the order of acts, for example acts can occur in various orders and/or concurrently, and with other acts not presented and described herein. Furthermore, not all illustrated acts may be required to implement the methodologies in accordance with the disclosed subject matter. In addition, those skilled in the art will understand and appreciate that the methodologies could alternatively be represented as a series of interrelated states via a state diagram or events.

Referring to FIG. 34, an example methodology 3400 for efficiently rectifying an input power signal in accordance with various embodiments and aspects of the disclosed subject matter is illustrated. The methodology 3400 can be utilized in single-phase and multi-phase systems. At 3402, a rectified power signal can be generated from an input power signal received by a subset of power switches, wherein power switches in the subset are arranged in relation to each other to emulate functionality of a diode rectifier. At 3404, at least a portion of the rectified power signal can be supplied to an SDGD subsystem associated with the subset of power switches to facilitate controlling respective switching of respective power switches of the subset of power switches in order to facilitate rectifying the input power signal.

Turning to FIG. 35, illustrated is an example methodology 3500 that can facilitate rectifying an input power signal in accordance with various aspects of the disclosed subject matter. The methodology 3500 can be utilized in single-phase and multi-phase systems. At 3502, an input power signal (e.g., high power signal, such as 110 volts or 220 volts) can be received by a synchronous rectifier (e.g., SDSR).

At 3504, during at least a start-up phase of operation when an SDGD system associated with the synchronous rectifier is not operating at steady state, switching of the subset of power switches can be controlled to maintain the subset of power switches in an off state.

In an aspect, during the start-up stage before the rectified DC output voltage is ready to power up the control circuitry (e.g., SDGD system) for the switches (e.g., MOSFETs), the body diodes of the switches, which are arranged in relation to each other to form the traditional diode bridge rectifier circuit, can provide the initial rectification function. During the initial start-up stage (prior to steady-state operation of the SDSR), the conduction loss can be equivalent to that of a power diode bridge, however, the start-up stage lasts for only a short period of time. Once the rectified DC output voltage is available to power the control circuitry for the switches, the normal synchronous rectification of the SDSR with the relatively low conduction loss (as compared to conventional rectifier bridges) can begin. It is noted that, for a single-phase SDSR, the diagonal pair of switches can be turned on and off together to form a conducting path. For instance, with regard briefly to FIG. 1, switches 102 and 108 can form one pair, and switches 104 and 106 can form the other pair. However, these two pairs respective pairs of switches can be turned on and off in a complementary manner. That is, when switch 102 and switch 108 are turned on, switch 104 and switch 106 are turned off, and vice versa.

At 3506, a desired rectified power signal (e.g., rectified DC power signal) can be generated based at least in part on controlling of the switching of the power switches. As desired, the rectified power signal can be connected to a desired load (e.g., resistive, capacitive, and/or inductive load).

FIG. 36 depicts an example methodology 3600 for creating a synchronous rectifier (e.g., SDSR) in accordance with various aspects and embodiments of the disclosed subject matter. At 3602, a plurality of power switches, comprising at least four power switches, can be arranged in the form of, or at least to function as, a bridge rectifier.

At 3604, a high-side portion of an SDGD subsystem, which can be associated with at least two power switches of the plurality of the power switches, can be formed. In an embodiment, the power switches (e.g., high-side power switches) can be VCSD MOSFET switches. It is to be appreciated and understood that, as desired, in accordance with other embodiments, the high-side power switches can be CCSD MOSFET switches.

At 3606, a low-side portion of the SDGD subsystem, which can be associated with at least two other power switches of the plurality of power switches, can be formed. In an embodiment, the two other power switches (e.g., low-side power switches) can be CCSD MOSFET switches.

At 3608, at least one zero-crossing controller component can be formed, wherein the at least one zero-crossing controller component can be associated with at least one power switch of the plurality of power switches to facilitate switching the at least one power switch to (or maintaining the at least one power switch in) an off state at or near a zero-crossing point (e.g., zero-voltage-crossing point at each half-cycle of an input AC voltage signal) associated with the at least one power switch. In an aspect, a zero-crossing controller component can supply a relatively small positive voltage signal to a non-inverting input of a comparator associated with the at least one power switch to facilitate ensuring that the at least one power switch is turned of at or near the zero-crossing point, wherein the comparator can be employed to facilitate controlling switching of the at least one power switch component. The zero-crossing controller component can thereby facilitate preventing an undesirable short circuit situation in the synchronous rectifier.

Some portions of the detailed description have been presented in terms of algorithms and/or symbolic representations of operations on data bits within a computer memory. These algorithmic descriptions and/or representations are the means employed by those cognizant in the art to most effectively convey the substance of their work to others equally skilled. An algorithm is here, generally, conceived to be a self-consistent sequence of acts leading to a desired result. The acts are those requiring physical manipulations of physical quantities. Typically, though not necessarily, these quantities take the form of electrical and/or magnetic signals capable of being stored, transferred, combined, compared, and/or otherwise manipulated.

It has proven convenient at times, principally for reasons of common usage, to refer to these signals as bits, values, elements, symbols, characters, terms, numbers, or the like. It should be borne in mind, however, that all of these and similar terms are to be associated with the appropriate physical quantities and are merely convenient labels applied to these quantities. Unless specifically stated otherwise as apparent from the foregoing discussion, it is appreciated that throughout the disclosed subject matter, discussions utilizing terms such as processing, computing, calculating, determining, and/or displaying, and the like, refer to the action and processes of computer systems, and/or similar consumer and/or industrial electronic devices and/or machines, that manipulate and/or transform data represented as physical (electrical and/or electronic) quantities within the computer's and/or machine's registers and memories into other data similarly represented as physical quantities within the machine and/or computer system memories or registers or other such information storage, transmission and/or display devices.

It is to be appreciated and understood that components (e.g., synchronous rectifier, multi-phase synchronous rectifier, SDGD subsystem, SDGD component, zero-crossing controller component, etc.), as described with regard to a particular system, device, or methodology, can include the same or similar functionality, or a desired portion thereof, as respective components (e.g., respectively named components, similarly named components) as described with regard to other systems, devices, or methodologies disclosed herein.

However, it is also to be appreciated and understood that a named component of one system, device, or methodology does not necessarily have to be the same or similar as, or have the same or similar functionality as, a same or similarly named component in another system, device, or methodology.

What has been described above includes examples of aspects of the disclosed subject matter. It is, of course, not possible to describe every conceivable combination of components or methodologies for purposes of describing the disclosed subject matter, but one of ordinary skill in the art may recognize that many further combinations and permutations of the disclosed subject matter are possible. Accordingly, the disclosed subject matter is intended to embrace all such alterations, modifications and variations that fall within the spirit and scope of the appended claims. Furthermore, to the extent that the terms "includes," "has," or "having," or variations thereof, are used in either the detailed description or the claims, such terms are intended to be inclusive in a manner similar to the term "comprising" as "comprising" is interpreted when employed as a transitional word in a claim.

What is claimed is:

1. A system that facilitates synchronous rectification of an input power signal, comprising:
    a subset of power switches configured to receive the input power signal and rectify the input power signal to generate a rectified power signal as an output;
    a self-driven gate-drive (SDGD) subsystem configured to facilitate control of respective switching of respective power switches of the subset of power switches, wherein the SDGD subsystem is powered by the rectified power signal or the input power signal, wherein the SDGD subsystem comprises a subset of switches that are configured to form an inverter to facilitate the control of switching of a first power switch of the subset of power switches based at least in part on respective switch states of the subset of switches, wherein the SDGD subsystem is further configured to comprise a set of capacitors comprising a first capacitor, a second capacitor, and a third capacitor, and the SDGD subsystem controls respective charging of the first capacitor, the second capacitor, and the third capacitor to charge the first capacitor to a first voltage that is higher than a second voltage of the second capacitor before the third capacitor is charged to a third voltage that satisfies a threshold to switch the first power switch from a first switch state to a second switch state, and wherein the control of the respective charging of the first capacitor, the second capacitor, and the third capacitor facilitates maintaining the first power switch in the first switch state during a start-up phase of operation of the system until the SDGD subsystem is determined to be operating in steady state; and
    a zero-crossing controller component configured to facilitate supplying a defined positive voltage signal to a comparator of the SDGD subsystem to facilitate the control of a second power switch of the subset of power switches that is associated with the comparator to switch the second power switch from an on state to an off state at or substantially close to a zero-voltage-crossing point at a half-cycle of the input power signal associated with the second power switch.

2. The system of claim 1, wherein the subset of power switches is further configured to comprise a first high-side power switch, at least one other high-side power switch, a first low-side power switch, and at least one other low-side power switch that are arranged and associated with each other to form and function as a diode bridge to facilitate rectification of the input power signal to generate the rectified power signal, and wherein the first power switch is the first high-side power switch and the second power switch is the first low-side power switch.

3. The system of claim 2, wherein the input power signal is a multi-phase power signal, which has at least three phases, wherein the subset of power switches is further configured to comprise a first high-side power switch, a second high-side power switch, a third high-side power switch, a first low-side power switch, a second low-side power switch, and a third low-side power switch that are arranged and associated with each other to form and function as the diode bridge to facilitate the rectification of the multi-phase power signal to generate the rectified power signal.

4. The system of claim 2, wherein the first high-side power switch and the at least one other high-side power switch are respectively configured to be voltage-controlled self-driven switches, and the first low-side power switch and the at least one other low-side power switch are respectively configured to be current-controlled self-driven switches.

5. The system of claim 4, wherein the SDGD subsystem is further configured to comprise:
    a first high-side SDGD component, at least one other high-side SDGD component, a first low-side SDGD component, and at least one other low-side SDGD component, wherein the first high-side SDGD component is configured to comprise voltage-controlled gate-drive circuitry and is associated with the first high-side power switch, the at least one other high-side SDGD component is configured to comprise voltage-controlled gate-drive circuitry and is associated with the at least one other high-side power switch, the first low-side SDGD component is configured to comprise current-controlled gate-drive circuitry and is associated with the first low-side power switch, and the at least one other SDGD component is configured to comprise current-controlled gate-drive circuitry and is associated with the at least one other low-side power switch.

6. The system of claim 5, wherein at least one of the first high-side SDGD component, the at least one other high-side SDGD component, the first low-side SDGD component, or the at least one other low-side SDGD component, is further configured to receive at least a portion of the rectified power signal to facilitate operation of the at least one of the first high-side SDGD component, the at least one other high-side SDGD component, the first low-side SDGD component, or the at least one other low-side SDGD component.

7. The system of claim 4, wherein at least one of the first high-side power switch or the at least one other high-side power switch is respectively configured to be switched from an off state to an on state in response to reception of a forward-biased voltage that satisfies an applicable defined gate threshold switching voltage level, wherein, with respect to the first high-side power switch, the first switch state is the off state and the second switch state is the on state; and at least one of the first low-side power switch or the at least one other low-side power switch is further configured to be switched from a respective on state to a respective off state in response to current in the at least one of the first low-side power switch or the at least one other low-side power switch being reversed.

8. The system of claim 4, wherein the first high-side power switch, the at least one other high-side power switch, the first low-side power switch, and the at least one other low-side power switch are arranged in a circuit with respect to each other to facilitate function of the subset of power switches as the diode bridge in order to facilitate the rectification of the input power signal to generate the rectified power signal, during the start-up phase of operation prior to steady-state operation of the SDGD subsystem.

9. The system of claim 4, wherein the first high-side power switch, the at least one other high-side power switch, the first low-side power switch, and the at least one other low-side power switch are further configured to include respective body diodes to facilitate function of the subset of power switches as the diode bridge in order to facilitate the rectification of the input power signal to generate the rectified power signal, during the start-up phase of operation prior to steady-state operation of the SDGD subsystem.

10. The system of claim 1, wherein the SDGD subsystem is further configured to include a high-side SDGD portion and a low-side SDGD portion that are symmetrical, and wherein the high-side SDGD portion is configured to comprise the subset of switches and the set of capacitors to facilitate the control of the switching of the first power switch.

11. The system of claim 1, wherein the input power signal has a voltage level that is greater than or equal to 100 volts.

12. The system of claim 1, wherein at least one power switch of the subset of power switches is further configured to be a metal-oxide-semiconductor field-effect transistor (MOSFET) switch.

13. A method comprising:
generating a rectified power signal in response to an input power signal received by a subset of power switches, wherein respective power switches of the subset of power switches are arranged with respect to each other to emulate functionality of a diode rectifier;
supplying at least a portion of the rectified power signal to a self-driven gate-drive (SDGD) subsystem associated with the subset of power switches to facilitate controlling respective switching of the respective power switches of the subset of power switches, wherein the SDGD subsystem comprises a subset of switches that form an inverter to facilitate the controlling of the switching of a first power switch of the subset of power switches based at least in part on respective switch states of the subset of switches;
controlling respective charging of a first capacitor, a second capacitor, and a third capacitor of the SDGD subsystem to charge the first capacitor to a first voltage that is higher than a second voltage of the second capacitor before the third capacitor is charged to a third voltage that facilitates switching the first power switch from a first switch state to a second switch state, wherein the controlling of the respective charging of the first capacitor, the second capacitor, and the third capacitor facilitates maintaining the first power switch in the first switch state during initiation of the SDGD subsystem until the SDGD subsystem is operating in steady state; and
supplying a defined positive voltage signal to a comparator of the SDGD subsystem to facilitate controlling switching of a second power switch of the subset of power switches that is associated with the comparator to switch the second power switch from an on state to an off state at or substantially close to a zero-voltage-crossing point at a half-cycle associated with the input power signal.

14. The method of claim 13, further comprising:
controlling at least one of a first high-side power switch or at least one other high-side power switch to switch from an off state to an on state in response to receiving a forward-biased voltage that satisfies an applicable defined gate threshold switching voltage level; and
controlling at least one of a first low-side power switch or at least one other low-side power switch to switch from an on state to an off state in response to sensing a reversing of current in at least one of the first low-side power switch or the at least one other low-side power switch, wherein the subset of power switches comprises the first high-side power switch, the at least one other high-side power switch, the first low-side power switch, and the at least one other low-side power switch, wherein the first power switch is the first high-side power switch and the second power switch is the first low-side power switch.

15. The method of claim 13, further comprising:
controlling switching of at least one of a first high-side power switch or at least one other high-side power switch to switch at least one of the first high-side power switch or the at least one other high-side power switch to an off state, during a period of time that the SDGD subsystem is not operating in the steady state, wherein the subset of power switches comprises the first high-side power switch and the at least one other high-side power switch, wherein the first power switch is the first high-side power switch, and, with respect to the first power switch, the first switch state is the off state.

16. The method of claim 13, further comprising:
controlling switching of at least one of a first low-side power switch or at least one other low-side power switch to switch at least one of the first low-side power switch or the at least one other low-side power switch to an off state, during a period of time that the SDGD subsystem is not operating in the steady state, wherein the subset of power switches comprises the first low-side power switch and the at least one other low-side power switch, wherein the second power switch is the first low-side power switch.

17. The method of claim 13, wherein the input power signal has a voltage level that is greater than or equal to 100 volts.

18. A self-driven synchronous rectifier device, comprising:
a subset of power switches that is configured to receive an input voltage signal and rectify the input voltage signal to generate a rectified voltage signal as an output;
a self-driven gate-drive (SDGD) subsystem that is configured to control respective switching of respective power switches in the subset of power switches, wherein the SDGD subsystem is further configured to receive at least a portion of the rectified voltage signal, wherein the SDGD subsystem comprises a subset of switches that form an inverter to facilitate the controlling of the switching of a first power switch of the subset of power switches based at least in part on respective switch states of the subset of switches, and wherein the SDGD subsystem is further configured to comprise a set of capacitor components comprising a first capacitor component, a second capacitor component, and a third capacitor component, and, to facilitate maintaining the first power switch in a first switch state until the SDGD subsystem is operating in steady state, the SDGD subsystem controls respective charging of the first capacitor component, the second capacitor component, and the third capacitor component to charge the first capacitor component to a first voltage that is higher than a second voltage of the second capacitor component before the third capacitor component is charged to a third voltage that is sufficient to switch the first power switch from the first switch state to a second switch state; and
a zero-crossing controller component configured to provide a defined positive voltage signal to a comparator of the SDGD subsystem to facilitate control of a second power switch of the subset of power switches that is associated with the comparator to switch the second power switch from an on state to an off state at or substantially near a zero-voltage-crossing point at a half-cycle of the input power signal.

19. The synchronous rectifier device of claim 18, wherein the subset of power switches is further configured to comprise a first high-side power switch, at least one other high-side power switch, a first low-side power switch, and at least one other low-side power switch that are arranged and associated with each other to form and operate as a diode bridge to facilitate rectification of the input voltage signal to generate the rectified voltage signal, and wherein the first power switch is the first high-side power switch and the second power switch is the first low-side power switch.

20. The synchronous rectifier device of claim 18, wherein the subset of power switches is further configured to comprise a first high-side power switch, at least one other high-side power switch, a first low-side power switch, and at least one other low-side power switch that are arranged in a circuit to maintain the first high-side power switch, the at least one other high-side power switch, the first low-side power switch, and the at least one other low-side power switch in an off state, during a period of time that the SDGD subsystem is not operating in the steady state, to facilitate function of the subset of power switches as a diode bridge in order to facilitate rectification of the input power signal to generate the rectified power signal, and wherein the first power switch is the first high-side power switch and the second power switch is the first low-side power switch, and, with respect to the first power switch, the first switch state is the off state.

* * * * *